US009684905B1

(12) United States Patent
Haller et al.

(10) Patent No.: US 9,684,905 B1
(45) Date of Patent: *Jun. 20, 2017

(54) SYSTEMS AND METHODS FOR DATA VERIFICATION

(71) Applicant: Experian Information Solutions, Inc., Costa Mesa, CA (US)

(72) Inventors: Eric Haller, Rancho Santa Fe, CA (US); Mark Hirn, Hermosa Beach, CA (US); Christer Dichiara, San Diego, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/867,406

(22) Filed: Sep. 28, 2015

Related U.S. Application Data

(63) Continuation of application No. 13/302,414, filed on Nov. 22, 2011, now Pat. No. 9,147,042.

(60) Provisional application No. 61/416,259, filed on Nov. 22, 2010.

(51) Int. Cl.
*G06F 17/30* (2006.01)
*G06Q 30/00* (2012.01)

(52) U.S. Cl.
CPC ..... *G06Q 30/018* (2013.01); *G06F 17/30867* (2013.01)

(58) Field of Classification Search
CPC combination set(s) only.
See application file for complete search history.

(56) References Cited

U.S. PATENT DOCUMENTS

| | | |
|---|---|---|
| 3,316,395 A | 4/1967 | Lavin et al. |
| 4,163,290 A | 7/1979 | Sutherlin et al. |
| 4,346,442 A | 8/1982 | Musmanno |
| 4,491,725 A | 1/1985 | Pritchard |
| 4,774,664 A | 9/1988 | Campbell et al. |
| 4,795,890 A | 1/1989 | Goldman |
| 4,812,628 A | 3/1989 | Boston et al. |
| 4,827,508 A | 5/1989 | Shear |
| 4,868,570 A | 9/1989 | Davis |
| 4,872,113 A | 10/1989 | Dinerstein |
| 4,891,503 A | 1/1990 | Jewell |
| 4,935,870 A | 6/1990 | Burk, Jr. et al. |
| 4,947,028 A | 8/1990 | Gorog |
| 4,977,595 A | 12/1990 | Ohta et al. |
| 4,989,141 A | 1/1991 | Lyons et al. |
| 5,126,936 A | 6/1992 | Champion et al. |

(Continued)

FOREIGN PATENT DOCUMENTS

| | | |
|---|---|---|
| CN | 101452555 | 6/2009 |
| CN | 102096886 | 6/2011 |

(Continued)

OTHER PUBLICATIONS

U.S. Appl. No. 12/705,489, filed Feb. 12, 2010, Bargoli et al.

(Continued)

*Primary Examiner* — Shyue Jiunn Hwa
(74) *Attorney, Agent, or Firm* — Knobbe Martens Olson & Bear LLP

(57) ABSTRACT

Systems and methods for verifying data including income and employment, assets, healthcare claims, clinical data, and other types of data subject to various regulatory and/or privacy restrictions.

6 Claims, 8 Drawing Sheets

(56) References Cited

U.S. PATENT DOCUMENTS

| | | |
|---|---|---|
| 5,216,612 A | 6/1993 | Cornett et al. |
| 5,239,462 A | 8/1993 | Jones et al. |
| 5,247,575 A | 9/1993 | Sprague et al. |
| 5,274,547 A | 12/1993 | Zoffel et al. |
| 5,301,105 A | 4/1994 | Cummings, Jr. |
| 5,325,509 A | 6/1994 | Lautzenheiser |
| 5,341,429 A | 8/1994 | Stringer et al. |
| 5,351,293 A | 9/1994 | Michener et al. |
| 5,500,513 A | 3/1996 | Langhans et al. |
| 5,528,701 A | 6/1996 | Aref |
| 5,555,409 A | 9/1996 | Leenstra, Sr. et al. |
| 5,557,514 A | 9/1996 | Seare et al. |
| 5,583,760 A | 12/1996 | Klesse |
| 5,590,038 A | 12/1996 | Pitroda |
| 5,611,052 A | 3/1997 | Dykstra et al. |
| 5,621,201 A | 4/1997 | Langhans et al. |
| 5,629,982 A | 5/1997 | Micali |
| 5,630,070 A | 5/1997 | Dietrich et al. |
| 5,640,551 A | 6/1997 | Chu et al. |
| 5,640,577 A | 6/1997 | Scharmer |
| 5,644,778 A | 7/1997 | Burks et al. |
| 5,649,114 A | 7/1997 | Deaton et al. |
| 5,655,129 A | 8/1997 | Ito |
| 5,659,725 A | 8/1997 | Levy et al. |
| 5,659,731 A | 8/1997 | Gustafson |
| 5,666,528 A | 9/1997 | Thai |
| 5,692,107 A | 11/1997 | Simoudis et al. |
| 5,696,907 A | 12/1997 | Tom |
| 5,699,527 A | 12/1997 | Davidson |
| 5,704,044 A | 12/1997 | Tarter et al. |
| 5,715,314 A | 2/1998 | Payne et al. |
| 5,719,941 A | 2/1998 | Swift et al. |
| 5,737,732 A | 4/1998 | Gibson et al. |
| 5,739,512 A | 4/1998 | Tognazzini |
| 5,748,098 A | 5/1998 | Grace |
| 5,754,632 A | 5/1998 | Smith |
| 5,754,939 A | 5/1998 | Herz et al. |
| 5,764,923 A | 6/1998 | Tallman et al. |
| 5,765,143 A | 6/1998 | Sheldon et al. |
| 5,768,423 A | 6/1998 | Aref et al. |
| 5,774,692 A | 6/1998 | Boyer et al. |
| 5,778,405 A | 7/1998 | Ogawa |
| 5,797,136 A | 8/1998 | Boyer et al. |
| 5,812,840 A | 9/1998 | Shwartz |
| 5,819,291 A | 10/1998 | Haimowitz et al. |
| 5,822,410 A | 10/1998 | McCausland et al. |
| 5,822,750 A | 10/1998 | Jou et al. |
| 5,822,751 A | 10/1998 | Gray et al. |
| 5,825,884 A | 10/1998 | Zdepski et al. |
| 5,828,837 A | 10/1998 | Eikland |
| 5,832,068 A | 11/1998 | Smith |
| 5,832,447 A | 11/1998 | Rieker et al. |
| 5,835,915 A | 11/1998 | Carr et al. |
| 5,842,211 A | 11/1998 | Horadan et al. |
| 5,844,218 A | 12/1998 | Kawan et al. |
| 5,870,721 A | 2/1999 | Norris |
| 5,878,403 A | 3/1999 | DeFrancesco |
| 5,881,131 A | 3/1999 | Farris et al. |
| 5,884,287 A | 3/1999 | Edesess |
| 5,893,090 A | 4/1999 | Friedman et al. |
| 5,903,830 A | 5/1999 | Joao et al. |
| 5,903,881 A | 5/1999 | Schrader et al. |
| 5,905,985 A | 5/1999 | Malloy et al. |
| 5,907,828 A | 5/1999 | Meyer et al. |
| 5,924,082 A | 7/1999 | Silverman et al. |
| 5,926,800 A | 7/1999 | Baronowski et al. |
| 5,930,759 A | 7/1999 | Moore et al. |
| 5,930,776 A | 7/1999 | Dykstra et al. |
| 5,933,809 A | 8/1999 | Hunt et al. |
| 5,940,812 A | 8/1999 | Tengel et al. |
| 5,950,179 A | 9/1999 | Buchanan et al. |
| 5,956,693 A | 9/1999 | Geerlings |
| 5,960,430 A | 9/1999 | Haimowitz et al. |
| 5,961,593 A | 10/1999 | Gabber et al. |
| 5,963,932 A | 10/1999 | Jakobsson et al. |
| 5,966,695 A | 10/1999 | Melchione et al. |
| 5,966,699 A | 10/1999 | Zandi |
| 5,970,478 A | 10/1999 | Walker et al. |
| 5,978,780 A | 11/1999 | Watson |
| 5,995,947 A | 11/1999 | Fraser et al. |
| 5,999,596 A | 12/1999 | Walker et al. |
| 6,006,333 A | 12/1999 | Nielsen |
| 6,014,632 A | 1/2000 | Gamble et al. |
| 6,014,688 A | 1/2000 | Venkatraman et al. |
| 6,018,723 A | 1/2000 | Siegel et al. |
| 6,021,397 A | 2/2000 | Jones et al. |
| 6,021,943 A | 2/2000 | Chastain |
| 6,026,440 A | 2/2000 | Shrader et al. |
| 6,029,149 A | 2/2000 | Dykstra et al. |
| 6,038,551 A | 3/2000 | Barlow et al. |
| 6,044,351 A | 3/2000 | Jones |
| 6,044,352 A | 3/2000 | Deavers |
| 6,067,522 A | 5/2000 | Warady et al. |
| 6,070,147 A | 5/2000 | Harms et al. |
| 6,070,241 A | 5/2000 | Edwards et al. |
| 6,072,894 A | 6/2000 | Payne |
| 6,073,104 A | 6/2000 | Field |
| 6,073,106 A | 6/2000 | Rozen et al. |
| 6,073,140 A | 6/2000 | Morgan et al. |
| 6,085,242 A | 7/2000 | Chandra |
| 6,088,686 A | 7/2000 | Walker et al. |
| 6,098,052 A | 8/2000 | Kosiba et al. |
| 6,108,641 A | 8/2000 | Kenna et al. |
| 6,119,103 A | 9/2000 | Basch et al. |
| 6,121,901 A | 9/2000 | Welch et al. |
| 6,128,602 A | 10/2000 | Northington et al. |
| 6,128,624 A | 10/2000 | Papierniak et al. |
| 6,129,273 A | 10/2000 | Shah |
| 6,144,948 A | 11/2000 | Walker et al. |
| 6,144,957 A | 11/2000 | Cohen et al. |
| 6,151,601 A | 11/2000 | Papierniak et al. |
| 6,154,729 A | 11/2000 | Cannon et al. |
| 6,157,707 A | 12/2000 | Baulier et al. |
| 6,157,927 A | 12/2000 | Schaefer et al. |
| 6,161,139 A | 12/2000 | Win et al. |
| 6,163,770 A | 12/2000 | Gamble et al. |
| 6,171,112 B1 | 1/2001 | Clark et al. |
| 6,178,442 B1 | 1/2001 | Yamazaki |
| 6,182,068 B1 | 1/2001 | Culliss |
| 6,182,229 B1 | 1/2001 | Nielsen |
| 6,185,543 B1 | 2/2001 | Galperin et al. |
| 6,196,460 B1 | 3/2001 | Shin |
| 6,202,053 B1 | 3/2001 | Christiansen et al. |
| 6,208,973 B1 | 3/2001 | Boyer et al. |
| 6,223,171 B1 | 4/2001 | Chaudhuri et al. |
| 6,247,000 B1 | 6/2001 | Hawkins et al. |
| 6,253,202 B1 | 6/2001 | Gilmour |
| 6,253,203 B1 | 6/2001 | O'Flaherty et al. |
| 6,254,000 B1 | 7/2001 | Degen et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,263,447 B1 | 7/2001 | French et al. |
| 6,269,369 B1 | 7/2001 | Robertson |
| 6,275,824 B1 | 8/2001 | O'Flaherty et al. |
| 6,282,658 B2 | 8/2001 | French et al. |
| 6,298,348 B1 | 10/2001 | Eldering |
| 6,304,860 B1 | 10/2001 | Martin et al. |
| 6,304,869 B1 | 10/2001 | Moore et al. |
| 6,311,169 B2 | 10/2001 | Duhon |
| 6,321,205 B1 | 11/2001 | Eder |
| 6,321,339 B1 | 11/2001 | French et al. |
| 6,327,578 B1 | 12/2001 | Linehan |
| 6,339,769 B1 | 1/2002 | Cochrane et al. |
| 6,343,279 B1 | 1/2002 | Bissonette et al. |
| 6,356,937 B1 | 3/2002 | Montville et al. |
| 6,366,903 B1 | 4/2002 | Agrawal et al. |
| 6,374,229 B1 | 4/2002 | Lowrey et al. |
| 6,374,230 B1 | 4/2002 | Walker et al. |
| 6,384,844 B1 | 5/2002 | Stewart et al. |
| 6,385,594 B1 | 5/2002 | Lebda et al. |
| 6,393,406 B1 | 5/2002 | Eder |
| 6,397,197 B1 | 5/2002 | Gindlesperger |
| 6,397,212 B1 | 5/2002 | Biffar |

(56) References Cited

U.S. PATENT DOCUMENTS

| | | |
|---|---|---|
| 6,397,224 B1 | 5/2002 | Zubeldia et al. |
| 6,405,173 B1 | 6/2002 | Honarvar |
| 6,405,181 B2 | 6/2002 | Lent et al. |
| 6,424,878 B1 | 7/2002 | Barker et al. |
| 6,430,539 B1 | 8/2002 | Lazarus et al. |
| 6,446,200 B1 | 9/2002 | Ball et al. |
| 6,448,980 B1 | 9/2002 | Kumar et al. |
| 6,453,297 B1 | 9/2002 | Burks et al. |
| 6,453,353 B1 | 9/2002 | Win et al. |
| 6,456,983 B1 | 9/2002 | Keyes et al. |
| 6,457,012 B1 | 9/2002 | Jatkowski |
| 6,463,533 B1 | 10/2002 | Calamera et al. |
| 6,473,740 B2 | 10/2002 | Cockril et al. |
| 6,496,819 B1 | 12/2002 | Bello et al. |
| 6,496,827 B2 | 12/2002 | Kozam et al. |
| 6,496,931 B1 | 12/2002 | Rajchel et al. |
| 6,496,936 B1 | 12/2002 | French et al. |
| 5,870,721 C1 | 1/2003 | Norris |
| 6,505,168 B1 | 1/2003 | Rothman et al. |
| 6,513,018 B1 | 1/2003 | Culhane |
| 6,523,021 B1 | 2/2003 | Monberg et al. |
| 6,523,022 B1 | 2/2003 | Hobbs |
| 6,523,041 B1 | 2/2003 | Morgan et al. |
| 6,532,450 B1 | 3/2003 | Brown et al. |
| 6,539,377 B1 | 3/2003 | Culliss |
| 6,543,683 B2 | 4/2003 | Hoffman |
| 6,564,210 B1 | 5/2003 | Korda et al. |
| 6,574,623 B1 | 6/2003 | Laung et al. |
| 6,574,736 B1 | 6/2003 | Andrews |
| 6,581,059 B1 | 6/2003 | Barrett et al. |
| 6,587,841 B1 | 7/2003 | DeFrancesco |
| 6,598,030 B1 | 7/2003 | Siegel et al. |
| 6,601,173 B1 | 7/2003 | Mohler |
| 6,601,234 B1 | 7/2003 | Bowman-Amuah |
| 6,607,136 B1 | 8/2003 | Atsmon et al. |
| 6,611,816 B2 | 8/2003 | Lebda et al. |
| 6,629,245 B1 | 9/2003 | Stone et al. |
| 6,647,383 B1 | 11/2003 | August et al. |
| 6,651,220 B1 | 11/2003 | Penteroudakis et al. |
| 6,658,393 B1 | 12/2003 | Basch et al. |
| 6,679,425 B1 | 1/2004 | Sheppard et al. |
| 6,684,093 B2 | 1/2004 | Kuth |
| 6,708,166 B1 | 3/2004 | Dysart et al. |
| 6,714,944 B1 | 3/2004 | Shapiro et al. |
| 6,725,381 B1 | 4/2004 | Smith et al. |
| 6,734,886 B1 | 5/2004 | Hagan et al. |
| 6,738,748 B2 | 5/2004 | Wetzer |
| 6,748,426 B1 | 6/2004 | Shaffer et al. |
| 6,750,985 B2 | 6/2004 | Rhoads |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,782,379 B2 | 8/2004 | Lee |
| 6,796,497 B2 | 9/2004 | Benkert et al. |
| 6,801,909 B2 | 10/2004 | Delgado et al. |
| 6,804,346 B1 | 10/2004 | Mewhinney |
| 6,804,701 B2 | 10/2004 | Muret et al. |
| 6,805,287 B2 | 10/2004 | Bishop et al. |
| 6,807,533 B1 | 10/2004 | Land et al. |
| 6,816,850 B2 | 11/2004 | Culliss |
| 6,816,871 B2 | 11/2004 | Lee |
| 6,826,535 B2 | 11/2004 | Wood et al. |
| 6,845,448 B1 | 1/2005 | Chaganti et al. |
| 6,847,942 B1 | 1/2005 | Land et al. |
| 6,850,895 B2 | 2/2005 | Brodersen et al. |
| 6,857,073 B2 | 2/2005 | French et al. |
| 6,871,287 B1 | 3/2005 | Ellingson |
| 6,873,972 B1 | 3/2005 | Marcial et al. |
| 6,892,307 B1 | 5/2005 | Wood et al. |
| 6,900,731 B2 | 5/2005 | Kreiner et al. |
| 6,901,406 B2 | 5/2005 | Nabe et al. |
| 6,907,408 B2 | 6/2005 | Angel |
| 6,908,030 B2 | 6/2005 | Rajasekaran et al. |
| 6,910,624 B1 | 6/2005 | Natsuno |
| 6,928,487 B2 | 8/2005 | Eggebraaten et al. |
| 6,934,714 B2 | 8/2005 | Meinig |
| 6,934,858 B2 | 8/2005 | Woodhill |
| 6,947,989 B2 | 9/2005 | Gullotta et al. |
| 6,950,807 B2 | 9/2005 | Brock |
| 6,950,858 B2 | 9/2005 | Ogami |
| 6,954,757 B2 | 10/2005 | Zargham et al. |
| 6,965,881 B1 | 11/2005 | Brickell et al. |
| 6,968,319 B1 | 11/2005 | Remington et al. |
| 6,973,462 B2 | 12/2005 | Dattero et al. |
| 6,976,056 B1 | 12/2005 | Kumar |
| 6,983,379 B1 | 1/2006 | Spalink et al. |
| 6,983,381 B2 | 1/2006 | Jerdonek |
| 6,983,478 B1 | 1/2006 | Grauch et al. |
| 6,985,887 B1 | 1/2006 | Sunstein et al. |
| 6,988,085 B2 | 1/2006 | Hedy |
| 6,999,941 B1 | 2/2006 | Agarwal |
| 7,003,491 B2 | 2/2006 | Starkman |
| 7,003,504 B1 | 2/2006 | Angus et al. |
| 7,016,907 B2 | 3/2006 | Boreham et al. |
| 7,028,001 B1 | 4/2006 | Muthuswamy et al. |
| 7,028,013 B2 | 4/2006 | Saeki |
| 7,028,052 B2 | 4/2006 | Chapman et al. |
| 7,035,855 B1 | 4/2006 | Kilger et al. |
| 7,039,176 B2 | 5/2006 | Borodow et al. |
| 7,039,607 B2 | 5/2006 | Watarai et al. |
| 7,043,476 B2 | 5/2006 | Robson |
| 7,047,251 B2 | 5/2006 | Reed et al. |
| 7,050,982 B2 | 5/2006 | Sheinson et al. |
| 7,050,989 B1 | 5/2006 | Hurt et al. |
| 7,058,817 B1 | 6/2006 | Ellmore |
| 7,059,531 B2 | 6/2006 | Beenau et al. |
| 7,062,475 B1 | 6/2006 | Szabo et al. |
| 7,065,566 B2 | 6/2006 | Menard et al. |
| 7,069,240 B2 | 6/2006 | Spero et al. |
| 7,069,249 B2 | 6/2006 | Stolfo et al. |
| 7,072,842 B2 | 7/2006 | Provost et al. |
| 7,072,909 B2 | 7/2006 | Polk |
| 7,076,462 B1 | 7/2006 | Nelson et al. |
| 7,076,475 B2 | 7/2006 | Honarvar et al. |
| 7,082,435 B1 | 7/2006 | Guzman et al. |
| 7,085,727 B2 | 8/2006 | VanOrman |
| 7,092,898 B1 | 8/2006 | Mattick et al. |
| 7,107,241 B1 | 9/2006 | Pinto |
| 7,117,172 B1 | 10/2006 | Black |
| 7,121,471 B2 | 10/2006 | Beenau et al. |
| 7,124,144 B2 | 10/2006 | Christianson et al. |
| 7,133,840 B1 | 11/2006 | Kenna et al. |
| 7,133,935 B2 | 11/2006 | Hedy |
| 7,154,375 B2 | 12/2006 | Beenau et al. |
| 7,155,739 B2 | 12/2006 | Bari et al. |
| 7,167,907 B2 | 1/2007 | Shaffer et al. |
| 7,171,371 B2 | 1/2007 | Goldstein |
| 7,174,302 B2 | 2/2007 | Patricelli et al. |
| 7,181,427 B1 | 2/2007 | DeFrancesco |
| 7,184,974 B2 | 2/2007 | Shishido |
| 7,185,016 B1 | 2/2007 | Rasmussen |
| 7,188,169 B2 | 3/2007 | Buus et al. |
| 7,191,150 B1 | 3/2007 | Shao et al. |
| 7,191,451 B2 | 3/2007 | Nakagawa |
| 7,194,416 B1 | 3/2007 | Provost et al. |
| 7,197,468 B1 | 3/2007 | Patricelli et al. |
| 7,200,602 B2 | 4/2007 | Jonas |
| 7,206,768 B1 | 4/2007 | deGroeve et al. |
| 7,209,895 B2 | 4/2007 | Kundtz et al. |
| 7,212,995 B2 | 5/2007 | Schulkins |
| 7,219,107 B2 | 5/2007 | Beringer |
| 7,222,369 B2 | 5/2007 | Vering et al. |
| 7,234,156 B2 | 6/2007 | French et al. |
| 7,234,160 B2 | 6/2007 | Vogel et al. |
| 7,236,950 B2 | 6/2007 | Savage et al. |
| 7,237,267 B2 | 6/2007 | Rayes et al. |
| 7,240,059 B2 | 7/2007 | Bayliss et al. |
| 7,243,369 B2 | 7/2007 | Bhat et al. |
| 7,246,067 B2 | 7/2007 | Austin et al. |
| 7,246,068 B2 | 7/2007 | Thomas, Jr. |
| 7,246,740 B2 | 7/2007 | Swift et al. |
| 7,249,048 B1 | 7/2007 | O'Flaherty |
| 7,249,076 B1 | 7/2007 | Pendleton et al. |
| 7,249,113 B1 | 7/2007 | Continelli et al. |

(56) References Cited

U.S. PATENT DOCUMENTS

| | | |
|---|---|---|
| 7,251,625 B2 | 7/2007 | Anglum |
| 7,263,497 B1 | 8/2007 | Wiser et al. |
| 7,272,591 B1 | 9/2007 | Ghazal et al. |
| 7,277,869 B2 | 10/2007 | Starkman |
| 7,277,900 B1 | 10/2007 | Ganesh et al. |
| 7,281,652 B2 | 10/2007 | Foss |
| 7,289,971 B1 | 10/2007 | O'Neil et al. |
| 7,295,988 B1 | 11/2007 | Reeves |
| 7,298,872 B2 | 11/2007 | Glisson |
| 7,302,420 B2 | 11/2007 | Aggarwal et al. |
| 7,303,120 B2 | 12/2007 | Beenau et al. |
| 7,305,359 B2 | 12/2007 | Bonnell |
| 7,310,611 B2 | 12/2007 | Shibuya et al. |
| 7,310,617 B1 | 12/2007 | Cunningham |
| 7,313,538 B2 | 12/2007 | Wilmes et al. |
| 7,314,167 B1 | 1/2008 | Kiliccote |
| 7,315,837 B2 | 1/2008 | Sloan et al. |
| 7,328,233 B2 | 2/2008 | Salim et al. |
| 7,328,276 B2 | 2/2008 | Alisuag |
| 7,330,835 B2 | 2/2008 | Deggendorf |
| 7,330,871 B2 | 2/2008 | Barber |
| 7,333,635 B2 | 2/2008 | Tsantes et al. |
| 7,333,937 B2 | 2/2008 | Baldwin, Jr. et al. |
| 7,340,424 B2 | 3/2008 | Gang et al. |
| 7,340,434 B2 | 3/2008 | Schnall |
| 7,340,679 B2 | 3/2008 | Botscheck et al. |
| 7,343,149 B2 | 3/2008 | Benco |
| 7,343,295 B2 | 3/2008 | Pomerance |
| 7,346,576 B2 | 3/2008 | Lent et al. |
| 7,346,703 B2 | 3/2008 | Cope |
| 7,356,503 B1 | 4/2008 | Johnson et al. |
| 7,356,516 B2 | 4/2008 | Richey et al. |
| 7,366,694 B2 | 4/2008 | Lazerson |
| 7,367,011 B2 | 4/2008 | Ramsey et al. |
| 7,370,044 B2 | 5/2008 | Mulhern et al. |
| 7,373,335 B2 | 5/2008 | Cleghorn et al. |
| 7,376,603 B1 | 5/2008 | Mayr et al. |
| 7,379,913 B2 | 5/2008 | Steele et al. |
| 7,380,707 B1 | 6/2008 | Fredman |
| 7,383,215 B1 | 6/2008 | Navarro et al. |
| 7,383,227 B2 | 6/2008 | Weinflash et al. |
| 7,383,988 B2 | 6/2008 | Slonecker, Jr. |
| 7,386,511 B2 | 6/2008 | Buchanan et al. |
| 7,389,913 B2 | 6/2008 | Starrs |
| 7,392,216 B1 | 6/2008 | Palmgren et al. |
| 7,395,273 B2 | 7/2008 | Khan et al. |
| 7,403,923 B2 | 7/2008 | Elliott et al. |
| 7,403,942 B1 | 7/2008 | Bayliss |
| 7,409,369 B1 | 8/2008 | Homuth et al. |
| 7,421,322 B1 | 9/2008 | Silversmith et al. |
| 7,421,442 B2 | 9/2008 | Gelb et al. |
| 7,424,439 B1 | 9/2008 | Fayyad et al. |
| 7,433,864 B2 | 10/2008 | Malik |
| 7,437,679 B2 | 10/2008 | Uemura et al. |
| 7,438,226 B2 | 10/2008 | Helsper et al. |
| 7,444,414 B2 | 10/2008 | Foster et al. |
| 7,444,518 B1 | 10/2008 | Dharmarajan et al. |
| 7,451,095 B1 | 11/2008 | Bradley et al. |
| 7,451,113 B1 | 11/2008 | Kasower |
| 7,458,508 B1 | 12/2008 | Shao et al. |
| 7,460,857 B2 | 12/2008 | Roach, Jr. |
| 7,467,127 B1 | 12/2008 | Baccash et al. |
| 7,467,401 B2 | 12/2008 | Cicchitto |
| 7,475,118 B2 | 1/2009 | Leiba et al. |
| 7,478,157 B2 | 1/2009 | Bohrer et al. |
| 7,479,949 B2 | 1/2009 | Jobs et al. |
| 7,480,631 B1 | 1/2009 | Merced et al. |
| 7,483,842 B1 | 1/2009 | Fung et al. |
| 7,490,356 B2 | 2/2009 | Lieblich et al. |
| 7,503,489 B2 | 3/2009 | Heffez |
| 7,505,938 B2 | 3/2009 | Lang et al. |
| 7,505,939 B2 | 3/2009 | Lent et al. |
| 7,509,117 B2 | 3/2009 | Yum |
| 7,509,278 B2 | 3/2009 | Jones |
| 7,512,221 B2 | 3/2009 | Toms |
| 7,527,967 B2 | 5/2009 | Chao et al. |
| 7,529,698 B2 | 5/2009 | Joao |
| 7,530,097 B2 | 5/2009 | Casco-Arias et al. |
| 7,533,179 B2 | 5/2009 | Tarquini et al. |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,542,993 B2 | 6/2009 | Satterfield et al. |
| 7,543,739 B2 | 6/2009 | Brown et al. |
| 7,546,266 B2 | 6/2009 | Beirne et al. |
| 7,546,271 B1 | 6/2009 | Chmielewski et al. |
| 7,548,886 B2 | 6/2009 | Kirkland et al. |
| 7,552,086 B1 | 6/2009 | Rajasekar et al. |
| 7,552,089 B2 | 6/2009 | Bruer et al. |
| 7,552,467 B2 | 6/2009 | Lindsay |
| 7,556,192 B2 | 7/2009 | Wokaty, Jr. |
| 7,559,217 B2 | 7/2009 | Bass |
| 7,562,093 B2 | 7/2009 | Gelb et al. |
| 7,562,184 B2 | 7/2009 | Henmi et al. |
| 7,562,814 B1 | 7/2009 | Shao et al. |
| 7,571,138 B2 | 8/2009 | Miri et al. |
| 7,571,473 B1 | 8/2009 | Boydstun et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,884 B2 | 8/2009 | Cook |
| 7,581,112 B2 | 8/2009 | Brown et al. |
| 7,584,126 B1 | 9/2009 | White |
| 7,584,127 B2 | 9/2009 | Byrne et al. |
| 7,584,146 B1 | 9/2009 | Duhon |
| 7,587,366 B2 | 9/2009 | Grim, III et al. |
| 7,587,368 B2 | 9/2009 | Felsher |
| 7,593,889 B2 | 9/2009 | Raines et al. |
| 7,593,891 B2 | 9/2009 | Kornegay et al. |
| 7,596,512 B1 | 9/2009 | Raines et al. |
| 7,596,716 B2 | 9/2009 | Frost et al. |
| 7,603,317 B2 | 10/2009 | Adler et al. |
| 7,603,701 B2 | 10/2009 | Gaucas |
| 7,606,725 B2 | 10/2009 | Robertson et al. |
| 7,610,216 B1 | 10/2009 | May et al. |
| 7,610,229 B1 | 10/2009 | Kornegay |
| 7,613,600 B2 | 11/2009 | Krane |
| 7,617,116 B2 | 11/2009 | Amar et al. |
| 7,620,596 B2 | 11/2009 | Knudson et al. |
| 7,623,844 B2 | 11/2009 | Herrmann et al. |
| 7,630,932 B2 | 12/2009 | Danaher et al. |
| 7,630,933 B2 | 12/2009 | Peterson et al. |
| 7,634,737 B2 | 12/2009 | Beringer et al. |
| 7,640,200 B2 | 12/2009 | Gardner et al. |
| 7,647,274 B2 | 1/2010 | Peterson et al. |
| 7,647,344 B2 | 1/2010 | Skurtovich, Jr. et al. |
| 7,653,592 B1 | 1/2010 | Flaxman et al. |
| 7,653,600 B2 | 1/2010 | Gustin |
| 7,653,688 B2 | 1/2010 | Bittner |
| 7,668,840 B2 | 2/2010 | Bayliss et al. |
| 7,672,833 B2 | 3/2010 | Blume et al. |
| 7,672,924 B1 | 3/2010 | Scheurich et al. |
| 7,672,926 B2 | 3/2010 | Ghazal et al. |
| 7,676,410 B2 | 3/2010 | Petralia |
| 7,676,418 B1 | 3/2010 | Chung et al. |
| 7,676,751 B2 | 3/2010 | Allen et al. |
| 7,685,209 B1 | 3/2010 | Norton et al. |
| 7,686,214 B1 | 3/2010 | Shao et al. |
| 7,689,487 B1 | 3/2010 | Britto et al. |
| 7,689,505 B2 | 3/2010 | Kasower |
| 7,689,563 B1 | 3/2010 | Jacobson |
| 7,690,032 B1 | 3/2010 | Peirce |
| 7,693,787 B2 | 4/2010 | Provinse |
| 7,698,163 B2 | 4/2010 | Reed et al. |
| 7,698,214 B1 | 4/2010 | Lindgren |
| 7,698,217 B1 | 4/2010 | Phillips et al. |
| 7,698,445 B2 | 4/2010 | Fitzpatrick et al. |
| 7,707,059 B2 | 4/2010 | Reed et al. |
| 7,707,102 B2 | 4/2010 | Rothstein |
| 7,707,164 B2 | 4/2010 | Kapochunas et al. |
| 7,707,271 B2 | 4/2010 | Rudkin et al. |
| 7,708,190 B2 | 5/2010 | Brandt et al. |
| 7,711,635 B2 | 5/2010 | Steele et al. |
| 7,711,636 B2 | 5/2010 | Robida et al. |

(56) References Cited

U.S. PATENT DOCUMENTS

| | | |
|---|---|---|
| 7,720,750 B2 | 5/2010 | Brody |
| 7,725,300 B2 | 5/2010 | Pinto et al. |
| 7,725,385 B2 | 5/2010 | Royer et al. |
| 7,729,959 B1 | 6/2010 | Wells et al. |
| 7,730,078 B2 | 6/2010 | Schwabe et al. |
| 7,739,139 B2 | 6/2010 | Robertson et al. |
| 7,742,982 B2 | 6/2010 | Chaudhuri et al. |
| 7,747,480 B1 | 6/2010 | Agresta et al. |
| 7,747,494 B1 | 6/2010 | Kothari et al. |
| 7,747,520 B2 | 6/2010 | Livermore et al. |
| 7,747,521 B2 | 6/2010 | Serio |
| 7,747,559 B2 | 6/2010 | Leitner et al. |
| 7,752,236 B2 | 7/2010 | Williams et al. |
| 7,756,789 B2 | 7/2010 | Welker et al. |
| 7,761,379 B2 | 7/2010 | Zoldi et al. |
| 7,761,384 B2 | 7/2010 | Madhogarhia |
| 7,761,568 B1 | 7/2010 | Levi et al. |
| 7,765,166 B2 | 7/2010 | Beringer et al. |
| 7,765,311 B2 | 7/2010 | Itabashi et al. |
| 7,769,696 B2 | 8/2010 | Yoda |
| 7,769,697 B2 | 8/2010 | Fieschi et al. |
| 7,774,257 B2 | 8/2010 | Maggioncalda et al. |
| 7,774,270 B1 | 8/2010 | MacCloskey |
| 7,783,515 B1 | 8/2010 | Kumar et al. |
| 7,783,562 B1 | 8/2010 | Ellis |
| 7,788,040 B2 | 8/2010 | Haskell et al. |
| 7,792,715 B1 | 9/2010 | Kasower |
| 7,792,725 B2 | 9/2010 | Booraem et al. |
| 7,793,835 B1 | 9/2010 | Coggeshall et al. |
| 7,797,252 B2 | 9/2010 | Rosskamm et al. |
| 7,797,725 B2 | 9/2010 | Lunt et al. |
| 7,801,812 B2 | 9/2010 | Conlin et al. |
| 7,801,956 B1 | 9/2010 | Cumberbatch et al. |
| 7,802,104 B2 | 9/2010 | Dickinson |
| 7,805,345 B2 | 9/2010 | Abrahams et al. |
| 7,810,036 B2 | 10/2010 | Bales et al. |
| 7,814,004 B2 | 10/2010 | Haggerty et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,827,115 B2 | 11/2010 | Weller et al. |
| 7,832,006 B2 | 11/2010 | Chen et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,841,004 B1 | 11/2010 | Balducci et al. |
| 7,841,008 B1 | 11/2010 | Cole et al. |
| 7,844,520 B1 | 11/2010 | Franklin |
| 7,844,604 B2 | 11/2010 | Baio et al. |
| 7,848,972 B1 | 12/2010 | Sharma |
| 7,848,978 B2 | 12/2010 | Imrey et al. |
| 7,849,004 B2 | 12/2010 | Choudhuri et al. |
| 7,849,014 B2 | 12/2010 | Erikson |
| 7,853,493 B2 | 12/2010 | DeBie et al. |
| 7,853,518 B2 | 12/2010 | Cagan |
| 7,853,533 B2 | 12/2010 | Eisen |
| 7,853,984 B2 | 12/2010 | Antell et al. |
| 7,856,386 B2 | 12/2010 | Hazlehurst et al. |
| 7,860,786 B2 | 12/2010 | Blackburn et al. |
| 7,865,958 B2 | 1/2011 | Lieblich et al. |
| 7,870,078 B2 | 1/2011 | Clark et al. |
| 7,877,304 B1 | 1/2011 | Coulter |
| 7,877,784 B2 | 1/2011 | Chow et al. |
| 7,899,750 B1 | 3/2011 | Klieman et al. |
| 7,900,052 B2 | 3/2011 | Joans |
| 7,904,306 B2 | 3/2011 | Johnson et al. |
| 7,904,367 B2 | 3/2011 | Chung et al. |
| 7,908,242 B1 | 3/2011 | Achanta |
| 7,909,246 B2 | 3/2011 | Hogg et al. |
| 7,912,865 B2 | 3/2011 | Akerman et al. |
| 7,925,582 B1 | 4/2011 | Kornegay et al. |
| 7,930,195 B2 | 4/2011 | Heyns et al. |
| 7,930,242 B2 | 4/2011 | Morris et al. |
| 7,930,252 B2 | 4/2011 | Bender et al. |
| 7,941,363 B2 | 5/2011 | Tanaka et al. |
| 7,958,046 B2 | 6/2011 | Doerner et al. |
| 7,958,126 B2 | 6/2011 | Schachter |
| 7,966,192 B2 | 6/2011 | Pagliari et al. |
| 7,970,676 B2 | 6/2011 | Feinstein |
| 7,970,679 B2 | 6/2011 | Kasower |
| 7,970,698 B2 | 6/2011 | Gupta et al. |
| 7,975,299 B1 | 7/2011 | Balducci et al. |
| 7,979,908 B2 | 7/2011 | Millwee |
| 7,983,932 B2 | 7/2011 | Kane |
| 7,983,976 B2 | 7/2011 | Nafeh et al. |
| 7,983,979 B2 | 7/2011 | Holland, IV |
| 7,991,666 B2 | 8/2011 | Haggerty et al. |
| 7,991,688 B2 | 8/2011 | Phelan et al. |
| 7,991,689 B1 | 8/2011 | Brunzell et al. |
| 7,991,901 B2 | 8/2011 | Tarquini et al. |
| 7,996,912 B2 | 8/2011 | Spalink et al. |
| 8,001,034 B2 | 8/2011 | Chung et al. |
| 8,001,042 B1 | 8/2011 | Brunzell et al. |
| 8,001,043 B1 | 8/2011 | Walker et al. |
| 8,001,153 B2 | 8/2011 | Skurtovich, Jr. et al. |
| 8,001,235 B2 | 8/2011 | Russ et al. |
| 8,005,759 B2 | 8/2011 | Hirtenstein et al. |
| 8,015,107 B2 | 9/2011 | Kornegay et al. |
| 8,024,264 B2 | 9/2011 | Chaudhuri et al. |
| 8,032,932 B2 | 10/2011 | Speyer et al. |
| 8,036,979 B1 | 10/2011 | Torrez et al. |
| 8,037,097 B2 | 10/2011 | Guo et al. |
| 8,041,956 B1 | 10/2011 | White et al. |
| 8,055,904 B1 | 11/2011 | Cato et al. |
| 8,060,424 B2 | 11/2011 | Kasower |
| 8,060,916 B2 | 11/2011 | Bajaj et al. |
| 8,065,233 B2 | 11/2011 | Lee et al. |
| 8,065,234 B2 | 11/2011 | Liao et al. |
| 8,065,264 B1 | 11/2011 | Achanta |
| 8,078,453 B2 | 12/2011 | Shaw |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,078,881 B1 | 12/2011 | Liu |
| 8,082,202 B2 | 12/2011 | Weiss |
| 8,086,523 B1 | 12/2011 | Palmer |
| 8,086,524 B1 | 12/2011 | Craig et al. |
| 8,095,443 B2 | 1/2012 | DeBie |
| 8,095,458 B2 | 1/2012 | Peterson et al. |
| 8,099,309 B1 | 1/2012 | Bober |
| 8,099,341 B2 | 1/2012 | Varghese |
| 8,099,356 B2 | 1/2012 | Feinstein et al. |
| 8,104,679 B2 | 1/2012 | Brown |
| 8,126,805 B2 | 2/2012 | Sulkowski et al. |
| 8,127,982 B1 | 3/2012 | Casey et al. |
| 8,127,986 B1 | 3/2012 | Taylor et al. |
| 8,131,685 B1 | 3/2012 | Gedalius et al. |
| 8,131,777 B2 | 3/2012 | McCullough |
| 8,135,642 B1 | 3/2012 | Krause |
| 8,151,327 B2 | 4/2012 | Eisen |
| 8,160,960 B1 | 4/2012 | Fei et al. |
| 8,161,104 B2 | 4/2012 | Tomkow |
| 8,175,889 B1 | 5/2012 | Girulat et al. |
| 8,195,549 B2 | 6/2012 | Kasower |
| 8,201,257 B1 | 6/2012 | Andres et al. |
| 8,204,774 B2 | 6/2012 | Chwast et al. |
| 8,204,812 B2 | 6/2012 | Stewart et al. |
| 8,214,238 B1 | 7/2012 | Fairfield et al. |
| 8,219,771 B2 | 7/2012 | Le Neel |
| 8,224,723 B2 | 7/2012 | Bosch et al. |
| 8,225,395 B2 | 7/2012 | Atwood et al. |
| 8,234,498 B2 | 7/2012 | Britti et al. |
| 8,239,677 B2 | 8/2012 | Colson |
| 8,244,848 B1 | 8/2012 | Narayanan et al. |
| 8,271,378 B2 | 9/2012 | Chaudhuri et al. |
| 8,280,805 B1 | 10/2012 | Abrahams et al. |
| 8,281,372 B1 | 10/2012 | Vidal |
| 8,285,613 B1 | 10/2012 | Coulter |
| 8,285,656 B1 | 10/2012 | Chang et al. |
| 8,290,840 B2 | 10/2012 | Kasower |
| 8,291,218 B2 | 10/2012 | Garcia et al. |
| 8,291,477 B2 | 10/2012 | Lunt |
| 8,296,229 B1 | 10/2012 | Yellin et al. |
| 8,302,164 B2 | 10/2012 | Lunt |

(56) References Cited

U.S. PATENT DOCUMENTS

| | | |
|---|---|---|
| 8,312,033 B1 | 11/2012 | McMillan |
| 8,315,943 B2 | 11/2012 | Torrez et al. |
| 8,321,334 B1 | 11/2012 | Kornegay et al. |
| 8,321,339 B2 | 11/2012 | Imrey et al. |
| 8,321,952 B2 | 11/2012 | Spalink et al. |
| 8,326,672 B2 | 12/2012 | Haggerty et al. |
| 8,327,429 B2 | 12/2012 | Speyer et al. |
| 8,335,741 B2 | 12/2012 | Kornegay et al. |
| 8,355,967 B2 | 1/2013 | Debie et al. |
| 8,364,518 B1 | 1/2013 | Blake et al. |
| 8,364,588 B2 | 1/2013 | Celka et al. |
| 8,374,973 B2 | 2/2013 | Herbrich et al. |
| 8,380,618 B1 | 2/2013 | Kazenas et al. |
| 8,386,377 B1 | 2/2013 | Xiong et al. |
| 8,392,334 B2 | 3/2013 | Hirtenstein et al. |
| 8,412,593 B1 | 4/2013 | Song et al. |
| 8,418,254 B2 | 4/2013 | Britti et al. |
| 8,433,648 B2 | 4/2013 | Keithley et al. |
| 8,442,886 B1 | 5/2013 | Haggerty et al. |
| 8,447,016 B1 | 5/2013 | Kugler et al. |
| 8,456,293 B1 | 6/2013 | Trundle et al. |
| 8,458,062 B2 | 6/2013 | Dutt et al. |
| 8,458,074 B2 | 6/2013 | Showalter |
| 8,463,919 B2 | 6/2013 | Tarquini et al. |
| 8,464,939 B1 | 6/2013 | Taylor et al. |
| 8,468,090 B2 | 6/2013 | Lesandro et al. |
| 8,468,198 B2 | 6/2013 | Tomkow |
| 8,478,674 B1 | 7/2013 | Kapczynski et al. |
| 8,484,186 B1 | 7/2013 | Kapczynski et al. |
| 8,498,930 B2 | 7/2013 | Chung et al. |
| 8,515,828 B1 | 8/2013 | Wolf et al. |
| 8,515,844 B2 | 8/2013 | Kasower |
| 8,515,862 B2 | 8/2013 | Zhang et al. |
| 8,527,357 B1 | 9/2013 | Ganesan |
| 8,527,417 B2 | 9/2013 | Telle et al. |
| 8,527,773 B1 | 9/2013 | Metzger |
| 8,533,118 B2 | 9/2013 | Weller et al. |
| 8,560,434 B2 | 10/2013 | Morris et al. |
| 8,560,436 B2 | 10/2013 | Ingram et al. |
| 8,566,141 B1 | 10/2013 | Nagdev et al. |
| 8,571,971 B1 | 10/2013 | Brown et al. |
| 8,572,083 B1 | 10/2013 | Snell et al. |
| 8,578,496 B1 | 11/2013 | Krishnappa |
| 8,583,593 B1 | 11/2013 | Achanta |
| 8,595,101 B1 | 11/2013 | Daukas et al. |
| 8,600,886 B2 | 12/2013 | Ramavarjula et al. |
| 8,601,602 B1 | 12/2013 | Zheng |
| 8,606,234 B2 | 12/2013 | Pei et al. |
| 8,606,666 B1 | 12/2013 | Courbage et al. |
| 8,606,694 B2 | 12/2013 | Campbell et al. |
| 8,621,562 B2 | 12/2013 | Antell et al. |
| 8,626,646 B2 | 1/2014 | Torrez et al. |
| 8,630,938 B2 | 1/2014 | Cheng et al. |
| 8,631,242 B2 | 1/2014 | Britti et al. |
| 8,639,616 B1 | 1/2014 | Rolenaitis et al. |
| 8,639,920 B2 | 1/2014 | Stack et al. |
| 8,646,051 B2 | 2/2014 | Paden et al. |
| 8,646,101 B1 | 2/2014 | Millwee |
| 8,650,407 B2 | 2/2014 | Britti et al. |
| 8,671,107 B2 | 3/2014 | Scully et al. |
| 8,694,420 B1 | 4/2014 | Oliai |
| 8,705,718 B2 | 4/2014 | Baniak et al. |
| 8,706,599 B1 | 4/2014 | Koenig et al. |
| 8,719,159 B2 | 5/2014 | Keithley |
| 8,725,613 B1 | 5/2014 | Celka et al. |
| 8,732,004 B1 | 5/2014 | Ramos et al. |
| 8,738,515 B2 | 5/2014 | Chaudhuri et al. |
| 8,738,516 B1 | 5/2014 | Dean et al. |
| 8,744,956 B1 | 6/2014 | DiChiara et al. |
| 8,768,914 B2 | 7/2014 | Scriffignano et al. |
| 8,775,299 B2 | 7/2014 | Achanta et al. |
| 8,781,882 B1 * | 7/2014 | Arboletti ............ G06Q 10/0639 705/7.11 |
| 8,781,951 B2 | 7/2014 | Lewis et al. |
| 8,781,953 B2 | 7/2014 | Kasower |
| 8,782,217 B1 | 7/2014 | Arone et al. |
| 8,782,753 B2 | 7/2014 | Lunt |
| 8,793,166 B2 | 7/2014 | Mizhen |
| 8,793,777 B2 | 7/2014 | Colson |
| 8,800,005 B2 | 8/2014 | Lunt |
| 8,806,218 B2 | 8/2014 | Hatakeda |
| 8,806,584 B2 | 8/2014 | Lunt |
| 8,818,888 B1 | 8/2014 | Kapczynski et al. |
| 8,826,393 B2 | 9/2014 | Eisen |
| 8,856,894 B1 | 10/2014 | Dean et al. |
| 8,862,514 B2 | 10/2014 | Eisen |
| 8,930,251 B2 | 1/2015 | DeBie |
| 8,930,262 B1 | 1/2015 | Searson et al. |
| 8,931,058 B2 | 1/2015 | DiChiara et al. |
| 8,949,981 B1 | 2/2015 | Trollope et al. |
| 8,954,459 B1 | 2/2015 | McMillan et al. |
| 8,966,649 B2 | 2/2015 | Stack et al. |
| 8,972,400 B1 | 3/2015 | Kapczynski et al. |
| 9,043,930 B2 | 5/2015 | Britti et al. |
| 9,058,627 B1 | 6/2015 | Wasser et al. |
| 9,100,400 B2 | 8/2015 | Lunt |
| 9,106,691 B1 | 8/2015 | Burger et al. |
| 9,147,042 B1 * | 9/2015 | Haller .................. G06F 19/328 |
| 9,152,727 B1 | 10/2015 | Balducci et al. |
| 9,183,363 B1 | 11/2015 | Millwee |
| 9,196,004 B2 | 11/2015 | Eisen |
| 9,251,541 B2 | 2/2016 | Celka et al. |
| 9,256,904 B1 | 2/2016 | Haller et al. |
| 9,268,803 B2 | 2/2016 | Kapochunas et al. |
| 9,342,783 B1 | 5/2016 | Chang et al. |
| 9,361,597 B2 | 6/2016 | Britton et al. |
| 9,380,057 B2 | 6/2016 | Knauss |
| 9,390,384 B2 | 7/2016 | Eisen |
| 9,489,694 B2 | 11/2016 | Haller et al. |
| 9,529,851 B1 | 12/2016 | Smith |
| 2001/0000536 A1 | 4/2001 | Tarin |
| 2001/0011247 A1 | 8/2001 | O'Flaherty et al. |
| 2001/0014868 A1 | 8/2001 | Herz et al. |
| 2001/0029470 A1 | 10/2001 | Schultz et al. |
| 2001/0029482 A1 | 10/2001 | Tealdi et al. |
| 2001/0034618 A1 | 10/2001 | Kessler et al. |
| 2001/0037332 A1 | 11/2001 | Miller et al. |
| 2001/0039523 A1 | 11/2001 | Iwamoto |
| 2001/0039532 A1 | 11/2001 | Coleman, Jr. et al. |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0049274 A1 | 12/2001 | Degraeve |
| 2001/0049620 A1 | 12/2001 | Blasko |
| 2002/0004736 A1 | 1/2002 | Roundtree et al. |
| 2002/0004774 A1 | 1/2002 | Defarlo |
| 2002/0010594 A1 | 1/2002 | Levine |
| 2002/0010664 A1 | 1/2002 | Rabideau et al. |
| 2002/0010701 A1 | 1/2002 | Kosciuszko |
| 2002/0013827 A1 | 1/2002 | Edstrom et al. |
| 2002/0013899 A1 | 1/2002 | Faul |
| 2002/0026507 A1 | 2/2002 | Sears et al. |
| 2002/0026519 A1 | 2/2002 | Itabashi et al. |
| 2002/0032635 A1 | 3/2002 | Harris et al. |
| 2002/0033846 A1 | 3/2002 | Balasubramanian et al. |
| 2002/0042763 A1 | 4/2002 | Pillay et al. |
| 2002/0045154 A1 | 4/2002 | Wood et al. |
| 2002/0049701 A1 | 4/2002 | Nabe et al. |
| 2002/0049738 A1 | 4/2002 | Epstein |
| 2002/0052841 A1 | 5/2002 | Guthrie et al. |
| 2002/0052884 A1 | 5/2002 | Farber et al. |
| 2002/0055869 A1 | 5/2002 | Hegg |
| 2002/0059201 A1 | 5/2002 | Work |
| 2002/0069122 A1 | 6/2002 | Yun et al. |
| 2002/0077964 A1 | 6/2002 | Brody et al. |
| 2002/0087460 A1 | 7/2002 | Hornung |
| 2002/0091650 A1 | 7/2002 | Ellis |
| 2002/0091706 A1 | 7/2002 | Anderson et al. |
| 2002/0099628 A1 | 7/2002 | Takaoka et al. |
| 2002/0099635 A1 | 7/2002 | Guiragosian |
| 2002/0099641 A1 | 7/2002 | Mills et al. |
| 2002/0099824 A1 | 7/2002 | Bender et al. |
| 2002/0099936 A1 | 7/2002 | Kou et al. |
| 2002/0103809 A1 | 8/2002 | Starzl et al. |

(56) References Cited

U.S. PATENT DOCUMENTS

| | | |
|---|---|---|
| 2002/0103933 A1 | 8/2002 | Garon et al. |
| 2002/0107849 A1 | 8/2002 | Hickey et al. |
| 2002/0111816 A1 | 8/2002 | Lortscher et al. |
| 2002/0111910 A1 | 8/2002 | Walsh |
| 2002/0119824 A1 | 8/2002 | Allen |
| 2002/0120537 A1 | 8/2002 | Morea et al. |
| 2002/0120757 A1 | 8/2002 | Sutherland et al. |
| 2002/0120846 A1 | 8/2002 | Stewart et al. |
| 2002/0128962 A1 | 9/2002 | Kasower |
| 2002/0131565 A1 | 9/2002 | Scheuring et al. |
| 2002/0133365 A1 | 9/2002 | Grey et al. |
| 2002/0133462 A1 | 9/2002 | Shteyn |
| 2002/0133503 A1 | 9/2002 | Amar et al. |
| 2002/0133504 A1 | 9/2002 | Vlahos et al. |
| 2002/0138297 A1 | 9/2002 | Lee |
| 2002/0138333 A1 | 9/2002 | DeCotiis et al. |
| 2002/0138334 A1 | 9/2002 | DeCotiis et al. |
| 2002/0138470 A1 | 9/2002 | Zhou |
| 2002/0143943 A1 | 10/2002 | Lee et al. |
| 2002/0147617 A1 | 10/2002 | Schoenbaum et al. |
| 2002/0147669 A1 | 10/2002 | Taylor et al. |
| 2002/0147801 A1 | 10/2002 | Gullotta et al. |
| 2002/0152166 A1 | 10/2002 | Dutta et al. |
| 2002/0156676 A1 | 10/2002 | Ahrens et al. |
| 2002/0156797 A1 | 10/2002 | Lee et al. |
| 2002/0157029 A1 | 10/2002 | French et al. |
| 2002/0161496 A1 | 10/2002 | Yamaki |
| 2002/0161664 A1 | 10/2002 | Shaya et al. |
| 2002/0165757 A1 | 11/2002 | Lisser |
| 2002/0169747 A1 | 11/2002 | Chapman et al. |
| 2002/0173984 A1 | 11/2002 | Robertson et al. |
| 2002/0173994 A1 | 11/2002 | Ferguson, III |
| 2002/0184054 A1 | 12/2002 | Cox et al. |
| 2002/0184255 A1 | 12/2002 | Edd et al. |
| 2002/0188478 A1 | 12/2002 | Breeland et al. |
| 2002/0188544 A1 | 12/2002 | Wizon et al. |
| 2002/0194103 A1 | 12/2002 | Nabe |
| 2002/0194120 A1 | 12/2002 | Russell et al. |
| 2002/0198800 A1 | 12/2002 | Shamrakov |
| 2002/0198806 A1 | 12/2002 | Blagg et al. |
| 2002/0198824 A1 | 12/2002 | Cook |
| 2003/0002671 A1 | 1/2003 | Inchalik et al. |
| 2003/0009418 A1 | 1/2003 | Green et al. |
| 2003/0009426 A1 | 1/2003 | Ruiz-Sanchez |
| 2003/0014336 A1 | 1/2003 | Dao et al. |
| 2003/0018549 A1 | 1/2003 | Fei et al. |
| 2003/0018578 A1 | 1/2003 | Schultz |
| 2003/0023531 A1 | 1/2003 | Fergusson |
| 2003/0028402 A1 | 2/2003 | Ulrich et al. |
| 2003/0036926 A1 | 2/2003 | Starkey et al. |
| 2003/0037054 A1 | 2/2003 | Dutta et al. |
| 2003/0041019 A1 | 2/2003 | Vagim, III et al. |
| 2003/0041031 A1 | 2/2003 | Hedy |
| 2003/0041050 A1 | 2/2003 | Smith et al. |
| 2003/0046112 A1 | 3/2003 | Dutta et al. |
| 2003/0046311 A1 | 3/2003 | Baidya et al. |
| 2003/0050795 A1 | 3/2003 | Baldwin, Jr. et al. |
| 2003/0050796 A1 | 3/2003 | Baldwin, Jr. et al. |
| 2003/0050882 A1 | 3/2003 | Degen et al. |
| 2003/0055931 A1 | 3/2003 | Cravo De Almeida et al. |
| 2003/0061163 A1 | 3/2003 | Durfield |
| 2003/0065563 A1 | 4/2003 | Elliott et al. |
| 2003/0069839 A1 | 4/2003 | Whittington et al. |
| 2003/0069943 A1 | 4/2003 | Bahrs et al. |
| 2003/0078877 A1 | 4/2003 | Beirne et al. |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0101344 A1 | 5/2003 | Wheeler et al. |
| 2003/0105710 A1 | 6/2003 | Barbara et al. |
| 2003/0105728 A1 | 6/2003 | Yano et al. |
| 2003/0105733 A1 | 6/2003 | Boreham |
| 2003/0105742 A1 | 6/2003 | Boreham et al. |
| 2003/0110111 A1 | 6/2003 | Nalebuff et al. |
| 2003/0115133 A1 | 6/2003 | Bian |
| 2003/0153299 A1 | 8/2003 | Perfit et al. |
| 2003/0154162 A1 | 8/2003 | Danaher et al. |
| 2003/0158749 A1 | 8/2003 | Olchanski et al. |
| 2003/0158776 A1 | 8/2003 | Landesmann |
| 2003/0158960 A1 | 8/2003 | Engberg |
| 2003/0163416 A1 | 8/2003 | Kitajima |
| 2003/0163483 A1 | 8/2003 | Zingher et al. |
| 2003/0163513 A1 | 8/2003 | Schaeck et al. |
| 2003/0163733 A1 | 8/2003 | Barriga-Caceres et al. |
| 2003/0171942 A1 | 9/2003 | Gaito |
| 2003/0177028 A1 | 9/2003 | Cooper et al. |
| 2003/0182214 A1 | 9/2003 | Taylor |
| 2003/0187837 A1 | 10/2003 | Culliss |
| 2003/0191731 A1 | 10/2003 | Stewart et al. |
| 2003/0195859 A1 | 10/2003 | Lawrence |
| 2003/0200151 A1 | 10/2003 | Ellenson et al. |
| 2003/0204429 A1 | 10/2003 | Botscheck et al. |
| 2003/0204752 A1 | 10/2003 | Garrison |
| 2003/0208412 A1 | 11/2003 | Hillestad et al. |
| 2003/0212654 A1 | 11/2003 | Harper et al. |
| 2003/0220858 A1 | 11/2003 | Lam et al. |
| 2003/0229507 A1 | 12/2003 | Perge |
| 2003/0229892 A1 | 12/2003 | Sardera |
| 2003/0233259 A1 | 12/2003 | Mistretta et al. |
| 2004/0006488 A1 | 1/2004 | Fitall et al. |
| 2004/0010443 A1 | 1/2004 | May et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019518 A1 | 1/2004 | Abraham et al. |
| 2004/0019549 A1 | 1/2004 | Gulbrandsen |
| 2004/0019799 A1 | 1/2004 | Vering et al. |
| 2004/0023637 A1 | 2/2004 | Johnson et al. |
| 2004/0024671 A1 | 2/2004 | Freund |
| 2004/0024709 A1 | 2/2004 | Yu et al. |
| 2004/0030629 A1 | 2/2004 | Freeman et al. |
| 2004/0030649 A1 | 2/2004 | Nelson et al. |
| 2004/0039586 A1 | 2/2004 | Garvey et al. |
| 2004/0039688 A1 | 2/2004 | Sulkowski et al. |
| 2004/0044563 A1 | 3/2004 | Stein |
| 2004/0044628 A1 | 3/2004 | Mathew et al. |
| 2004/0044673 A1 | 3/2004 | Brady et al. |
| 2004/0044739 A1 | 3/2004 | Ziegler |
| 2004/0049473 A1 | 3/2004 | Gower et al. |
| 2004/0054619 A1 | 3/2004 | Watson et al. |
| 2004/0064402 A1 | 4/2004 | Dreyer et al. |
| 2004/0073456 A1 | 4/2004 | Gottlieb et al. |
| 2004/0078323 A1 | 4/2004 | Johnston et al. |
| 2004/0078324 A1 | 4/2004 | Lonnberg et al. |
| 2004/0083159 A1 | 4/2004 | Crosby et al. |
| 2004/0083215 A1 | 4/2004 | de Jong |
| 2004/0088237 A1 | 5/2004 | Moenickheim et al. |
| 2004/0088255 A1 | 5/2004 | Zielke et al. |
| 2004/0098625 A1 | 5/2004 | Lagadec et al. |
| 2004/0103147 A1 | 5/2004 | Flesher et al. |
| 2004/0107250 A1 | 6/2004 | Marciano |
| 2004/0110119 A1 | 6/2004 | Riconda et al. |
| 2004/0111305 A1 | 6/2004 | Gavan et al. |
| 2004/0111359 A1 | 6/2004 | Hudock |
| 2004/0111375 A1 | 6/2004 | Johnson |
| 2004/0117235 A1 | 6/2004 | Shacham |
| 2004/0117302 A1 | 6/2004 | Weichert et al. |
| 2004/0117358 A1 | 6/2004 | Von Kaenel et al. |
| 2004/0122681 A1 | 6/2004 | Ruvolo et al. |
| 2004/0122696 A1 | 6/2004 | Beringer |
| 2004/0123162 A1 | 6/2004 | Antell et al. |
| 2004/0128150 A1 | 7/2004 | Lundegren |
| 2004/0128156 A1 | 7/2004 | Beringer et al. |
| 2004/0128230 A1 | 7/2004 | Oppenheimer et al. |
| 2004/0128236 A1 | 7/2004 | Brown et al. |
| 2004/0133440 A1 | 7/2004 | Carolan et al. |
| 2004/0133509 A1 | 7/2004 | McCoy et al. |
| 2004/0133513 A1 | 7/2004 | McCoy et al. |
| 2004/0133515 A1 | 7/2004 | McCoy et al. |
| 2004/0138994 A1 | 7/2004 | DeFrancesco et al. |
| 2004/0139025 A1 | 7/2004 | Coleman |
| 2004/0141005 A1 | 7/2004 | Banatwala et al. |
| 2004/0143546 A1 | 7/2004 | Wood et al. |
| 2004/0143596 A1 | 7/2004 | Sirkin |

(56) References Cited

U.S. PATENT DOCUMENTS

| | | |
|---|---|---|
| 2004/0153330 A1 | 8/2004 | Miller et al. |
| 2004/0153437 A1 | 8/2004 | Buchan |
| 2004/0153448 A1 | 8/2004 | Cheng et al. |
| 2004/0153521 A1 | 8/2004 | Kogo |
| 2004/0158523 A1 | 8/2004 | Dort |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0176995 A1 | 9/2004 | Fusz |
| 2004/0177030 A1 | 9/2004 | Shoham |
| 2004/0177035 A1 | 9/2004 | Silva |
| 2004/0177114 A1 | 9/2004 | Friedman et al. |
| 2004/0193538 A1 | 9/2004 | Raines |
| 2004/0193891 A1 | 9/2004 | Ollila |
| 2004/0199456 A1 | 10/2004 | Flint et al. |
| 2004/0199458 A1 | 10/2004 | Ho |
| 2004/0199462 A1 | 10/2004 | Starrs |
| 2004/0199789 A1 | 10/2004 | Shaw et al. |
| 2004/0204948 A1 | 10/2004 | Singletary et al. |
| 2004/0210661 A1 | 10/2004 | Thompson |
| 2004/0215553 A1 | 10/2004 | Gang et al. |
| 2004/0215554 A1 | 10/2004 | Kemper et al. |
| 2004/0215555 A1 | 10/2004 | Kemper et al. |
| 2004/0215556 A1 | 10/2004 | Merkley, Jr. et al. |
| 2004/0215584 A1 | 10/2004 | Yao |
| 2004/0220865 A1 | 11/2004 | Lozowski et al. |
| 2004/0220896 A1 | 11/2004 | Finlay et al. |
| 2004/0220918 A1 | 11/2004 | Scriffignano et al. |
| 2004/0221043 A1 | 11/2004 | Su et al. |
| 2004/0225099 A1 | 11/2004 | Hohberg et al. |
| 2004/0225545 A1 | 11/2004 | Turner et al. |
| 2004/0225594 A1 | 11/2004 | Nolan, III et al. |
| 2004/0225596 A1 | 11/2004 | Kemper et al. |
| 2004/0225597 A1 | 11/2004 | Oppenheimer et al. |
| 2004/0225643 A1 | 11/2004 | Alpha et al. |
| 2004/0230527 A1 | 11/2004 | Hansen et al. |
| 2004/0230534 A1 | 11/2004 | McGough |
| 2004/0236688 A1 | 11/2004 | Bozeman |
| 2004/0243450 A1 | 12/2004 | Bernard, Jr. et al. |
| 2004/0243518 A1 | 12/2004 | Clifton et al. |
| 2004/0243588 A1 | 12/2004 | Tanner et al. |
| 2004/0243832 A1 | 12/2004 | Wilf et al. |
| 2004/0249811 A1 | 12/2004 | Shostack |
| 2004/0250107 A1 | 12/2004 | Guo |
| 2004/0254935 A1 | 12/2004 | Chagoly et al. |
| 2004/0255127 A1 | 12/2004 | Arnouse |
| 2004/0267660 A1 | 12/2004 | Greenwood et al. |
| 2004/0267714 A1 | 12/2004 | Frid et al. |
| 2005/0004855 A1 | 1/2005 | Jenson et al. |
| 2005/0004870 A1 | 1/2005 | McGaughey |
| 2005/0005168 A1 | 1/2005 | Dick |
| 2005/0010513 A1 | 1/2005 | Duckworth et al. |
| 2005/0010555 A1 | 1/2005 | Gallivan |
| 2005/0021476 A1 | 1/2005 | Candella et al. |
| 2005/0021551 A1 | 1/2005 | Silva et al. |
| 2005/0027633 A1 | 2/2005 | Fortuna et al. |
| 2005/0027983 A1 | 2/2005 | Klawon |
| 2005/0027995 A1 | 2/2005 | Menschik et al. |
| 2005/0038737 A1 | 2/2005 | Norris |
| 2005/0049991 A1 | 3/2005 | Aggarwal |
| 2005/0055231 A1 | 3/2005 | Lee |
| 2005/0055275 A1 | 3/2005 | Newman et al. |
| 2005/0058262 A1 | 3/2005 | Timmins et al. |
| 2005/0060332 A1 | 3/2005 | Bernstein et al. |
| 2005/0065874 A1 | 3/2005 | Lefner et al. |
| 2005/0071328 A1 | 3/2005 | Lawrence |
| 2005/0086071 A1 | 4/2005 | Fox, Jr. et al. |
| 2005/0086072 A1 | 4/2005 | Fox, Jr. et al. |
| 2005/0086126 A1 | 4/2005 | Patterson |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0102206 A1 | 5/2005 | Savasoglu et al. |
| 2005/0105719 A1 | 5/2005 | Huda |
| 2005/0108396 A1 | 5/2005 | Bittner |
| 2005/0108631 A1 | 5/2005 | Amorin et al. |
| 2005/0113991 A1 | 5/2005 | Rogers et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0119978 A1 | 6/2005 | Ates |
| 2005/0125291 A1 | 6/2005 | Demkiw Grayson et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0137912 A1 | 6/2005 | Rao et al. |
| 2005/0144452 A1 | 6/2005 | Lynch et al. |
| 2005/0154617 A1 | 7/2005 | Ruggieri et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0166262 A1 | 7/2005 | Beattie et al. |
| 2005/0171884 A1 | 8/2005 | Arnott |
| 2005/0187948 A1 | 8/2005 | Monitzer et al. |
| 2005/0192008 A1 | 9/2005 | Desai et al. |
| 2005/0197953 A1 | 9/2005 | Broadbent et al. |
| 2005/0197954 A1 | 9/2005 | Maitland et al. |
| 2005/0208461 A1 | 9/2005 | Krebs et al. |
| 2005/0209880 A1 | 9/2005 | Drelicharz et al. |
| 2005/0209922 A1 | 9/2005 | Hofmeister |
| 2005/0216434 A1 | 9/2005 | Haveliwala et al. |
| 2005/0216582 A1 | 9/2005 | Toomey et al. |
| 2005/0216955 A1 | 9/2005 | Wilkins et al. |
| 2005/0226224 A1 | 10/2005 | Lee et al. |
| 2005/0228748 A1 | 10/2005 | Togher et al. |
| 2005/0240578 A1 | 10/2005 | Biederman et al. |
| 2005/0246338 A1 | 11/2005 | Bird |
| 2005/0251474 A1 | 11/2005 | Shinn et al. |
| 2005/0256809 A1 | 11/2005 | Sadri |
| 2005/0257250 A1 | 11/2005 | Mitchell et al. |
| 2005/0262158 A1 | 11/2005 | Sauermann |
| 2005/0267840 A1 | 12/2005 | Holm-Blagg et al. |
| 2005/0273431 A1 | 12/2005 | Abel et al. |
| 2005/0273442 A1 | 12/2005 | Bennett et al. |
| 2005/0273849 A1 | 12/2005 | Araujo et al. |
| 2005/0279827 A1 | 12/2005 | Mascavage et al. |
| 2005/0288998 A1 | 12/2005 | Verma et al. |
| 2005/0289003 A1 | 12/2005 | Thompson et al. |
| 2006/0004623 A1 | 1/2006 | Jasti |
| 2006/0004626 A1 | 1/2006 | Holmen et al. |
| 2006/0010391 A1 | 1/2006 | Uemura et al. |
| 2006/0010487 A1 | 1/2006 | Fierer et al. |
| 2006/0014129 A1 | 1/2006 | Coleman et al. |
| 2006/0015425 A1 | 1/2006 | Brooks |
| 2006/0016107 A1 | 1/2006 | Davis |
| 2006/0020611 A1 | 1/2006 | Gilbert et al. |
| 2006/0029107 A1 | 2/2006 | McCullough et al. |
| 2006/0031158 A1 | 2/2006 | Orman |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0036870 A1 | 2/2006 | Dasari et al. |
| 2006/0041443 A1 | 2/2006 | Horvath |
| 2006/0041464 A1 | 2/2006 | Powers et al. |
| 2006/0041670 A1 | 2/2006 | Musseleck et al. |
| 2006/0059073 A1 | 3/2006 | Walzak |
| 2006/0059086 A1 | 3/2006 | Mulhern |
| 2006/0059110 A1 | 3/2006 | Madhok et al. |
| 2006/0059362 A1 | 3/2006 | Paden et al. |
| 2006/0069635 A1* | 3/2006 | Ram .................. G06Q 30/08 705/37 |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080139 A1 | 4/2006 | Mainzer |
| 2006/0080230 A1 | 4/2006 | Freiberg |
| 2006/0080233 A1 | 4/2006 | Mendelovich et al. |
| 2006/0080251 A1 | 4/2006 | Fried et al. |
| 2006/0080263 A1 | 4/2006 | Willis et al. |
| 2006/0085334 A1 | 4/2006 | Murphy |
| 2006/0085361 A1 | 4/2006 | Hoerle et al. |
| 2006/0085454 A1 | 4/2006 | Blegen et al. |

(56) References Cited

U.S. PATENT DOCUMENTS

| | | |
|---|---|---|
| 2006/0089842 A1 | 4/2006 | Medawar |
| 2006/0095363 A1 | 5/2006 | May |
| 2006/0100944 A1 | 5/2006 | Reddin et al. |
| 2006/0100954 A1 | 5/2006 | Schoen |
| 2006/0101508 A1 | 5/2006 | Taylor |
| 2006/0106670 A1 | 5/2006 | Cai et al. |
| 2006/0122921 A1 | 6/2006 | Comerford et al. |
| 2006/0123461 A1 | 6/2006 | Lunt et al. |
| 2006/0129419 A1 | 6/2006 | Flaxer et al. |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136330 A1 | 6/2006 | DeRoy et al. |
| 2006/0136595 A1 | 6/2006 | Satyavolu |
| 2006/0149674 A1 | 7/2006 | Cook et al. |
| 2006/0155573 A1 | 7/2006 | Hartunian |
| 2006/0155639 A1 | 7/2006 | Lynch et al. |
| 2006/0155780 A1 | 7/2006 | Sakairi et al. |
| 2006/0161435 A1 | 7/2006 | Atef et al. |
| 2006/0161554 A1 | 7/2006 | Lucovsky et al. |
| 2006/0173772 A1 | 8/2006 | Hayes et al. |
| 2006/0173776 A1 | 8/2006 | Shalley et al. |
| 2006/0173792 A1 | 8/2006 | Glass |
| 2006/0177226 A1 | 8/2006 | Ellis, III |
| 2006/0178971 A1 | 8/2006 | Owen et al. |
| 2006/0178983 A1 | 8/2006 | Nice et al. |
| 2006/0179050 A1 | 8/2006 | Giang et al. |
| 2006/0184410 A1 | 8/2006 | Ramamurthy et al. |
| 2006/0184440 A1 | 8/2006 | Britti et al. |
| 2006/0184585 A1 | 8/2006 | Grear et al. |
| 2006/0195351 A1 | 8/2006 | Bayburtian |
| 2006/0195688 A1 | 8/2006 | Drissi et al. |
| 2006/0202012 A1 | 9/2006 | Grano et al. |
| 2006/0204051 A1 | 9/2006 | Holland, IV |
| 2006/0212407 A1 | 9/2006 | Lyon |
| 2006/0218407 A1 | 9/2006 | Toms |
| 2006/0229799 A1 | 10/2006 | Nimmo et al. |
| 2006/0229943 A1 | 10/2006 | Mathias et al. |
| 2006/0229961 A1 | 10/2006 | Lyftogt et al. |
| 2006/0235743 A1 | 10/2006 | Long et al. |
| 2006/0235935 A1 | 10/2006 | Ng |
| 2006/0239512 A1 | 10/2006 | Petrillo |
| 2006/0242046 A1 | 10/2006 | Haggerty et al. |
| 2006/0242047 A1 | 10/2006 | Haggerty et al. |
| 2006/0242048 A1 | 10/2006 | Haggerty et al. |
| 2006/0253358 A1 | 11/2006 | Delgrosso et al. |
| 2006/0262929 A1 | 11/2006 | Vatanen et al. |
| 2006/0265243 A1 | 11/2006 | Racho et al. |
| 2006/0267999 A1 | 11/2006 | Cash et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0276171 A1 | 12/2006 | Pousti |
| 2006/0277089 A1 | 12/2006 | Hubbard et al. |
| 2006/0277092 A1 | 12/2006 | Williams |
| 2006/0277141 A1 | 12/2006 | Palmer |
| 2006/0282359 A1 | 12/2006 | Nobili et al. |
| 2006/0282429 A1 | 12/2006 | Hernandez-Sherrington et al. |
| 2006/0282660 A1 | 12/2006 | Varghese et al. |
| 2006/0282819 A1 | 12/2006 | Graham et al. |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0293932 A1 | 12/2006 | Cash et al. |
| 2006/0293979 A1 | 12/2006 | Cash et al. |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0011020 A1 | 1/2007 | Martin |
| 2007/0011083 A1 | 1/2007 | Bird et al. |
| 2007/0016500 A1 | 1/2007 | Chatterji et al. |
| 2007/0016520 A1 | 1/2007 | Gang et al. |
| 2007/0022141 A1 | 1/2007 | Singleton et al. |
| 2007/0022297 A1 | 1/2007 | Britti et al. |
| 2007/0027778 A1 | 2/2007 | Schellhammer et al. |
| 2007/0027816 A1 | 2/2007 | Writer |
| 2007/0030282 A1 | 2/2007 | Cash et al. |
| 2007/0032240 A1 | 2/2007 | Finnegan et al. |
| 2007/0038483 A1 | 2/2007 | Wood |
| 2007/0038497 A1 | 2/2007 | Britti et al. |
| 2007/0038568 A1 | 2/2007 | Greene et al. |
| 2007/0043577 A1 | 2/2007 | Kasower |
| 2007/0043654 A1 | 2/2007 | Libman |
| 2007/0047714 A1 | 3/2007 | Baniak et al. |
| 2007/0055621 A1 | 3/2007 | Tischler et al. |
| 2007/0067207 A1 | 3/2007 | Haggerty et al. |
| 2007/0067285 A1 | 3/2007 | Blume et al. |
| 2007/0067297 A1 | 3/2007 | Kublickis |
| 2007/0067437 A1 | 3/2007 | Sindambiwe |
| 2007/0072190 A1 | 3/2007 | Aggarwal |
| 2007/0073889 A1 | 3/2007 | Morris |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0083463 A1 | 4/2007 | Kraft |
| 2007/0093234 A1 | 4/2007 | Willis et al. |
| 2007/0094137 A1 | 4/2007 | Phillips et al. |
| 2007/0094230 A1 | 4/2007 | Subramaniam et al. |
| 2007/0094241 A1 | 4/2007 | Blackwell et al. |
| 2007/0094264 A1 | 4/2007 | Nair |
| 2007/0106582 A1 | 5/2007 | Baker et al. |
| 2007/0112667 A1 | 5/2007 | Rucker |
| 2007/0112668 A1 | 5/2007 | Celano et al. |
| 2007/0118393 A1 | 5/2007 | Rosen et al. |
| 2007/0118410 A1 | 5/2007 | Nadai |
| 2007/0121843 A1 | 5/2007 | Atazky et al. |
| 2007/0124235 A1 | 5/2007 | Chakraborty et al. |
| 2007/0124256 A1 | 5/2007 | Crooks et al. |
| 2007/0130070 A1 | 6/2007 | Williams |
| 2007/0156554 A1 | 7/2007 | Nikoley et al. |
| 2007/0156589 A1 | 7/2007 | Zimler et al. |
| 2007/0156692 A1 | 7/2007 | Rosewarne |
| 2007/0162414 A1 | 7/2007 | Horowitz et al. |
| 2007/0168246 A1 | 7/2007 | Haggerty et al. |
| 2007/0174186 A1 | 7/2007 | Hokland |
| 2007/0174448 A1 | 7/2007 | Ahuja et al. |
| 2007/0174903 A1 | 7/2007 | Greff |
| 2007/0185797 A1 | 8/2007 | Robinson |
| 2007/0192121 A1 | 8/2007 | Routson et al. |
| 2007/0192122 A1 | 8/2007 | Routson et al. |
| 2007/0198336 A1 | 8/2007 | Thompson |
| 2007/0198407 A1 | 8/2007 | Winter |
| 2007/0198432 A1 | 8/2007 | Pitroda et al. |
| 2007/0204338 A1 | 8/2007 | Aiello et al. |
| 2007/0205266 A1 | 9/2007 | Carr et al. |
| 2007/0208640 A1 | 9/2007 | Banasiak et al. |
| 2007/0214000 A1 | 9/2007 | Shahrabi et al. |
| 2007/0220611 A1 | 9/2007 | Socolow et al. |
| 2007/0226010 A1 | 9/2007 | Larsen |
| 2007/0226047 A1 | 9/2007 | Ward |
| 2007/0226093 A1 | 9/2007 | Chan et al. |
| 2007/0226122 A1 | 9/2007 | Burrell et al. |
| 2007/0226129 A1 | 9/2007 | Liao et al. |
| 2007/0240206 A1 | 10/2007 | Wu et al. |
| 2007/0244782 A1 | 10/2007 | Chimento |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0250459 A1 | 10/2007 | Schwarz et al. |
| 2007/0255654 A1 | 11/2007 | Whipple et al. |
| 2007/0255655 A1 | 11/2007 | Kemper et al. |
| 2007/0258626 A1 | 11/2007 | Reiner |
| 2007/0261114 A1 | 11/2007 | Pomerantsev |
| 2007/0262137 A1 | 11/2007 | Brown |
| 2007/0262140 A1 | 11/2007 | Long, Sr. |
| 2007/0266439 A1 | 11/2007 | Kraft |
| 2007/0279187 A1 | 12/2007 | Hekmatpour et al. |
| 2007/0282730 A1 | 12/2007 | Carpenter et al. |
| 2007/0282736 A1 | 12/2007 | Conlin et al. |
| 2007/0282743 A1 | 12/2007 | Lovelett |
| 2007/0284433 A1 | 12/2007 | Domenica et al. |
| 2007/0288355 A1 | 12/2007 | Roland et al. |

(56) References Cited

U.S. PATENT DOCUMENTS

| | | |
|---|---|---|
| 2007/0288360 A1 | 12/2007 | Seeklus |
| 2007/0294195 A1 | 12/2007 | Curry et al. |
| 2007/0294431 A1 | 12/2007 | Adelman et al. |
| 2007/0299699 A1 | 12/2007 | Policelli et al. |
| 2007/0299759 A1 | 12/2007 | Kelly |
| 2008/0010203 A1 | 1/2008 | Grant |
| 2008/0010206 A1 | 1/2008 | Coleman |
| 2008/0010687 A1 | 1/2008 | Gonen et al. |
| 2008/0015979 A1 | 1/2008 | Bentley |
| 2008/0021804 A1 | 1/2008 | Deckoff |
| 2008/0027858 A1 | 1/2008 | Benson |
| 2008/0028446 A1 | 1/2008 | Burgoyne |
| 2008/0033742 A1 | 2/2008 | Bernasconi |
| 2008/0033956 A1 | 2/2008 | Saha et al. |
| 2008/0040610 A1 | 2/2008 | Fergusson |
| 2008/0046351 A1 | 2/2008 | Wiener et al. |
| 2008/0047017 A1 | 2/2008 | Renaud |
| 2008/0052182 A1 | 2/2008 | Marshall |
| 2008/0052244 A1 | 2/2008 | Tsuei et al. |
| 2008/0059224 A1 | 3/2008 | Schechter |
| 2008/0059317 A1 | 3/2008 | Chandran et al. |
| 2008/0059352 A1 | 3/2008 | Chandran |
| 2008/0059364 A1 | 3/2008 | Tidwell et al. |
| 2008/0059449 A1 | 3/2008 | Webster et al. |
| 2008/0065569 A1 | 3/2008 | Dutt et al. |
| 2008/0066188 A1 | 3/2008 | Kwak |
| 2008/0071682 A1 | 3/2008 | Dominguez |
| 2008/0072316 A1 | 3/2008 | Chang et al. |
| 2008/0077526 A1 | 3/2008 | Arumugam |
| 2008/0082536 A1 | 4/2008 | Schwabe et al. |
| 2008/0083021 A1 | 4/2008 | Doane et al. |
| 2008/0086400 A1 | 4/2008 | Ardelean et al. |
| 2008/0086431 A1 | 4/2008 | Robinson et al. |
| 2008/0086759 A1 | 4/2008 | Colson |
| 2008/0091519 A1 | 4/2008 | Foss |
| 2008/0091530 A1 | 4/2008 | Egnatios et al. |
| 2008/0097768 A1 | 4/2008 | Godshalk |
| 2008/0103800 A1 | 5/2008 | Domenikos et al. |
| 2008/0103959 A1 | 5/2008 | Carroll et al. |
| 2008/0103972 A1 | 5/2008 | Lanc |
| 2008/0104672 A1 | 5/2008 | Lunde |
| 2008/0109315 A1 | 5/2008 | Huang et al. |
| 2008/0109422 A1 | 5/2008 | Dedhia |
| 2008/0109740 A1 | 5/2008 | Prinsen et al. |
| 2008/0109875 A1 | 5/2008 | Kraft |
| 2008/0114670 A1 | 5/2008 | Friesen |
| 2008/0115191 A1 | 5/2008 | Kim et al. |
| 2008/0115226 A1 | 5/2008 | Welingkar et al. |
| 2008/0120133 A1 | 5/2008 | Krishnaswami et al. |
| 2008/0120569 A1 | 5/2008 | Mann et al. |
| 2008/0120716 A1 | 5/2008 | Hall et al. |
| 2008/0126233 A1 | 5/2008 | Hogan |
| 2008/0133325 A1 | 6/2008 | De et al. |
| 2008/0141346 A1 | 6/2008 | Kay et al. |
| 2008/0148368 A1 | 6/2008 | Zurko et al. |
| 2008/0154758 A1 | 6/2008 | Schattmaier et al. |
| 2008/0154766 A1 | 6/2008 | Lewis et al. |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0172324 A1 | 7/2008 | Johnson |
| 2008/0175360 A1 | 7/2008 | Schwarz et al. |
| 2008/0177655 A1 | 7/2008 | Zalik |
| 2008/0183480 A1 | 7/2008 | Carlson et al. |
| 2008/0183504 A1 | 7/2008 | Highley |
| 2008/0183564 A1 | 7/2008 | Tien et al. |
| 2008/0183585 A1 | 7/2008 | Vianello |
| 2008/0184270 A1 | 7/2008 | Cole et al. |
| 2008/0189202 A1 | 8/2008 | Zadoorian et al. |
| 2008/0195548 A1 | 8/2008 | Chu et al. |
| 2008/0201257 A1 | 8/2008 | Lewis et al. |
| 2008/0201401 A1 | 8/2008 | Pugh et al. |
| 2008/0205655 A1 | 8/2008 | Wilkins et al. |
| 2008/0208610 A1 | 8/2008 | Thomas et al. |
| 2008/0208726 A1 | 8/2008 | Tsantes et al. |
| 2008/0208735 A1 | 8/2008 | Balet et al. |
| 2008/0208873 A1 | 8/2008 | Boehmer |
| 2008/0212845 A1 | 9/2008 | Lund |
| 2008/0215470 A1 | 9/2008 | Sengupta et al. |
| 2008/0221970 A1 | 9/2008 | Megdal et al. |
| 2008/0221972 A1 | 9/2008 | Megdal et al. |
| 2008/0222027 A1 | 9/2008 | Megdal et al. |
| 2008/0222706 A1 | 9/2008 | Renaud et al. |
| 2008/0228556 A1 | 9/2008 | Megdal et al. |
| 2008/0229415 A1 | 9/2008 | Kapoor et al. |
| 2008/0249869 A1 | 10/2008 | Angell et al. |
| 2008/0255922 A1 | 10/2008 | Feldman et al. |
| 2008/0255992 A1 | 10/2008 | Lin |
| 2008/0263058 A1 | 10/2008 | Peden |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0281737 A1 | 11/2008 | Fajardo |
| 2008/0288283 A1 | 11/2008 | Baldwin, Jr. et al. |
| 2008/0288299 A1 | 11/2008 | Schultz |
| 2008/0294501 A1 | 11/2008 | Rennich et al. |
| 2008/0294540 A1 | 11/2008 | Celka et al. |
| 2008/0301016 A1 | 12/2008 | Durvasula et al. |
| 2008/0301188 A1 | 12/2008 | O'Hara |
| 2008/0306750 A1 | 12/2008 | Wunder et al. |
| 2008/0312969 A1 | 12/2008 | Raines et al. |
| 2008/0319832 A1 | 12/2008 | Liebe |
| 2008/0319889 A1 | 12/2008 | Hammad |
| 2008/0320575 A1 | 12/2008 | Gelb et al. |
| 2009/0006230 A1 | 1/2009 | Lyda et al. |
| 2009/0006475 A1 | 1/2009 | Udezue et al. |
| 2009/0012889 A1 | 1/2009 | Finch |
| 2009/0018986 A1 | 1/2009 | Alcorn et al. |
| 2009/0018996 A1 | 1/2009 | Hunt et al. |
| 2009/0024428 A1 | 1/2009 | Hudock, Jr. |
| 2009/0024505 A1 | 1/2009 | Patel et al. |
| 2009/0030776 A1 | 1/2009 | Walker et al. |
| 2009/0031426 A1 | 1/2009 | Dal Lago et al. |
| 2009/0037332 A1 | 2/2009 | Cheung et al. |
| 2009/0043637 A1 | 2/2009 | Eder |
| 2009/0043691 A1 | 2/2009 | Kasower |
| 2009/0044279 A1 | 2/2009 | Crawford et al. |
| 2009/0048877 A1 | 2/2009 | Binns et al. |
| 2009/0055322 A1 | 2/2009 | Bykov et al. |
| 2009/0055894 A1 | 2/2009 | Lorsch |
| 2009/0060343 A1 | 3/2009 | Rosca |
| 2009/0064297 A1 | 3/2009 | Selgas et al. |
| 2009/0089190 A1 | 4/2009 | Girulat |
| 2009/0089205 A1 | 4/2009 | Bayne |
| 2009/0094237 A1 | 4/2009 | Churi et al. |
| 2009/0094674 A1 | 4/2009 | Schwartz et al. |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0112650 A1 | 4/2009 | Iwane |
| 2009/0113532 A1 | 4/2009 | Lapidous |
| 2009/0119169 A1 | 5/2009 | Chandratillake et al. |
| 2009/0119199 A1 | 5/2009 | Salahi |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0126013 A1 | 5/2009 | Atwood et al. |
| 2009/0132347 A1 | 5/2009 | Anderson et al. |
| 2009/0138335 A1 | 5/2009 | Lieberman |
| 2009/0144102 A1 | 6/2009 | Lopez |
| 2009/0144166 A1 | 6/2009 | Dickelman |
| 2009/0150166 A1 | 6/2009 | Leite et al. |
| 2009/0150238 A1 | 6/2009 | Marsh et al. |
| 2009/0157564 A1 | 6/2009 | Cross |
| 2009/0157693 A1 | 6/2009 | Palahnuk |
| 2009/0158030 A1 | 6/2009 | Rasti |
| 2009/0164232 A1 | 6/2009 | Chmielewski et al. |
| 2009/0164380 A1 | 6/2009 | Brown |
| 2009/0172788 A1 | 7/2009 | Veldula et al. |
| 2009/0172795 A1 | 7/2009 | Ritari et al. |
| 2009/0172815 A1 | 7/2009 | Gu et al. |
| 2009/0177529 A1 | 7/2009 | Hadi |
| 2009/0177562 A1 | 7/2009 | Peace et al. |

(56) References Cited

U.S. PATENT DOCUMENTS

| | | |
|---|---|---|
| 2009/0183259 A1 | 7/2009 | Rinek et al. |
| 2009/0198557 A1 | 8/2009 | Wang et al. |
| 2009/0198602 A1 | 8/2009 | Wang et al. |
| 2009/0199264 A1 | 8/2009 | Lang |
| 2009/0199294 A1 | 8/2009 | Schneider |
| 2009/0204514 A1 | 8/2009 | Bhogal et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0216640 A1 | 8/2009 | Masi |
| 2009/0222308 A1 | 9/2009 | Zoldi et al. |
| 2009/0222379 A1 | 9/2009 | Choudhuri et al. |
| 2009/0222380 A1 | 9/2009 | Choudhuri et al. |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0234876 A1 | 9/2009 | Schigel et al. |
| 2009/0240609 A1 | 9/2009 | Cho et al. |
| 2009/0240624 A1 | 9/2009 | James et al. |
| 2009/0247122 A1 | 10/2009 | Fitzgerald et al. |
| 2009/0248573 A1 | 10/2009 | Haggerty et al. |
| 2009/0249440 A1 | 10/2009 | Platt et al. |
| 2009/0254375 A1 | 10/2009 | Martinez et al. |
| 2009/0254476 A1 | 10/2009 | Sharma et al. |
| 2009/0254656 A1 | 10/2009 | Vignisson et al. |
| 2009/0254971 A1 | 10/2009 | Herz et al. |
| 2009/0260064 A1 | 10/2009 | Mcdowell et al. |
| 2009/0271248 A1 | 10/2009 | Sherman et al. |
| 2009/0271265 A1 | 10/2009 | Lay et al. |
| 2009/0276244 A1 | 11/2009 | Baldwin, Jr. et al. |
| 2009/0276368 A1 | 11/2009 | Martin et al. |
| 2009/0289110 A1 | 11/2009 | Regen et al. |
| 2009/0307778 A1 | 12/2009 | Mardikar |
| 2009/0313049 A1 | 12/2009 | Joao et al. |
| 2009/0313163 A1 | 12/2009 | Wang et al. |
| 2009/0313562 A1 | 12/2009 | Appleyard et al. |
| 2009/0327120 A1 | 12/2009 | Eze et al. |
| 2009/0327270 A1 | 12/2009 | Teevan et al. |
| 2009/0328173 A1 | 12/2009 | Jakobson et al. |
| 2010/0009663 A1 | 1/2010 | Chang |
| 2010/0010935 A1 | 1/2010 | Shelton |
| 2010/0011428 A1 | 1/2010 | Atwood et al. |
| 2010/0023434 A1 | 1/2010 | Bond |
| 2010/0023448 A1 | 1/2010 | Eze |
| 2010/0030578 A1 | 2/2010 | Siddique et al. |
| 2010/0030677 A1 | 2/2010 | Melik-Aslanian et al. |
| 2010/0042542 A1 | 2/2010 | Rose et al. |
| 2010/0042583 A1 | 2/2010 | Gervais |
| 2010/0043055 A1 | 2/2010 | Baumgart |
| 2010/0049803 A1 | 2/2010 | Ogilvie et al. |
| 2010/0063942 A1 | 3/2010 | Arnott et al. |
| 2010/0063993 A1 | 3/2010 | Higgins et al. |
| 2010/0077483 A1 | 3/2010 | Stolfo et al. |
| 2010/0083371 A1 | 4/2010 | Bennetts et al. |
| 2010/0094704 A1 | 4/2010 | Subramanian et al. |
| 2010/0094758 A1 | 4/2010 | Chamberlain et al. |
| 2010/0094768 A1 | 4/2010 | Miltonberger |
| 2010/0094774 A1 | 4/2010 | Jackowitz et al. |
| 2010/0094910 A1 | 4/2010 | Bayliss |
| 2010/0100945 A1 | 4/2010 | Ozzie et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0114776 A1 | 5/2010 | Weller et al. |
| 2010/0121767 A1 | 5/2010 | Coulter et al. |
| 2010/0122324 A1 | 5/2010 | Welingkar et al. |
| 2010/0122333 A1 | 5/2010 | Noe et al. |
| 2010/0130172 A1 | 5/2010 | Vendrow et al. |
| 2010/0136956 A1 | 6/2010 | Drachev et al. |
| 2010/0142698 A1 | 6/2010 | Spottiswoode et al. |
| 2010/0145836 A1 | 6/2010 | Baker et al. |
| 2010/0153278 A1 | 6/2010 | Farsedakis |
| 2010/0153290 A1 | 6/2010 | Duggan |
| 2010/0161816 A1 | 6/2010 | Kraft et al. |
| 2010/0169159 A1 | 7/2010 | Rose et al. |
| 2010/0169264 A1 | 7/2010 | O'Sullivan |
| 2010/0174638 A1 | 7/2010 | Debie et al. |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0188684 A1 | 7/2010 | Kumara |
| 2010/0205076 A1 | 8/2010 | Parson et al. |
| 2010/0205087 A1 | 8/2010 | Hubler et al. |
| 2010/0205662 A1 | 8/2010 | Ibrahim et al. |
| 2010/0211445 A1 | 8/2010 | Bodington |
| 2010/0211636 A1 | 8/2010 | Starkenburg et al. |
| 2010/0217837 A1 | 8/2010 | Ansari et al. |
| 2010/0223192 A1 | 9/2010 | Levine et al. |
| 2010/0228658 A1 | 9/2010 | Ketelsen et al. |
| 2010/0229245 A1 | 9/2010 | Singhal |
| 2010/0241535 A1 | 9/2010 | Nightengale et al. |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250497 A1 | 9/2010 | Redlich et al. |
| 2010/0250509 A1 | 9/2010 | Andersen |
| 2010/0250955 A1 | 9/2010 | Trevithick et al. |
| 2010/0253686 A1 | 10/2010 | Alsbury et al. |
| 2010/0257102 A1 | 10/2010 | Perlman |
| 2010/0258623 A1 | 10/2010 | Beemer et al. |
| 2010/0262932 A1 | 10/2010 | Pan |
| 2010/0268660 A1 | 10/2010 | Ekdahl |
| 2010/0280914 A1 | 11/2010 | Carlson |
| 2010/0281020 A1 | 11/2010 | Drubner |
| 2010/0293090 A1 | 11/2010 | Domenikos et al. |
| 2010/0299262 A1 | 11/2010 | Handler |
| 2010/0325694 A1 | 12/2010 | Bhagavatula et al. |
| 2010/0332393 A1 | 12/2010 | Weller et al. |
| 2011/0004498 A1 | 1/2011 | Readshaw |
| 2011/0009707 A1 | 1/2011 | Kaundinya et al. |
| 2011/0016042 A1 | 1/2011 | Cho et al. |
| 2011/0016533 A1 | 1/2011 | Zeigler et al. |
| 2011/0023115 A1 | 1/2011 | Wright |
| 2011/0029388 A1 | 2/2011 | Kendall et al. |
| 2011/0035315 A1 | 2/2011 | Langley |
| 2011/0035788 A1 | 2/2011 | White et al. |
| 2011/0040736 A1 | 2/2011 | Kalaboukis |
| 2011/0060654 A1 | 3/2011 | Elliott et al. |
| 2011/0071950 A1 | 3/2011 | Ivanovic |
| 2011/0078073 A1 | 3/2011 | Annappindi et al. |
| 2011/0082768 A1 | 4/2011 | Eisen |
| 2011/0083181 A1 | 4/2011 | Nazarov |
| 2011/0113084 A1 | 5/2011 | Ramnani |
| 2011/0113086 A1 | 5/2011 | Long et al. |
| 2011/0125595 A1 | 5/2011 | Neal et al. |
| 2011/0126275 A1 | 5/2011 | Anderson et al. |
| 2011/0131123 A1 | 6/2011 | Griffin et al. |
| 2011/0137760 A1 | 6/2011 | Rudie et al. |
| 2011/0137789 A1 | 6/2011 | Kortina et al. |
| 2011/0142213 A1 | 6/2011 | Baniak et al. |
| 2011/0145122 A1 | 6/2011 | Haggerty et al. |
| 2011/0145899 A1 | 6/2011 | Cao et al. |
| 2011/0148625 A1 | 6/2011 | Velusamy |
| 2011/0161218 A1 | 6/2011 | Swift |
| 2011/0164746 A1 | 7/2011 | Nice et al. |
| 2011/0166988 A1 | 7/2011 | Coulter |
| 2011/0167011 A1 | 7/2011 | Paltenghe et al. |
| 2011/0173116 A1 | 7/2011 | Yan et al. |
| 2011/0178841 A1 | 7/2011 | Rane et al. |
| 2011/0178899 A1 | 7/2011 | Huszar |
| 2011/0179139 A1 | 7/2011 | Starkenburg et al. |
| 2011/0184780 A1 | 7/2011 | Alderson et al. |
| 2011/0184838 A1 | 7/2011 | Winters et al. |
| 2011/0196791 A1 | 8/2011 | Dominguez |
| 2011/0202474 A1 | 8/2011 | Mele et al. |
| 2011/0211445 A1 | 9/2011 | Chen |
| 2011/0219421 A1 | 9/2011 | Ullman et al. |
| 2011/0238566 A1 | 9/2011 | Santos |
| 2011/0251946 A1 | 10/2011 | Haggerty et al. |
| 2011/0258050 A1 | 10/2011 | Chan et al. |
| 2011/0264566 A1 | 10/2011 | Brown |
| 2011/0270754 A1 | 11/2011 | Kelly et al. |
| 2011/0270779 A1 | 11/2011 | Showalter |
| 2011/0270925 A1 | 11/2011 | Mina |

(56) References Cited

U.S. PATENT DOCUMENTS

| | | |
|---|---|---|
| 2011/0307397 A1 | 12/2011 | Benmbarek |
| 2011/0307957 A1 | 12/2011 | Barcelo et al. |
| 2012/0005070 A1 | 1/2012 | McFall et al. |
| 2012/0011056 A1 | 1/2012 | Ward et al. |
| 2012/0011158 A1 | 1/2012 | Avner et al. |
| 2012/0016948 A1 | 1/2012 | Sinha |
| 2012/0023011 A1 | 1/2012 | Hurwitz |
| 2012/0029956 A1 | 2/2012 | Ghosh et al. |
| 2012/0030216 A1 | 2/2012 | Churi et al. |
| 2012/0030771 A1 | 2/2012 | Pierson et al. |
| 2012/0047219 A1 | 2/2012 | Feng et al. |
| 2012/0054592 A1 | 3/2012 | Jaffe et al. |
| 2012/0066065 A1 | 3/2012 | Switzer |
| 2012/0066084 A1 | 3/2012 | Sneyders |
| 2012/0072382 A1 | 3/2012 | Pearson et al. |
| 2012/0072464 A1 | 3/2012 | Cohen |
| 2012/0078932 A1 | 3/2012 | Skurtovich, Jr. et al. |
| 2012/0084866 A1 | 4/2012 | Stolfo |
| 2012/0089438 A1 | 4/2012 | Tavares et al. |
| 2012/0101938 A1 | 4/2012 | Kasower |
| 2012/0101939 A1 | 4/2012 | Kasower |
| 2012/0106801 A1 | 5/2012 | Jackson |
| 2012/0108274 A1 | 5/2012 | Acebo Ruiz et al. |
| 2012/0110467 A1 | 5/2012 | Blake et al. |
| 2012/0110677 A1 | 5/2012 | Abendroth et al. |
| 2012/0123942 A1 | 5/2012 | Song et al. |
| 2012/0124498 A1 | 5/2012 | Santoro et al. |
| 2012/0136763 A1 | 5/2012 | Megdal et al. |
| 2012/0136774 A1 | 5/2012 | Imrey et al. |
| 2012/0151045 A1 | 6/2012 | Anakata et al. |
| 2012/0158574 A1 | 6/2012 | Brunzell et al. |
| 2012/0158654 A1 | 6/2012 | Behren et al. |
| 2012/0173339 A1 | 7/2012 | Flynt et al. |
| 2012/0173406 A1 | 7/2012 | Fei et al. |
| 2012/0173417 A1 | 7/2012 | Lohman et al. |
| 2012/0179536 A1 | 7/2012 | Kalb et al. |
| 2012/0198556 A1 | 8/2012 | Patel et al. |
| 2012/0215682 A1 | 8/2012 | Lent et al. |
| 2012/0215719 A1 | 8/2012 | Verlander |
| 2012/0216125 A1 | 8/2012 | Pierce |
| 2012/0226916 A1 | 9/2012 | Hahn et al. |
| 2012/0235897 A1 | 9/2012 | Hirota |
| 2012/0239497 A1 | 9/2012 | Nuzzi |
| 2012/0239553 A1 | 9/2012 | Gonen et al. |
| 2012/0239583 A1 | 9/2012 | Dobrowolski |
| 2012/0246060 A1 | 9/2012 | Conyack, Jr. et al. |
| 2012/0253852 A1 | 10/2012 | Pourfallah et al. |
| 2012/0265607 A1 | 10/2012 | Belwadi |
| 2012/0290660 A1 | 11/2012 | Rao et al. |
| 2012/0297484 A1 | 11/2012 | Srivastava |
| 2012/0317016 A1 | 12/2012 | Hughes |
| 2012/0323954 A1 | 12/2012 | Bonalle et al. |
| 2012/0324388 A1 | 12/2012 | Rao et al. |
| 2013/0006843 A1 | 1/2013 | Tralvex |
| 2013/0018811 A1 | 1/2013 | Britti et al. |
| 2013/0031109 A1 | 1/2013 | Routson et al. |
| 2013/0031624 A1 | 1/2013 | Britti et al. |
| 2013/0060603 A1 | 3/2013 | Wagner |
| 2013/0066775 A1 | 3/2013 | Milam |
| 2013/0080467 A1 | 3/2013 | Carson et al. |
| 2013/0085804 A1 | 4/2013 | Leff et al. |
| 2013/0110565 A1 | 5/2013 | Means et al. |
| 2013/0110678 A1 | 5/2013 | Vigier et al. |
| 2013/0117087 A1 | 5/2013 | Coppinger |
| 2013/0125010 A1 | 5/2013 | Strandell |
| 2013/0132151 A1 | 5/2013 | Stibel et al. |
| 2013/0173449 A1 | 7/2013 | Ng et al. |
| 2013/0173450 A1 | 7/2013 | Celka et al. |
| 2013/0173451 A1 | 7/2013 | Kornegay et al. |
| 2013/0173481 A1 | 7/2013 | Hirtenstein et al. |
| 2013/0185293 A1 | 7/2013 | Boback |
| 2013/0205135 A1 | 8/2013 | Lutz |
| 2013/0211986 A1 | 8/2013 | Debie et al. |
| 2013/0226783 A1 | 8/2013 | Haggerty et al. |
| 2013/0246528 A1 | 9/2013 | Ogura |
| 2013/0254096 A1 | 9/2013 | Serio et al. |
| 2013/0268357 A1 | 10/2013 | Heath |
| 2013/0279676 A1 | 10/2013 | Baniak et al. |
| 2013/0293363 A1 | 11/2013 | Plymouth |
| 2013/0298238 A1 | 11/2013 | Shah et al. |
| 2013/0332338 A1 | 12/2013 | Yan et al. |
| 2013/0332342 A1 | 12/2013 | Kasower |
| 2013/0339217 A1 | 12/2013 | Breslow et al. |
| 2013/0339249 A1 | 12/2013 | Weller et al. |
| 2014/0012733 A1 | 1/2014 | Vidal |
| 2014/0025562 A1 | 1/2014 | Rothrock et al. |
| 2014/0032265 A1 | 1/2014 | Paprocki et al. |
| 2014/0032300 A1 | 1/2014 | Zhang et al. |
| 2014/0032723 A1 | 1/2014 | Nema |
| 2014/0040182 A1 | 2/2014 | Gilder et al. |
| 2014/0046872 A1 | 2/2014 | Arnott et al. |
| 2014/0061302 A1 | 3/2014 | Hammad |
| 2014/0089167 A1 | 3/2014 | Kasower |
| 2014/0110477 A1 | 4/2014 | Hammad |
| 2014/0136422 A1 | 5/2014 | Jung et al. |
| 2014/0156500 A1 | 6/2014 | Lassen et al. |
| 2014/0156503 A1 | 6/2014 | Lassen et al. |
| 2014/0157375 A1 | 6/2014 | Britti et al. |
| 2014/0164112 A1 | 6/2014 | Kala |
| 2014/0164398 A1 | 6/2014 | Smith et al. |
| 2014/0164519 A1 | 6/2014 | Shah |
| 2014/0201100 A1 | 7/2014 | Rellas et al. |
| 2014/0244353 A1 | 8/2014 | Winters |
| 2014/0258083 A1 | 9/2014 | Achanta et al. |
| 2014/0279329 A1 | 9/2014 | Dancel |
| 2014/0280945 A1 | 9/2014 | Lunt |
| 2014/0289812 A1 | 9/2014 | Wang et al. |
| 2014/0298485 A1 | 10/2014 | Gardner |
| 2014/0317023 A1 | 10/2014 | Kim |
| 2014/0331282 A1 | 11/2014 | Tkachev |
| 2015/0249655 A1 | 9/2015 | Lunt |
| 2015/0262246 A1 | 9/2015 | Stack et al. |
| 2015/0269506 A1 | 9/2015 | Britti et al. |
| 2015/0278944 A1 | 10/2015 | Searson et al. |
| 2015/0310543 A1 | 10/2015 | DeBie |
| 2015/0326580 A1 | 11/2015 | McMillan et al. |
| 2016/0328476 A1 | 11/2016 | Chang et al. |

FOREIGN PATENT DOCUMENTS

| | | |
|---|---|---|
| CN | 102663650 | 9/2012 |
| EP | 0 419 889 | 4/1991 |
| EP | 0 458 698 | 11/1991 |
| EP | 0 559 358 | 9/1993 |
| EP | 0 919 942 | 6/1999 |
| EP | 0 977 128 | 2/2000 |
| EP | 1 028 401 | 8/2000 |
| EP | 1 077 419 | 2/2001 |
| EP | 0 772 836 | 12/2001 |
| EP | 1 239 378 | 1/2002 |
| EP | 1 301 887 | 4/2003 |
| EP | 1 850 278 | 10/2007 |
| EP | 1 988 501 | 11/2008 |
| EP | 2 088 743 | 8/2009 |
| EP | 2 074 513 | 2/2016 |
| GB | 1 322 809 | 7/1973 |
| JP | 10-222559 | 8/1998 |
| JP | 10-261009 | 9/1998 |
| JP | 10-293732 | 11/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| JP | 2005-208945 | 8/2005 |
| KR | 10-2000-0036594 | 7/2000 |
| KR | 10-2000-0063995 | 11/2000 |
| KR | 2000-0063313 | 11/2000 |
| KR | 10-2001-0016349 | 3/2001 |
| KR | 10-2001-0035145 | 5/2001 |

(56) References Cited

FOREIGN PATENT DOCUMENTS

| | | |
|---|---|---|
| KR | 10-2002-0007132 | 1/2002 |
| KR | 2002-0039203 | 5/2002 |
| KR | 10-2004-0078798 | 9/2004 |
| KR | 10-2007-0081504 | 8/2007 |
| RU | 2 181 216 | 4/2002 |
| WO | WO 94/12943 | 6/1994 |
| WO | WO 95/12857 | 5/1995 |
| WO | WO 95/34155 | 12/1995 |
| WO | WO 96/00945 | 1/1996 |
| WO | WO 98/41931 | 9/1998 |
| WO | WO 98/41932 | 9/1998 |
| WO | WO 98/41933 | 9/1998 |
| WO | WO 98/49643 | 11/1998 |
| WO | WO 99/17225 | 4/1999 |
| WO | WO 99/17226 | 4/1999 |
| WO | WO 99/38094 | 7/1999 |
| WO | WO 99/46710 | 9/1999 |
| WO | WO 99/60481 | 11/1999 |
| WO | WO 00/04465 | 1/2000 |
| WO | WO 00/28441 | 5/2000 |
| WO | WO 00/30045 | 5/2000 |
| WO | WO 00/55778 | 9/2000 |
| WO | WO 00/65469 | 11/2000 |
| WO | WO 01/04821 | 1/2001 |
| WO | WO 01/09752 | 2/2001 |
| WO | WO 01/09792 | 2/2001 |
| WO | WO 01/10090 | 2/2001 |
| WO | WO 01/39589 | 6/2001 |
| WO | WO 01/41355 | 6/2001 |
| WO | WO 01/84281 | 11/2001 |
| WO | WO 02/13047 | 2/2002 |
| WO | WO 02/29636 | 4/2002 |
| WO | WO 2004/031986 | 4/2004 |
| WO | WO 2004/088464 | 10/2004 |
| WO | WO 2004/114160 | 12/2004 |
| WO | WO 2005/022348 | 3/2005 |
| WO | WO 2005/033979 | 4/2005 |
| WO | WO 2005/124619 | 12/2005 |
| WO | WO 2006/019752 | 2/2006 |
| WO | WO 2006/050278 | 5/2006 |
| WO | WO 2006/069199 | 6/2006 |
| WO | WO 2006/099081 | 9/2006 |
| WO | WO 2007/004158 | 1/2007 |
| WO | WO 2007/106393 | 9/2007 |
| WO | WO 2008/021061 | 2/2008 |
| WO | WO 2008/022289 | 2/2008 |
| WO | WO 2008/042614 | 4/2008 |
| WO | WO 2008/054403 | 5/2008 |
| WO | WO 2008/127288 | 10/2008 |
| WO | WO 2008/147918 | 12/2008 |
| WO | WO 2009/064694 | 5/2009 |
| WO | WO 2009/102391 | 8/2009 |
| WO | WO 2009/117468 | 9/2009 |
| WO | WO 2009/117518 | 9/2009 |
| WO | WO 2009/132114 | 10/2009 |
| WO | WO 2010/001406 | 1/2010 |
| WO | WO 2010/062537 | 6/2010 |
| WO | WO 2010/077989 | 7/2010 |
| WO | WO 2010/132492 | 11/2010 |
| WO | WO 2010/150251 | 12/2010 |
| WO | WO 2011/005876 | 1/2011 |
| WO | WO 2013/009920 | 1/2013 |
| WO | WO 2014/018900 | 1/2014 |
| WO | WO 2014/088895 | 6/2014 |
| WO | WO 2014/137759 | 9/2014 |

OTHER PUBLICATIONS

U.S. Appl. No. 12/705,511, filed Feb. 12, 2010, Bargoli et al.
"ACS Company Birch & Davis Wins Texas CHIP Contract," PR Newswire, Section: Financial News, May 17, 2000, Dallas, TX, pp. 3.
"Aggregate and Analyze Social Media Content: Gain Faster and Broader Insight to Market Sentiment," SAP Partner, Mantis Technology Group, Apr. 2011, pp. 4.
Aharony et al., "Social Area Networks: Data Networking of the People, by the People, for the People," 2009 International Conference on Computational Science and Engineering, May 2009, pp. 1148-1155.
Akl, Selim G., "Digital Signatures: A Tutorial Survey," Computer, Feb. 1983, pp. 15-24.
"An Even Better Solution to Financing Elective Surgery . . . ", Unicorn Financial, pp. 7, http://web.archive.org/web/20000816161359/http://www.unicornfinancial.com/, as downloaded Oct. 15, 2008.
"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.
"Authorizing Safety Net Public Health Programs," Hearing before the Subcommittee on Health of the Committee on Energy and Commerce, House of Representatives, One Hundred Seventh Congress, First Session, Serial No. 107-57, dated Aug. 1, 2001, 226 pgs.
ABC News Now:Money Matters, as broadcasted Nov. 15, 2005 with guest Todd Davis (CEO of Lifelock), pp. 6.
An Expert System for Determining Medicaid Eligibility, Journal of Medical Systems, vol. 12, Nov. 5, 1988, in 10 pages.
Announcing TrueProfiler, http://web.archive.org/web/20021201123646/http://www.truecredit.com/index.asp, dated Dec. 1, 2002, 2 pages.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
BackupBox, http://mybackupbox.com printed Feb. 8, 2013 in 2 pages.
Barry, Ellen, "Life, Liberty, and the Pursuit of Lipo," The Boston Phoenix, News & Opinion, dated Apr. 6, 1998, as downloaded at http://weeklywire.com/ww/04-06-98/boston_feature_1.html (1 of 12) [Oct. 15, 2008 2:35:25 PM].
Belford, Terrence, "Technology Quarterly: Computers, Internet Speeds Credit Checks System Tailored for Doctors, Dentists," The Globe and Mail (Canada), Section: Report on Business Special Reports, p. C10, Mar. 18, 1997.
Bielski, Lauren, "Will you Spend to Thwart ID Theft?" ABA Banking Journal, Apr. 2005, pp. 54, 56-57, 60.
Bienkowski, Nik, "A New Tool for Portfolio Risk Management—Gold Bullion", Apr. 2003, pp. 6.
"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip.htm (1 of 3) [Oct. 20, 2008 9:49:18 AM].
Bitran et al., "Mailing Decisions in Catalog Sales Industry", Management Science (JSTOR), vol. 42, No. 9, pp. 1364-1381, Sep. 1996.
BlueCava, "What We Do", http://www.bluecava.com/what-we-do/, printed Nov. 5, 2012 in 3 pages.
Boss, Shira J. "Elective Surgery Without the Plastic: Low-Interest Medical Financing Provides Alternative to Credit Cards," factiva, Crain's New York Business, 2 pgs., dated Jun. 22, 1998.
Broward County CAP Grant Application, as printed on Aug. 10, 2009, 41 pgs.
Burr Ph.D., et al., "Utility Payments as Alternative Credit Data: A Reality Check", Asset Builders of America, Inc., Oct. 5, 2006, pp. 1-18, Washington, D.C.
Buxfer, http://www.buxfer.com/ printed Feb. 5, 2014 in 1 page.
Caliendo, et al., "Some Practical Guidance for the Implementation of Propensity Score Matching", IZA:Discussion Paper Series, No. 1588, Germany, May 2005, pp. 32.
Calnan, Christopher, "Tenet, Fair Isaac invest $20M in startup," MHT, Mass High Tech: The Journal of New England Technology, dated Jul. 23, 2007, 2 pgs.

(56) References Cited

OTHER PUBLICATIONS

Capps et al., "Recent Changes in Texas Welfare and Work, Child Care and Child Welfare Systems," Assessing the New Federalism, The Urban Institute, State Update No. 1, 24 pgs., Jun. 2001.
CAPStone Newsletter, Sep. 2001, 8 pgs., as downloaded from http://web.archive.org/web/20011213115738/www.capcommunity.hrsa.gov/Newsletter/Newsletter12.htm (1 of 8) [Oct. 18, 2008 2:39:47 PM].
Card Marketing, Use the Latest CRM Tools and Techniques, www.CardForum.com, vol. 5 No. 10, Dec. 2001.
Check, http://check.me/ printed Feb. 5, 2014 in 3 pages.
Cheney, Karen, "Fix Your Nose, If You Wish, But Not With This New Loan," Money Magazine, vol. 27, No. 5, 1 pg., dated May 1, 1998.
Chores & Allowances, "Do Kids Have Credit Reports?" Oct. 15, 2007, http://choresandallowances.blogspot.com/2007/10/do-kids-have-credit-reports.html, pp. 5.
Comlounge.net, "plonesocial.auth.rpx" http://web.archive.org/web/20101026041841/http://comlounge.net/rpx as captured Oct. 26, 2010 in 9 pages.
"Consumer Reports Finds American-Made Vehicles Close Reliability Gap with European-Made Vehicle—as Japanese Continue to Set New Benchmarks for the Industry", Consumer Reports: Consumers Union, Yonkers, NY, Apr. 2003.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
CreditSesame; "FAQ's"; http://www.creditsesame.com/how-we-help/faqs/#cb printed Dec. 5, 2011 in 8 pages.
CreditSesame; "Promote Your Financial Responsibility to Get an Edge in Life"; http://www.creditsesame.com/credit-badge/ printed Dec. 2, 2011 in 1 page.
CreditToolkit, Digital Matrix Systems, as printed out Mar. 4, 2008, pp. 2.
"Credit Information Bureaus and 'CIBIL'", http://www.icicibank.com/cibil.html printed Aug. 22, 2012 in 3 pages.
Cohen et al., "Optimizer: IBM's Multi Echelon Inventory System for Managing Service Logistics", Interfaces, vol. 20, pp. 65-82, Jan.-Feb. 1990.
"Consumers Gain Immediate and Full Access to Credit Score Used by Majority of U.S. Lenders", PR Newswire, ProQuest Copy, Mar. 19, 2001, p. 1.
"CreditCheck Monitoring Services," Dec. 11, 2000, pp. 1, lines 21-23.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Davies, Donald W., "Applying the RSA Digital Signature to Electronic Mail," Computer, Feb. 1983, pp. 55-62.
Day, Jo and Kevin; "ID-ology: A Planner's Guide to Identity Theft"; Journal of Financial Planning:Tech Talk; pp. 36-38; Sep. 2004.
"Debt Settlement: Watch Video on how to Pay Your Debt Faster", http://www.debtconsolidationcare.com/debt-settlement.html printed Jan. 9, 2013 in 6 pages.
DentalFinancing.com, "Financial services for patients and dental professionals,", 7 pgs., as downloaded from http://web.archive.org/web/20010607151954/www.dentalfinancing.com/dentist/index.asp (1 of 2) [Oct. 15, 2008 3:55:16 PM].
DiBartolomeo, Dan, "Portfolio Optimization: The Robust Solution," Prudential Securities Quantitative Conference, Dec. 21, 1993, pp. 8.
Dietz, Ellen, "Dental Office Management," 8 pgs., pp. 316-321, Copyright 2000.
Downes et al., Dictionary of Finance and Investment Terms, Fifth Edition, 1998, pp. 332-333.
Dymi, Amilda, Need for Leads Spurs Some Upgrades, Origination News—Special Report, May 1, 2008, vol. vol. 17, Issue No. 8, pp. p. 24, Atlanta, Copyright 2008 SourceMedia, Inc.
eFunds Introduces QualiFileSM, Deluxe Corporation, eFunds Press Release and Product Launch, Sep. 23, 1999, Milwaukee, WI.
Electronic Privacy Information Center, "The Fair Credit Reporting Act" 15 USC 1681 (1992), 10 pgs., as downloaded from http://epic.org/privacy/financial/fcra.html on Mar. 19, 2008.
Ellwood, Marilyn, "The Medicaid Eligibility Maze: Coverage Expands, but Enrollment Problems Persist, Findings from a Five-State Study," Mathematica Policy Research, Inc., Occasional Paper No. 30, 56 pgs., Dec. 1999.
Elmasri et al., "Fundamentals of Database Systems, Third Edition (Excerpts)", Jun. 2000, pp. 253, 261, 268-270, 278-280, 585, 595.
Ettorre, "Paul Kahn on Exceptional Marketing," Management Review, vol. 83, No. 11, Nov. 1994, pp. 48-51.
Expensr.com http://www.expensr.com/, as retrieved on Sep. 17, 2008.
Experian, Custom Strategist and Qualifile from Funds, 2000, in 2 pages.
Experian, "Enabling e-business", White Paper, Jan. 2001, pp. 21.
Experian, "Instant Prescreen: Offer preapproved credit at the point of sale", Oct. 2000, pp. 2.
Experian, "Experian Rental Payment Data," http://www.experian.com/rentbureau/rental-data.html printed Nov. 22, 2013 in 2 pages.
Facebook, "Facebook helps you connect and share with the people in your life," www.facebook.com printed Nov. 16, 2010 in 1 page.
FamilySecure.com, "Frequently Asked Questions", http://www.familysecure.com/FAQ.aspx as archived Jul. 15, 2007 in 3 pages.
Fanelli, Marc, "Building a Holistic Customer View", MultiChannel Merchant, Jun. 26, 2006, pp. 2.
Felsenthal, Edward, "Health Costs; Managed Care Helps Curb Costs, Study Says," The Wall Street Journal, dated Aug. 12, 1991.
"Fictitious Business Name Records", Westlaw Database Directory, http://directoy.westlaw.com/scope/default.asp?db=FBN-ALL&RS-W&VR=2.0 as printed Dec. 17, 2009, pp. 5.
"Financing Medical Procedures a Lucrative But Risky Business," Credit Risk Management Report, vol. 10, Issue 15, 2 pgs., dated Aug. 7, 2000.
Fisher, Joseph, "Access to Fair Credit Reports: Current Practices and Proposed Legislation," American Business Law Journal, Fall 1981, vol. 19, No. 3, p. 319.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Garcia-Molina, "Database Systems: The Complete Book", Prentice Hall, 2002, pp. 713-715.
Gibbs, Adrienne; "Protecting Your Children from Identity Theft," Nov. 25, 2008, http://www.creditcards.com/credit-card-news/identity-ID-theft-and-kids-children-1282.php, pp. 4.
Gilje, Shelby, "Credit Agency Moving Into Health Care," NewsRoom, The Seattle Times, Section: SCENE, Mar. 22, 1995, pp. 3, http://web2.westlaw.com/result/documenttext.aspx?rs=WLW8.03&ss+CNT&rp=%2fWelc.
Giudici, Paolo, "Bayesian Data Mining, with Application to Benchmarking and Credit Scoring," Applied Stochastic Models in Business and Industry, 2001, vol. 17, pp. 69-81.
"GLBA Compliance and FFIEC Compliance" http://www.trustwave.com/financial-services.php printed Apr. 8, 2013 in 1 page.
Goldstein, Jacob, "The Newest Vital Sign: Your Credit Score," The Wall Street Journal, Health Blog, as viewed at http://blogs.wsj.com/health/2008/03/18/the-newest-vital-sign-your-cr, 2008, pp. 3.
Gordon et al., "Identity Fraud: A Critical National and Global Threat," LexisNexis, Oct. 28, 2003, pp. 1-48.

(56) References Cited

OTHER PUBLICATIONS

Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.

Handfield, Robert B. et al., "Managing Component Life Cycles in Dynamic Technological Environments", International Journal of Purchasing and Materials Management, Tempe, vol. 30, No. 2, pp. 20-28, Spring 1994, ProQuest ID 590096.

Henry, M.D., Kimberly A., "The Face-Lift Sourcebook," copyright 2000, 3 pgs. (p. 207).

Herron, Janna, "Social Media-Based Credit Score?", http://www.bankrate.com/financing/credit-cards/social-media-based-credit-score/, posted Friday, Jan. 13, 2012, printed Nov. 22, 2013 in 2 pages.

Herzberg, Amir, "Payments and Banking with Mobile Personal Devices," Communications of the ACM, May 2003, vol. 46, No. 5, pp. 53-58.

Hojoki, http://hojoki.com printed Feb. 8, 2013 in 5 pages.

Hoofnagle, Chris Jay, "Identity Theft: Making the Known Unknowns Known," Harvard Journal of Law & Technology, Fall 2007, vol. 21, No. 1, pp. 98-122.

ID Analytics, "ID Analytics® Consumer Notification Service" printed Apr. 16, 2013 in 2 pages.

ID Theft Assist, "Do You Know Where Your Child's Credit Is?", Nov. 26, 2007, http://www.idtheftassist.com/pages/story14, pp. 3.

"ID Thieves These Days Want Your Number, Not Your Name", The Colombus Dispatch, Columbus, Ohio, http://www.dispatch.com/content/stories/business/2014/08/03/id-thieves-these-days-want-your-number-not-your-name.html, Aug 3, 2014 in 2 pages.

Identity Theft Resource Center; Fact Sheet 120 A—To Order a Credit Report for a Child; Fact Sheets, Victim Resources; Apr. 30, 2007.

"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vnam.

Ideon, Credit-Card Registry that Bellyflopped this Year, Is Drawing some Bottom-Fishers, The Wall Street Journal, Aug. 21, 1995, pp. C2.

IFTTT, "About IFTTT," http://ifttt.com/wtf printed Feb. 18, 2013 in 4 pages.

"Improving the Implementation of State Children's Health Insurance Programs for Adolescents Report of an Invitational Conference Sponsored by the American Academy of Pediatrics, Section on Adolescent Health," PEDIATRICS, Official Journal of the American Academy of Pediatrics, Section on Adolescent Health, Sep. 26-27, 1999, 9 pages.

Inderfurth et al., "Decision Support for Spare Parts Acquisition in Post Product Life Cycle", Central European Journal of Operations Research, vol. 16, pp. 17-42, 2008 [Initially published online Dec. 21, 2007].

IndiCareTM, On-Line Patient Assistant Program, Website Users Manual, JBI Associates, LLC, 1997.

Information Brokers of America, "Information Brokers of America Child Identity Theft Protection" http://web.archive.org/web/20080706135451/http://iboainfo.com/child-order.html as archived Jul. 6, 2008 in 1 page.

Information Brokers of America, "Safeguard Your Child's Credit", http://web.archive.org/web/20071215210406/http://www.iboainfo.com/child-id-protect.html as archived Dec. 15, 2007 in 1 page.

Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.

"Intelligent Miner Applications Guide", IBM Corp., Apr. 2, 1999, Chapters 4-7, pp. 33-132.

Iovation, Device Identification & Device Fingerprinting, http://www.iovation.com/risk-management/device-identification printed Nov. 5, 2012 in 6 pages.

"Japan's JAAI system appraises used cars over internet", Asia Pulse, Mar. 3, 2000.

Jaro, Matthew A., "Probabilistic Linkage of Large Public Health Data Files," Statistics in Medicine, 1995, vol. 14, pp. 491-498.

Käki, Anssi, "Forecasting in End-of-Life Spare Parts Procurement", Master's Thesis—Helsinki University of Technology System Analysis Laboratory, Jul. 27, 2007.

Kent, Heather, "Huge declines in price as competition heats up in Vancouver's booming laser-surgery market," CMAJ, Oct. 5, 1999; 161 (7), pp. 857-858.

Kim, Bowon et al., Optimal Pricing, EOL (End of Life) Warranty, and Spare Parts Manufacturing Strategy Amid Product Transition, European Journal of Operation Research, vol. 188, pp. 723-745, 2008 [Initially published online May 1, 2007].

Klein, et al., "A Constant-Utility Index of the Cost of Living", The Review of Economic Studies, pp. 84-87, vol. XV-XVI, Kraus Reprint Corporation, New York, 1960.

Klein, et al., "An Econometric Model of the United States: 1929-1952", North-Holland Publishing Company, Amsterdam, 1955, pp. 4-41.

Klein, Lawrence R., "The Keynesian Revolution", New York, The MacMillan Company, 1947, pp. 56-189.

Krupp, James A.G.; "Forecasting for the Automotive Aftermarket"; The Journal of Business Forecasting Methods & Systems; Winter 1993-1994; 12, 4; ABI/Inform Global; pp. 8-12.

Lan, Joe, "The Top Portfolio Management Software," http://www.aaii.com/computerizedinvesting/article/the-top-portfolio-management-software, Includes Discussion thread, Fourth Quarter 2011, pp. 17.

Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.

Lapide, Larry, "New Developments in Business Forecasting", The Journal of Business Forecasting, pp. 12-14, Spring 2002.

Lavelle, Marianne, "Health Plan Debate Turning to Privacy Some Call for Safeguards on Medical Disclosure. Is a Federal Law Necessary?," The National Law Journal, vol. 16, No. 39, dated May 30, 1994, as downloaded from http://web2.westlaw.com/result/.

Lee, W.A.; "Experian, on Deal Hunt, Nets Identity Theft Insurer", American Banker: The Financial Services Daily, Jun. 4, 2003, New York, NY, 1 page.

LendingTree.com, "Lender Ratings & Reviews," http://web.archive.org/web/20091015043716/http://www.lendingtree.com/lender-reviews/, Oct. 15, 2009, in 21 pages.

Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.

Li et al., "Automatic Verbal Information Verification for User Authentication", IEEE Transactions on Speech and Audio Processing, vol. 8, No. 5, Sep. 2000, pp. 585-596.

LifeLock, "How LifeLock Works," http://www.lifelock.com/lifelock-for-people printed Mar. 14, 2008 in 1 page.

LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.

LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.

LifeLock, Various Pages, www.lifelock.com/, 2007.

Littwin, Angela, "Beyond Usury: A Study of Credit-Card Use and Preference Among Low-Income Consumers", Texas Law Review, vol. 86, No. 3, pp. 451-506; Feb. 2008.

Lorette, Kristie, "How to Successfully Dispute Inaccuracies on Your Credit Report," http://web.archive.org/web/20110531184149/http://www.quizzle.com/blog/2011/03/how-to-successfully-dispute-inaccuracies-on-your-credit-report/, Mar. 25, 2011, in * pages.

(56) References Cited

OTHER PUBLICATIONS

Loshin, Intelligent Enterprise: Better Insight for Business Decisions, "Value-Added Data: Merge Ahead", Feb. 9, 2000, vol. 3, No. 3, 5 pages.
Magid, Lawrence, J., Business Tools: When Selecting an ASP Ensure Data Mobility, Los Angeles Times, Los Angeles, CA, Feb. 26, 2001, vol. C, Issue 4, pp. 3.
Manilla, http://www.manilla.com/how-it-works/ printed Feb. 5, 2014 in 1 page.
Mathematica Policy Research, Inc., "1998 Health Care Survey of DoD Beneficiaries: Technical Manual," Jul. 1999.
McGovern, Celeste, Jayhawk Medical Acceptance. (Brief Article), Alberta Report, 1 pg., dated Aug. 23, 1999.
McLaughlin, Nancy H., "Homeless, pregnant and alone Dana Sides knows her baby is likely to come in a month, but she has no idea where she will go after leaving the hospital," NewsRoom, Greensboro News & Record (NC), Section: General News, dated Dec. 6, 2001.
McNamara, Paul, "Start-up's pitch: The Envelope, please," Network World, Apr. 28, 1997, vol. 14, No. 17, p. 33.
"MediCredit Announces Major Investment from Medstone; Financing Will Enable Dramatic Expansion of Online Services," Business Wire, pp. 2, dated May 12, 2000.
MediCredit, Patient Financing, "Thought you couldn't afford Cosmetic Surgery?," 3 pgs., as downloaded from http://web.archive.org/web/19970601060333/http://www.medicredit.com/ (1 of 2) [Oct. 15, 2008 3:16:31 PM].
Medick et al., "German Agency to Mine Facebook to Assess Creditworthiness", Jun. 7, 2012, http://www.spiegel.de/international/germany/german-credit-agency-plans-to-analyze-individual-facebook-pages-a-837539.html printed Nov. 22, 2013 in 2 pages.
Micarelli et al., "Personalized Search on the World Wide Web," The Adaptive Web, LNCS 4321, 2007, pp. 195-230.
MicroBilt, "PRBC Credit Reporting Agency—Payment Reporting Builds Credit," retrieved from <http://www.microbilt.com/nontraditional-credit-report.aspx> and corresponding "Sample Report," retrieved from http://www.microbilt.com/pdfs/PRBC%20Sample%20Report%20(complete).pdf printed Nov. 21, 2013 in 8 pages.
Microfinance Africa, "Philippines: Microfinance Players to get Their Own Credit Info Bureau," Apr. 5, 2011, http://microfinanceafrica.net/microfinance-around-the-world/philippines-microfinance-players-to-get-their-own-credit-info-bureau/ printed Nov. 22, 2013 in 2 pages.
Miller, Joe, "NADA used-car prices go online", Automotive News, Jun. 14, 1999, p. 36.
Mint.com, http://www.mint.com/how-it-works/ printed Feb. 5, 2013 in 2 pages.
Moore, John R., Jr. "Forecasting and Scheduling for Past-Model Replacement Parts" Management Science, Application Series, vol. 18, No. 4, Part 1, Dec. 1971, pp. B200-B213.
Mover, "One API for the Cloud," http://mover.io printed Feb. 6, 2013 in 3 pages.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directoy.westlaw.com/scope/default.asp?db=NA-ALL&RS=W&VR=2.0 as printed Dec. 17, 2009, pp. 5.
NewsRoom, "CIGNA Report Withdrawn as Foe Sees Opening," Insurance Regulator, State Survey, Sep. 9, 1996, vol. 8, Issue 34, pp. 4.
"New for Investors: Asset Allocation, Seasoned Returns and More," Prosper, http://blog.prosper.com/2011/10/27/new-for-investors-asset-allocation-seasoned-returns-and-more/, pp. 4.
Next Card: About Us, http://web.cba.neu.edu/~awatson/NextCardCase/NextCardAboutUs.htm printed Oct. 23, 2009 in 10 pages.
Ogg, Erica, "Apple Cracks Down on UDID Use", http://gigaom.com/apple/apple-cracks-down-on-udid-use/ printed Nov. 5, 2012 in 5 Pages.
Organizing Maniac's Blog—Online Receipts Provided by MyQuickReceipts.com, http://organizingmaniacs.wordpress.com/2011/01/12/online-receipts-provided-by-myquickreceipts-com/ dated Jan. 12, 2011 printed Oct. 16, 2012 in 3 pages.
Otixo, "Your Dashboard for the Cloud," http://Otixo.com/product printed Feb. 6, 2013 in 3 pages.
Packer, A. H., "Simulation and Adaptive Forecasting an Applied to Inventory Control", Operations Research, vol. 15, No. 4, pp. 660-679, Jul. 1965.
Pagano, et al., "Information Sharing in Credit Markets," Dec. 1993, The Journal of Finance, vol. 48, No. 5, pp. 1693-1718.
"Parse", Definition from PC Magazine Encyclopedia, http://www/pcmag.com/encyclopedia_term_0,2542,t=parse&i=48862,00.asp as downloaded Mar. 5, 2012.
Partnoy, Frank, Rethinking Regulation of Credit Rating Agencies: An Institutional Investor Perspective, Council of Institutional Investors, Apr. 2009, pp. 21.
Paustian, Chuck, "Every Cardholder a King Customers get the Full Treatment at Issuers' Web Sites," Card Marketing, New York, Mar. 2001, vol. 5, No. 3, pp. 4.
Pennsylvania Law Weekly, "Discriminating Against Victims Admitting Domestic Abuse Can Lead to Denial of Insurance Coverage," vol. XVIII, No. 26, dated Jun. 26, 1996, 2 pgs., as downloaded from http://web2.westlaw.com/result/documenttext.aspx?rs=WLW8.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
PersonalCapital.com, http://www.personalcapital.com/how-it-works printed Feb. 5, 2014 in 5 pages.
Peters, Peter-Paul, "A Spare Parts Configurator for the European Service Business" (Graduation Report); Honeywell, Industrial Service Logistic Center; Amsterdam, The Netherlands; 80 Pgs.; Mar. 2000.
Pipes, http://pipes.yahoo.com/pipes printed Feb. 18, 2013 in 1 page.
Planwise, http://planwise.com printed Feb. 8, 2013 in 5 pages.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Ponniah, Paulraj, "Data Warehousing Fundamentals: A Comprehensive Guide for IT Professionals", Wiley-Interscience Publication, pp. 257-289, 377-397, Aug. 3, 2001.
Porter, G. Zell, "An Economic Method for Evaluating Electronic Component Obsolescence Solutions", Retrieved from the web at www.gidep.org/data/dmsms/library/zell.pdf, May 1998, pp. 1-9.
"PostX to Present at Internet Showcase", PR Newswire, Apr. 28, 1997, pp. 2.
PostX, "PostX® Envelope and ActiveView", http://web.archive.org/web/19970714203719/http://www.postx.com/priducts_fm.html, Jul. 14, 1997 (retrieved Nov. 7, 2013) in 2 pages.
"PremierGuide Announces Release 3.0 of Local Search Platform", Business Wire, Mar. 4, 2004, Palo Alto, CA, p. 5574.
Press Release—"Helping Families Protect Against Identity Theft—Experian Announces FamilySecure.com; Parents and guardians are alerted for signs of potential identity theft for them and their

(56) References Cited

OTHER PUBLICATIONS children; product features an industry-leading $2 million guarantee"; PR Newswire; Irvine, CA; Oct. 1, 2007.
Primadesk, http://primadesk.com printed Feb. 8, 2013 in 1 page.
Privacy Rights Clearinghouse, "Identity Theft: What to do if it Happens to You," http://web.archive.org/web/19990218180542/http://privacyrights.org/fs/fs17a.htm printed Feb. 18, 1999.
"Qualifying for Debt Settlement", <http://www.certifieddebt.com/debt/settlement-qualifications.shtml> printed Jan. 9, 2013 in 2 pages.
Quantix Software, "Investment Account Manager," available at https://www.youtube.com/watch?v=1UwNTEER1Kk, as published Mar. 21, 2012.
"Quicken Support", http://web.archive.org/web/20071231040130/http://web.intuit.com/support/quicken/docs/d_qif.html as archived Dec. 31, 2007 in 6 pages.
Rahm, et al. "Data Cleaning: Problems and Current Approaches", Bulletin of the IEEE Computer Society Technical Committee on Data Engineering, Dec. 2000, vol. 23, No. 4, pp. 11.
Raman, et al., "Potter's Wheel: An Interactive Data Cleaning System", Proceedings of the 27th VLDB Conference, Roma, Italy, 2001, pp. 10.
Ramaswamy, Vinita M., Identity-Theft Toolkit, The CPA Journal, Oct. 1, 2006, vol. 76, Issue 10, pp. 66-70.
RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007.
Rawe, Julie; "Identity Thieves", Time Bonus Section, Inside Business, Feb. 2002, pp. 2.
"Recognition and use by Appraisers of Energy-Performance Benchmarking Tools for Commercial Buildings," prepared by the Institute for Market Transformation, NYSERDA, Feb. 2003, pp. 6.
Repici et al., "The Comma Separated Value (CSV) File Format", http://creativyst.com/Doc/Articles/CSV/CSV01.htm, Creativyst, Inc., 2002, pp. 10.
"Resolve Debt for Less: With Help from Freedom Financial" http://www.debtsettlementusa.com/ printed Jan. 9, 2013 in 6 pages.
Roos, Gina, "Web-Based Service Helps OEMs Cure Parts Obsolescence Blues", Electronic Engineering Times, p. 86, Oct. 8, 2001, Dialog 09056737 78968668.
Roth, Andrew, "CheckFree to Introduce E-Mail Billing Serving," American Banker, New York, Mar. 13, 2001, vol. 166, No. 49, pp. 3.
Rubin, Rita, "Cosmetic Surgery on Credit, Finance plans let patients reconstruct now, pay later," The Dallas Morning News, 2 pgs., dated Sep. 10, 1988.
Santarini, Michael, "Forecasts the Probable Obsolescence of Components—Module Predicts Parts Life", Electronic Engineering Times, Jan. 11, 1999, p. 48(1), Dialog 0607160353548246.
Sawyers, Arlena, "NADA to Offer Residual Guide", Automotive News, May 22, 2000, p. 3.
Sax, Michael M., Data Collection and Privacy Protection: An International Perspective, Presentation: Managing Online Risk and Liability Conference, Aug. 31, 1999, pp. 58.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Screenshot for Investment Account Manager v.2.8.3, published at http://www.aaii.com/objects/get/1642.gif by at least Aug. 30, 2011 in 1 page.
SearchAmerica, "Payment Advisor Suite™", Solutions, 2009, pp. 2.
"Settling Your Debts—Part 1 in Our Debt Settlement Series", http://www.creditinfocenter.com/debt/settle_debts.shtml printed Jan. 9, 2013 in 6 pages.

Selz, Michael, "Lenders Find Niche in Cosmetic Surgery That Isn't Insured—But Since You Can't Repossess a Nose Job, Risks Aren't Restricted to the Patients," Wall Street Journal, New York, N.Y., Jan. 1997, p. A.1, 3 pgs.
ShoeBoxed, https://www.shoeboxed.com/sbx-home/ printed Oct. 16, 2012 in 4 pages.
Simpson, Glyn, "Microsoft (MS) Money (MSMoney FAQ, Help and Information Pages", pp. 2, Copyright © Glyn Simpson 1998-2007, http://web.archive.org/web/20071018075531/http://money.mvps.org/faq/article/196.aspx.
Singletary, Michelle, "The Littlest Victims of ID Theft", The Washington Post, The Color of Money, Oct. 4, 2007.
Storage Made Easy(SME), http://storagemadeeasy.com printed Feb. 6, 2013 in 1 page.
Smith, Richard M., "The Web Bug FAQ", Nov. 11, 1999, Version 1.0, pp. 4.
Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.
"StarNet Financial, Inc. Acquires Proprietary Rights to Sub-Prime Underwriting System Through Strategic Alliance With TRAkkER Corporation", PR Newswire, Dallas, TX, Sep. 13, 1999.
State of Wisconsin, Division of Health Care Financing, Department of Health and Family Services: 1999-2001 Biennial Report, pp. 17-21.
Stein, Benchmarking Default Prediction Models: Pitfalls and Remedies in Model Validation, Moody's KMV, Revised Jun. 13, 2002, Technical Report #020305; New York.
Stone, "Linear Expenditure Systems and Demand Analysis: An Application to the Pattern of British Demand", The Economic Journal: The Journal of The Royal Economic Society, Sep. 1954, pp. 511-527, vol. LXIV, Macmillan & Co., London.
Sullivan, Laurie, "Obsolete-Parts Program Thriving", EBN, Manhasset, Issue 1296, p. 26, Jan. 2002, ProQuest 10 101195090.
Tao, Lixin, "Shifting Paradigms with the Application Service Provider Model"; Concordia University, IEEE, Oct. 2001, Canada.
Texas Department of Human Services, 1999 Annual Report, 60 Years of Progress, Medial Services 9P137, Publication No. DHS-600-FY99.
thatlook.com, Cosmetic Surgery Financing, 3 pgs, as downloaded from http://web.archive.org/web/200001214113900/www.thatlook.com/cosmetic_surger_financing.cfm (1 of 2) [Oct. 15, 2008 4:11:47 PM].
Thoemmes, Felix, "Propensity Score Matching in SPSS", Center for Educational Science and Psychology, University of Tübingen, Jan. 2012.
Thomas, David, "Report on Networks and Electronic Communications Newcourt Credit Turns to Extranet Services / A PC Connects to 1,200 Users at Once", The Globe and Mail (Canada), Section: Report on Business Special Report, Nov. 12, 1996, pp. 2.
TRAkkER Corporation website, trakkercorp.com, TRAkkER Software Description, May 26, 2000, available at http://web.archive.org/web/20000526234204/http://trakkercorp.com/page4.html.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
US Legal, Description, http://www.uslegalforms.com/us/US-00708-LTR.htm printed Sep. 4, 2007 in 2 pages.
Vamosi, Robert, "How to Handle ID Fraud's Youngest Victims," Nov. 21, 2008, http://news.cnet.com/8301-10789_3-10105303-57.html.
Various Posts from the http://www.2p.wrox.com Forums: http://web.archive.org/web/2005045221950/http://p2p.wrox.com/topic.asp?TOPIC_ID=6513, dated Nov. 15, 2003-Oct. 7, 2004.
Waggoner, Darren J., "Having a Global Identity Crisis," Collections & Credit Risk, Aug. 2001, vol. vol. 6, No. 8, pp. 6.
"WashingtonPost.com and Cars.com launch comprehensive automotive web site for the Washington area", PR Newswire, Oct. 22, 1998.
Washington State Office of Public Defense, "Criteria and Standards for Determining and Verifying Indigency," dated Feb. 9, 2001.

(56) References Cited

OTHER PUBLICATIONS

Web Page posted at: http://web.archive.org/web20040805124909/http://www.oracle.com/technology/sample_codete/tech/pl_sql/htdocs/x/Case/start.htm, pp. 1 and 4 of the webpages posted on Jan. 7, 2003.
Webpage printed from http://www.magnum.net/pdfs/RapUpBrochure.pdf as printed Mar. 3, 2008.
"We Eliminate Bad Debt", as printed from http://www.webcreditbureau.com/start/, dated Aug. 22, 2012, 1 Page.
Webster, Lee R., "Failure Rates & Life Cycle Costs", Consulting-Specifying Engineer; 23, 4; ABI/INFORM Global, Apr. 1998, p. 42.
"Web Site Fuels Elective Surgery Trend; The Complete Resource to Paying for Cosmetic Surgery, Laser Vision Correction and Cosmetic Dentistry," Business Wire, Apr. 7, 1999, pp. 2.
Window on State Government, Susan Combs, Texas Comptroller of Public Accounts, Chapter 8: Health and Human Services, "Improve the Medicaid Eligibility Determination Process," 9 pgs., as downloaded at http://www.window.state.tx.us/etexas2001/recommend/ch08.
Wisconsin Department of Workforce Development, BadgerCare Medicaid Application Credit Report Authorization Form, dated Jun. 21, 2001, effective date, Jul. 1, 2001.
Wisconsin Department of Workforce Development, BadgerCare Medicaid Notification of Eligibility, dated Jul. 25, 2000, effective date, Jul. 1, 2000.
Working, Holbrook, "Statistical Laws of Family Expenditure", Journal of the American Statistical Association, pp. 43-56, vol. 38, American Statistical Association, Washington, D.C., Mar. 1943.
Yahoo! Search, "People Search," http://people.yahoo/com printed Nov. 16, 2010 in 1 page.
Yodlee | Money Center, https://yodleemoneycenter.com/ printed Feb. 5, 2014 in 2 pages.
You Need a Budget, http://www.youneedabudget.com/features printed Feb. 5, 2014 in 3 pages.
Zapier, "Integrate Your Web Services," http://www.Zapier.com printed Feb. 18, 2013 in 3 pages.
Zoot—Decision Engine, www.zootweb.com/decision_engine.html, as printed on Mar. 3, 2008.
Zoot—Pre-Built Standard Attributes, www.zootweb.com/credit_attributes.html as printed Mar. 3, 2008.
Declaration of Paul Clark, DSc. for Inter Partes Review of U.S. Pat. No. 8,504,628 (Symantec Corporation, Petitioner), dated Jan. 15, 2014 in 76 pages.
Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al.* v. *Experian Marketing Solutions. Inc.*, No. 2:12-cv-00513-JRG (E.D. Tex.)) filed Jan. 14, 2014 in 9 pages.
First Amended Complaint in Civil Action No. 2:12-cv-511-JRG (*Rpost Holdings, Inc. and Rpost Communications Limited* V. *Constant Contact, Inc.; et al.*) filed Feb. 11, 2013 in 14 pages.
First Amended Complaint in Civil Action No. 2:12-cv-511-JRG (*Rpost Holdings, Inc. and Rpost Communications Limited* V. *Epsilon Data Management, LLC*.) filed Sep. 13, 2013 in 9 pages.
First Amended Complaint in Civil Action No. 2:12-cv-513-JRG (*Rpost Holdings, Inc. and Rpost Communications Limited* V. *Experian Marketing Solutions, Inc.*) filed Aug. 30, 2013 in 9 pages.
Petition for Covered Business Method Patent Review in U.S. Pat. No. 8,161,104 (*Experian Marketing Solutions, Inc., Epsilon Data Management, LLC*, and *Constant Contact, Inc.*, v. *Rpost Communications Limited*) dated Jan. 29, 2014 in 90 pages.
Source Code Appendix attached to U.S. Appl. No. 08/845,722 by Venkatraman et al., Exhibit A, Part 1 & 2, pp. 32.
International Search Report and Written Opinion in PCT Application No. PCT/US07/76152, dated Mar. 20, 2009.
Official Communication in Australian Patent Application No. 2012281182, dated Jul. 8, 2014.
Official Communication in European Patent Application No. 12811546.6, dated Nov. 25, 2014.
Official Communication in Russian Patent Application No. 2014101674/08, dated Dec. 15, 2014.
International Search Report and Written Opinion for Application No. PCT/US2012/046316, dated Sep. 28, 2012.
International Preliminary Report on Patentability and Written Opinion for Application No. PCT/US2012/046316, dated Jan. 14, 2014.
International Search Report and Written Opinion for Application No. PCT/US09/60393, dated Dec. 23, 2009.
International Search Report and Written Opinion for Application No. PCT/US09/37565, dated May 12, 2009.
International Search Report and Written Opinion for Application No. PCT/US2010/034434, dated Jun. 23, 2010.
International Preliminary Report on Patentability for Application No. PCT/US2010/034434, dated Feb. 4, 2014.
International Search Report and Written Opinion for Application No. PCT/US2013/052342, dated Nov. 21, 2013.
International Preliminary Report on Patentability for Application No. PCT/US2013/052342, dated Feb. 5, 2015.
International Search Report and Written Opinion for Application No. PCT/US2013/072102, dated Apr. 18, 2014.
International Search Report and Written Opinion for Application No. PCT/US2014/019142, dated Jun. 20, 2014.
"A New Approach to Fraud Solutions", BasePoint Science Solving Fraud, pp. 8, 2006.
Actuate, "Delivering Enterprise Information for Corporate Portals", White Paper, 2004, pp. 1-7.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
Anonymous, "Feedback", Credit Management, ABI/INFORM Global, Sep. 2006, pp. 6.
"Beverly Hills Man Convicted of Operating 'Bust-Out' Schemes that Caused More than $8 Million in Losses", Department of Justice, Jul. 25, 2006, 2 Pgs.
Brick, et al. "Unit and Item Response, Weighting, and Imputation Procedures in the 1993 National Household Education Survey (NHES:93)" U.S. Department of Education. National Center for Education Statistics, Working Paper No. 97-05, Washington, D.C., pp. 30, Feb. 1997.
"Bust-Out Schemes", Visual Analytics Inc. Technical Product Support, Newsletter vol. 4, Issue 1, Jan. 2005, pp. 7.
Cáceres, et al., "Measurement and Analysis of IP Network Usage and Behavior", IEEE Communications Magazine, pp. 144-151, May 2000.
Census Geography, Excerpted from the Geographic Reference Manual, Nov. 1994, pp. 5.
Chiba et al., "Mobility Management Schemes for Heterogeneity Support in Next Generation Wireless Networks", 3rd EuroNGI Conference on, 2007, pp. 143-150.
Equifax Consumer Credit Report http://www.equifax.com/home/, as retrieved on Sep. 17, 2008.
Equifax; "Equifax Credit Watch"; https://www.econsumer.equifax.co.uk/consumer/uk/sitepage.ehtml, dated Jun. 27, 2007 on www.archive.org.
Experian Consumer Credit Report http://www.experian.com/, as retrieved on Sep. 17, 2008.
Experian: Improve Outcomes Through Applied Customer Insight, Brochure, Nov. 2009, pp. 20.
Experian: Mosaic Geodemographic Lifestyle Segmentation on ConsumerView [Data Card], as printed from http://datacards.experian.com/market?page=research/datacard_print&prin, Apr. 6, 2012, pp. 4.
Experian: Mosaic Public Sector 2009 Launch, 2009, pp. 164.
Experian: Mosaic United Kingdom, Brochure, Jun. 2009, pp. 24.
Experian: Mosaic UK-Optimise the Value of Your Customers and Locations, Now and in the Future, Brochure, 2010, pp. 24.
Experian: Mosaic UK—Unique Consumer Classification Based on In-Depth Demographic Data, as printed from http://www.experian.co.uk/business-strategies/mosaic-uk.html, Jul. 30, 2012, pp. 2.
Experian: Mosaic USA, Brochure, May 2009, pp. 14.

(56) References Cited

OTHER PUBLICATIONS

Experian: Mosaic USA-Consumer Lifestyle Segmentation [Data Card], Dec. 2009, pp. 2.
Experian: Public Sector, as printed form http://publicsector.experian.co.uk/Products/Mosaicpublicsector.aspx, 2012, pp. 2.
FamilySecure.com; "Identity Theft Protection for the Whole Family | FamilySecure.com" http://www.familysecure.com/, as retrieved on Nov. 5, 2009.
Fenner, Peter, "Mobile Address Management and Billing for Personal Communications", 1st International Conference on Universal Personal Communications, 1992, ICUPC '92 Proceedings, pp. 253-257.
"Fighting the New Face of Fraud", FinanceTech, http://www.financetech.com/showArticle.jhtml?articleID=167100405, Aug. 2, 2005.
Gualtieri et al., "The Forrester Wave™: Big Data Streaming Analytics, Q1 2016", Forrester®, Mar. 30, 2016, pp. 14, https://www.sas.com/content/dam/SAS/en_us/doc/analystreport/forrester-big-data-streaming-analytics-108218.pdf.
Harrington et al., "iOS 4 in Action", Chapter 17, Local and Push Notification Services, Manning Publications Co., Jun. 2011, pp. 347-353.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Lobo, Jude, "MySAP.com Enterprise Portal Cookbook," SAP Technical Delivery, Feb. 2002, vol. 1, pp. 1-13.
Merriam Webster's Collegiate Dictionary, 10th Edition, 1999, p. 79.
Meyers et al., "Using Your Social Networking Accounts to Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.
Microsoft, "Expand the Reach of Your Business," Microsoft Business Solutions, 2004, in 16 pages.
Mint.com, http://www.mint.com/ printed Sep. 18, 2008 in 2 pages.
"Mosaic" (geodemography), available from http://en.wikipedia.org/wiki/Mosaic_(geodemography), as last modified Jul. 13, 2012. pp. 4.
MS Money Software by Microsoft http://www.microsoft.com/Money/default.mspx as retrieved on Sep. 17, 2008.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
Quicken Online by Intuit http://www.quicken.intuit.com/, as retrieved on Sep. 17, 2008.
SAS, "SAS® Information Delivery Portal", Fact Sheet, 2008, in 4 pages.
Schneier, B. "Applied Cryptography", John Wiley & Sons, Second Edition, pp. 435-447, 1996.
Stallings, W. "Cryptography and Network Security Principles and Practice", Prentice Hall, Second Edition, pp. 295, 297, Jul. 15, 1998.
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", e-News, Experian: Decision Analytics, pp. 4, [Originally Published in Retail Banker International Magazine Jul. 24, 2007].
Sun, Hung-Min, "An Efficient Remote Use Authentication Scheme Using Smart Cards", IEEE Transactions on Consumer Electronics, Nov. 2000, vol. 46, No. 4, pp. 958-961.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion Consumer Credit Report http://www.transunion.com/, as retrieved on Sep. 17, 2008.
Web Pages printed Nov. 2, 2004 of Internet Draft entitled "Tunneling SSL Through a WWW Proxy", Luotonen, Ari, Netscape Communications Corporation (Dec. 14, 1995); 4 pages. http://muffin.doit.org/docs/rfc/tunneling.sub.--ssl.html.
Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.
Webpage printed out from http://www.fairisaac.com/NR/rdonlyres/AC4C2F79-4160-4E44-B0CB-5C899004879A/0/ScoreNetnetworkBR.pdf on Mar. 4, 2008.
Wesabe.com http://www.wesabe.com/, as retrieved on Sep. 17, 2008.
Williams, Mark, "Results of the 1998 NASFAA Salary Survey", News from NASFAA, 1998.
Wilson, Andrea, "Escaping the Alcatraz of Collections and Charge-Offs", http://www.transactionworld.net/articles/2003/october/riskMgmt1.asp, Oct. 2003.
Wood, Greg, "Top Streaming Technologies for Data Lakes and Real-Time Data", http://blog.zaloni.com/top-streaming-technologies-for-data-lakes-and-real-time-data, Sep. 20, 2016 in 3 pages.
Official Communication in Australian Patent Application No. 2012281182, dated May 19, 2015.
Official Communication in Chinese Patent Application No. 201280041782.2, dated Mar. 4, 2016.
Official Communication in European Patent Application No. 12811546.6, dated Sep. 18, 2015.
Official Communication in Australian Patent Application No. 2013356451, dated Jun. 22, 2015.
Official Communication in Chinese Patent Application No. 201380006862.9, dated Aug. 2, 2016.
Official Communication in European Patent Application No. 13860724.7, dated May 21, 2015.
Official Communication in Russian Patent Application No. 2014127000, dated Dec. 23, 2015.
International Preliminary Report on Patentability and Written Opinion for Application No. PCT/US2013/072102, dated Jun. 9, 2015.
Official Communication in Australian Patent Application No. 2014203430, dated Aug. 15, 2015.
Official Communication in Chinese Patent Application No. 201480000626.0, dated Aug. 1, 2016.
Official Communication in European Patent Application No. 14733951.9, dated Sep. 11, 2015.
International Preliminary Report on Patentability and Written Opinion for Application No. PCT/US2014/019142, dated Sep. 17, 2015.
U.S. Appl. No. 60/168,272, dated Dec. 1, 1999 in 14 pages.
U.S. Appl. No. 60/168,276, dated Dec. 1, 1999 in 82 pages.
U.S. Appl. No. 60/213,367, dated Jun. 23, 2000 in 20 pages.
U.S. Appl. No. 09/653,595, dated Aug. 31, 2000.

\* cited by examiner

SYSTEMS AND METHODS FOR DATA VERIFICATION

CROSS-REFERENCE TO RELATED APPLICATION

This application is a continuation of U.S. patent application Ser. No. 13/302,414, filed Nov. 22, 2011, which claims the benefit of priority under 35 U.S.C. §119(e) of U.S. Provisional Application No. 61/416,259, filed Nov. 22, 2010 and titled SYSTEMS AND METHODS FOR INCOME AND EMPLOYMENT VERIFICATION, the disclosure of which is hereby incorporated by reference in its entirety into this application.

BACKGROUND

Various service providers including, for example, lenders and insurance carriers wish to verify data provided to them by applicants to their services. The data to be verified may include income and employment, assets, healthcare claims, clinical data, and the like. Often, the data being verified may be subject to contractual, regulatory and/or privacy restrictions making it difficult or impossible for the owners of the data (including for example payroll processors and other entities possessing data with personally identifying information of individuals and businesses) to share or communicate the data with third parties such as the service providers.

SUMMARY OF THE DISCLOSURE

Embodiments of the invention are directed to methods and systems for verifying data including income and employment, assets, healthcare claims, clinical data, and other types of data that may be subject to various regulatory and/or privacy restrictions.

BRIEF DESCRIPTION OF THE DRAWINGS

Specific embodiments of the invention will now be described with reference to the following drawings, which are intended to illustrate embodiments of the invention, but not limit the invention.

DETAILED DESCRIPTION OF CERTAIN EMBODIMENTS

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions described herein.

In one embodiment, the data verification system described herein is designed to verify consumers' data without the data, nor the consumer's personally identifying information ever leaving the data owning entity (such as, for example, a payroll processor having payroll data, a brokerage processing provider having asset holdings data or a bank having data regarding deposits and balances). The data verification system may include a verification engine and a decision system. The verification engine may send a series of inquiries to the data owning entities, and the entities may simply provide affirmative or negative responses to each of the inquiries without providing personal data or identifying information regarding the consumer. The decision system may be used to process data transmitted to and received from the data owning entities. The decision system may include various modules to (1) assign a personal identification number (PIN) to individual files on the data owning entity databases, (2) match requests received at the data verification system regarding consumers to specific files on the data owning entity databases using the PINs, (3) apply rules to respond to the requests received in the form of a series of inquiries. In some embodiments, some or all of the decision system could be a hardware module installed on the data owner entity's location. In other embodiments, some or all of the decision system could be software that is distributed to the data owning entities.

Example System Implementation

Figure 1:
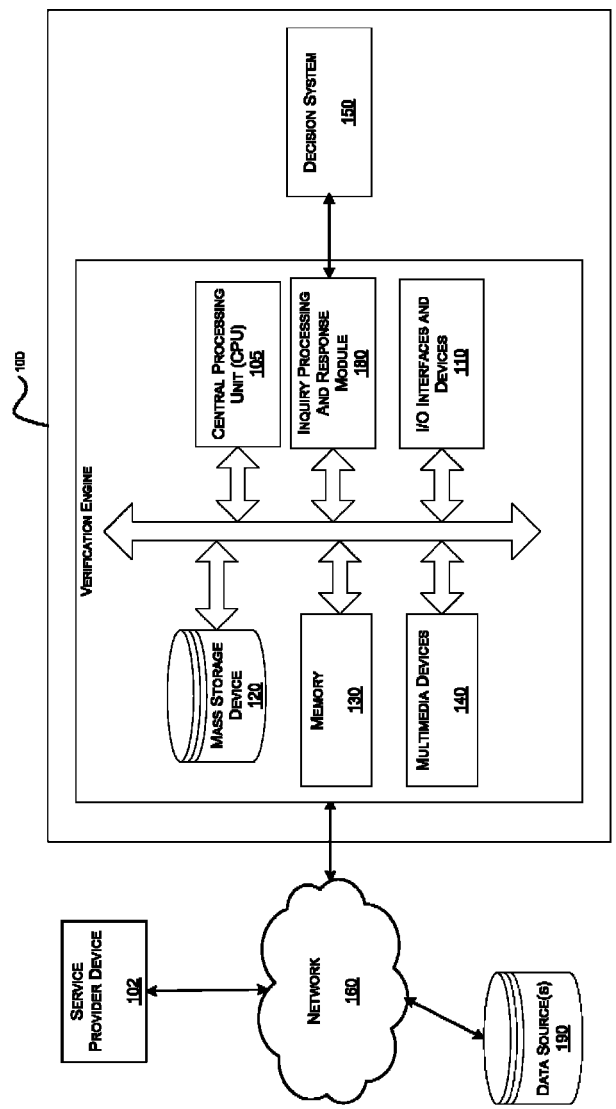
FIG. 1 is a block diagram of a computing system for verifying data according to one embodiment.

FIG. 1 is a block diagram showing an embodiment in which a computing system 100 is in communication with a network 160 and various systems are also in communication with the network 160. The computing system 100 may be used to implement systems and methods described herein. For example, the computing system 100 may be a data verification system configured to provide data verification for service providers, or other entities interested in verifying data provided by consumers. In the embodiment of FIG. 1, the verification engine and the decision system 150 are shown to be local to one another. In other embodiments, the decision system 150 may be remote to the verification engine. In such embodiments, the decision system 150 may include the same hardware and software components as the computing system 100 described herein.

Although the description provided herein refers to individuals, consumers, applicants or customers, the terms "user," "individual," "consumer," "applicant" and "customer" should be interpreted to include groups of individuals, such as, for example, married couples or domestic partners, organizations, groups, and business entities.

The computing system 100 includes, for example, a personal computer that is IBM, Macintosh, or Linux/Unix compatible or a server or workstation. In one embodiment, the computing system 100 comprises a server, a laptop computer, a cell phone, a personal digital assistant, a kiosk, or an audio player, for example. In one embodiment, the exemplary computing system 100 includes one or more central processing unit ("CPU") 105, which may each include a conventional or proprietary microprocessor. The computing system 100 further includes one or more memory 130, such as random access memory ("RAM") for temporary storage of information, one or more read only memory ("ROM") for permanent storage of information, and one or more mass storage device 120, such as a hard drive, diskette, solid state drive, or optical media storage device. Typically, the modules of the computing system 100 are connected using a standard based bus system. In different embodiments, the standard based bus system could be implemented in Peripheral Component Interconnect ("PCP"), Microchannel, Small Computer System Interface ("SCSI"), Industrial Standard Architecture ("ISA") and Extended ISA ("EISA") architectures, for example. In addition, the functionality provided for in the components and modules of computing system 100 may be combined into fewer components and modules or further separated into additional components and modules.

The computing system 100 is generally controlled and coordinated by operating system software, such as Windows XP, Windows Vista, Windows 7, Windows Server, Unix, Linux, SunOS, Solaris, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 1, the I/O devices and interfaces 110 provide a communication interface to various external devices. In the embodiment of FIG. 1, the computing system 100 is electronically coupled to a network 160, which comprises one or more networks, such as one or more of a LAN, WAN, and/or the Internet, for example, via a wired, wireless, or combination of wired and wireless, communication link. The network 160 communicates with various computing devices and/or other electronic devices via wired or wireless communication links.

According to FIG. 1, information is provided to the computing system 100 over the network 160 from one or more data sources 190. The information supplied by the various data sources 190 may include information regarding payroll data, income data, employment data, asset holdings data, deposit data, account balance data, healthcare claims data, clinical data verification data, and/or other types of data, for example. The data on the various data sources 190 may also include personally identifying information. In various embodiments, information supplied by the various data sources 190 does not include the actual data and personally identifying information stored on the data sources, but simply responses to inquiries regarding such data associated with such personally identifying information.

In addition to the devices that are illustrated in FIG. 1, the network 160 may communicate with other data sources or other computing devices. In addition, the data sources may include one or more internal and/or external data sources. In some embodiments, one or more of the data structures or data sources may be implemented using a relational database, such as Sybase, Oracle, CodeBase and Microsoft® SQL Server as well as other types of data structures such as, for example, a flat file data structure, an entity-relationship data structure, an object-oriented data structure, and/or a record-based data structure.

A service provider device 102 may be connected to the network 160 and used by a service provider to exchange information with the computing system 100. For example, the service provider device 102 may be used to transmit information related to an individual or business applying for a service offered by the service provider, and the computing system 100 may respond to the information received from the service provider device 102 by providing a report for display to the service provider using the service provider device 102 to facilitate the decision of the service provider on whether to provide the service to the individual or business, for example. The service provider device 102 may be a desktop computer, a mobile computer, or any other mobile device such as a mobile phone or other similar handheld computing devices. The service provider device 102 may include the same or similar components to those discussed above with reference to the computing system 100.

In the embodiment of FIG. 1, the computing system 100 also includes an inquiry processing and response module 180 that may be stored in the mass storage device 120 as executable software codes that are executed by the CPU 105. In the embodiment shown in FIG. 1, the computing system 100 is configured to execute the inquiry processing and response module 180, among others, in order to handle various aspects for providing requesting entities with information that may be useful to determine whether to extend credit services to individuals and/or businesses, for example.

In general, the word "module," as used herein, refers to logic embodied in hardware or firmware, or to a collection of software instructions, possibly having entry and exit points, written in a programming language, such as, for example, Java, Lua, C or C++. These modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Figure 2:
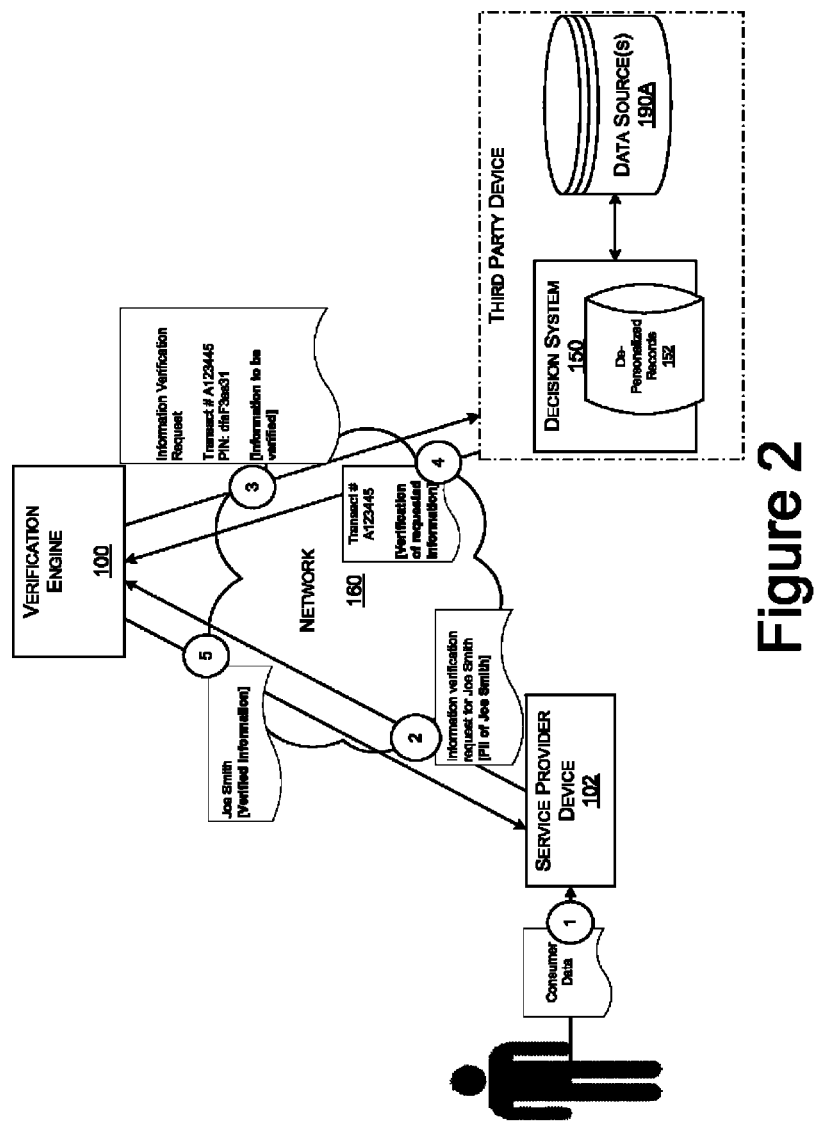
FIG. 2 is a diagram illustrating various components of a data verification system, and their interactions, in accordance with one embodiment.

FIG. 2 is a diagram illustrating various components of the data verification system 100, and their interactions, in accordance with one embodiment. In the embodiment of FIG. 2, a consumer, say Joe Smith, may provide a service provider, consent for verification of information regarding the consumer. As illustrated in step 1 of FIG. 2, the consumer may provide this consent through the service provider device 102. The consumer may also provide personally identifying information (PII), such as his name and address and/or any other PII, such as Social Security Number (SSN), data of birth, etc. The service provider may then wish to verify information regarding Joe Smith. For example, the service provider 102 (e.g., a bank, lender, financial institution, online service provider, etc.) may want to verify an income level, employment status, employer, or any other information of the consumer. As illustrated in step 2, the service provider device 102 may send an information verification request to the verification engine 100. The request from the service provider may include the consumer's PII.

Upon receipt of the request, the verification engine 100 may determine a personal identification number (PIN) associated with the consumer. In one embodiment, the verification engine 100 develops unique PINs for individuals based on information available to the verification engine 100. For example, the verification engine 100 may be part of a credit bureau that has access to credit data of millions of individuals. In this embodiment, the verification engine 100 may assign unique and persistent identifiers to each individual so that data received and transmitted regarding individuals can be uniquely correlated with an individual without identifying PII of the individual. The verification engine 100 may store the PINs in a data structure so that when a request for a PIN of a consumer is received, the verification engine 100 can initially look up the consumer in the can data structure. In one embodiment, the verification engine 100 requests pins for consumers from a separate entity and/or computing device. For example, the verification engine 100 may send a "find consumer" request to another device that uses the personal information of the consumer to correlate the consumer with a PIN. A PIN data structure may be compiled by the verification engine 100 on a periodic and/or batch basis. In some embodiments, the list may be created and/or updated daily. In some embodiments, the PINs may be encrypted before transmission outside of the verification engine 100 and/or prior to receipt by the verification engine 100 in the embodiment where a separate entity and/or device identifies PINs of consumers.

Upon receipt of the request, the verification engine 100 may also generate a transaction number for the request. At step 3, the request, including the consumer PIN, the transaction number, and a list of possible response ranges for the information to be verified are sent to the third party device. As discussed further below, the information verification request may include specific information that the third-party device can either confirm or deny regarding the individual, rather than an open ended query regarding the consumer. For example, rather than a request for the yearly income of the consumer, the information verification request may include a specific income range (e.g., the range may have been self-reported by the consumer) with a request for the third-party device to confirm that the consumer's income is within that specific income range. Similarly, in some embodiments the information verification request may include multiple possible ranges of information for verification, such as multiple income ranges.

In the embodiment of FIG. 2, the decision system 150 is physically located separately from the verification engine 100 (in contrast to the configuration illustrated in FIG. 1 where the decision system 150 is part of the verification engine 100). For example, the decision system 150 may be located at the third-party entity that is owner of the data source 190A illustrated in FIG. 2. In one embodiment, the decision system 150 is provided by the entity that controls and/or operates the verification engine 100. In this embodiment, the decision system 150 includes a data structure 152 with depersonalized records from the data source 190A. For example, the decision system 150 may access the consumer records in the data source 190A in order to assign PINs to the consumer records in the same or similar manner as the PINs are identified by the verification engine 100. Thus, the depersonalized records 152 may include a series of PINs each associated with an individual consumer's data from the data source 190A. Accordingly, use of the decision system 150, and the depersonalized records 152, allows the decision system 150 to respond to information verification requests from the verification engine 100 without accessing or providing the actual data from the data source 190A or PII of the consumers. This process will be further illustrated in the following figures.

Depending on the embodiment, the decision system 150 may associate PINs with the consumer information on the data source 190A in one of various manners. In one embodiment, the decision system 150 may transmit consumer information from the data source 190A (e.g., consumer name, address, Social Security number, etc.) to the verification engine 100 and/or a separate entity or device that associates PINs with consumers. In one embodiment, the verification engine 100 and the decision system 150 each communicate with a common PIN determination entity or device to obtain PINs of consumers. In one embodiment, the decision system 150 accesses the consumer information in the data source 190A periodically, such as hourly, daily, or weekly, and transmits consumer information associated with new data on the data source 190A for assignment of PINs. Thus, a list of consumer information may be transmitted to a separate entity or device, which assigns PINs to the consumer information and returns the list of PINs to the decision system 150. The decision system 150 may then store the PINs with other information regarding the consumer from the data source 190A, without storing the PII of the consumer, in the depersonalized records 152.

In another embodiment, the decision system 150 may actually have logic to assign PINs to consumers in the same or similar manner as the verification engine 100 and/or the separate entity or device that determines PINs. For example, the provider of the verification engine 100 may encode an algorithm to determine PINs of consumers in the decision system 150 so that the personal information of the consumers (in data source 190A) does not ever need to leave the third-party device.

As illustrated in step 4, the decision system 150 may respond to the information verification request from the verification engine 100 with a transaction ID and indications of which information requested of the consumer is verified.

For example, if the information verification request includes 100 pieces of information for which verification is requested by the third-party device, the response that is sent from the decision system 150 may simply include indications of whether or not each of the 100 pieces of information is verified, such as in the format of a list of 100 yes/no indicators or true/false flags, a list of only the items that are verified (or not verified), or in any other format.

Next, at step 5, the verification engine 100, using the responses from the decision system 150 at the third party, returns a response to the service provider device 102. For example, the verification engine 100 may parse the results from the decision system 150 in order to determine which information regarding the consumer is verified. Thus, if the response from the decision system 150 is a list of 100 true/false flags, the verification engine 100 may match the flags with the specific information that was requested in order to determine which information was verified by the third party (based on information in the data source 190A). As illustrated in step 5, the response provided to the service provider device 102 may include the consumer's name and the verified information. In one embodiment, the verification engine 100 may incorporate the request for such verification with a credit inquiry response, a scoring model, or any other information that the verification engine 100 can access.

Figure 3:
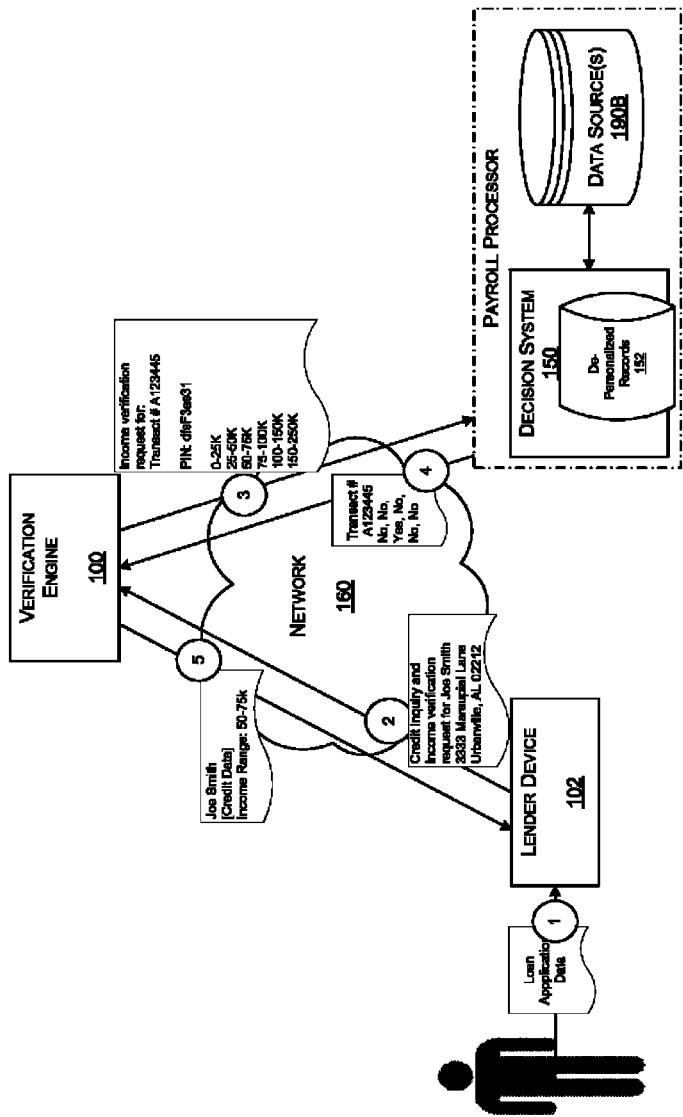
FIG. 3 is a diagram illustrating various components of a data verification system, and their interactions, in accordance with another embodiment.

FIG. 3 is a diagram illustrating various components of the data verification system 100, and their interactions, in accordance with another embodiment. In the embodiment of FIG. 3, as part of a loan application, a consumer, say Joe Smith, may provide a creditor, such as a lender, a loan application including consent for a credit inquiry and income verification regarding the consumer. As illustrated in step 1 of FIG. 3, the consumer may provide this loan application data to the lender device 102. The loan application may also include Joe Smith's PII, such as his address and/or his Social Security Number (SSN). The lender may then wish to obtain Joe Smith's credit report, and also to verify his income. In the embodiment of FIG. 3, the verification engine 100 provides both credit data and verifies income information of consumers. Thus, the lender can advantageously request both the credit report and income verification information in a single request from the verification engine 100. In other embodiments, other information may be provided by the verification engine 100, in addition of verification of information based on data from one or more third party data sources.

As illustrated in step 2, the lender may send a credit inquiry and income verification request to the verification engine 100. The request from the lender may include Joe Smith's PII. In this embodiment, the income verification request is in conjunction with the credit inquiry. In other embodiments, the requests may be separate.

Upon receipt of the request, the verification engine 100, based on his PII, determines the PIN associated with Joe Smith, and also generates a transaction number for the request. At step 3, the request, including the PIN, the transaction number, and a number of gross income ranges are sent to the decision system 150. In the embodiment of FIG. 3, the third party that is making use of the decision system 150 is a payroll processor that has information regarding payroll data of consumers in data source 190B that is associated with consumer PINs and stored in the depersonalized records 152 of the decision system 150.

In the example of FIG. 3, the verification engine 100 is requesting that the decision system 150 check whether or not the consumer's income is within each of the provided income ranges and provide back a response to each of the income range requests. In some embodiments, the number of the ranges of gross income may be about 5 to about 30. In other embodiments, the request may include an indication that all available income ranges are checked, or may request that an income range is provided by the decision system 150 without including one or more income ranges in the income verification request. In some embodiments, the decision system 150 may be located on the computing system of a payroll processor.

In some embodiments, the payroll processor may further comprise a firewall that monitors verification requests coming into the decision system 150 and or communications between the decision system 150 and the data source 190B. As noted above, the decision system 150 may process inquiries in real time or in batch mode. The decision system 150 may also comprise rules management technology, as well as other modules such as strategy management modules for processing the consumer data stored on the data source 190B and provide depersonalized data to the verification engine. For example, the decision system 150 may include logic for combining multiple data records associated with an individual (or group of individuals) in order to determine characteristics of the individuals, such as an annual gross income that is determined based on a series of biweekly payroll data stored in the data source 190B. The decision system 150 may also include match logic and various interfaces to connect to various payroll processor databases. In some embodiments, the data contained by the payroll processor may remain with the payroll processor.

As illustrated in step 4, the decision system 150 may respond to the income verification request from the verification engine 100 with the transaction ID along with an indication of whether the consumer's income falls within each of the requested income ranges, such as may be determined by the decision system 150 accessing the data sources 190. In some embodiments, the response may be in relation to a year-to-date indication of income and/or a prior year's income. In some embodiments, the response may be based on an estimated income. In other embodiments the response may provide further input. In one embodiment, the request from the verification engine may have a single transaction ID, but request information regarding more than one consumer. In this embodiment, the response may include verification information regarding multiple consumers with multiple PINs. In some embodiments, the response sent from the decision system 150 at the payroll processor does not include the specific income of the consumer, nor any other personally identifying information associated with the consumer. In other embodiments, the response may include an indication of no record found, and/or an indication of a partial match only.

Next, at step 5, the verification engine 100, using the responses from the decision system 150 at the payroll processor, returns a response to the lender device 102. As illustrated in step 5, the response may include the consumer's name, the credit information requested, as well as the gross income range. The verification engine 100 may incorporate the request for such verification with a credit inquiry response or with a scoring model. The verification engine 100 may also track the requests from the lender device 102 (e.g., in a log of requests and associated responses), for support of consumer dispute and/or other services provided to users of the verification system, for example. In some embodiments, the response from the verification engine 100 to the service provider (e.g., the lender device 102) may simply be that no income verification is required. The response from the verification engine 100 may also be to provide a gross income/taxable earnings estimate (such as employer wages) based on responses received from the decision system 150. The response may also include a report for multiple verification requests for a single consumer, which may have income reported by several payroll processors. The response may also include a report for multiple verification requests for two consumers in a joint application, which may be associated with one or more payroll processors.

Figure 4:
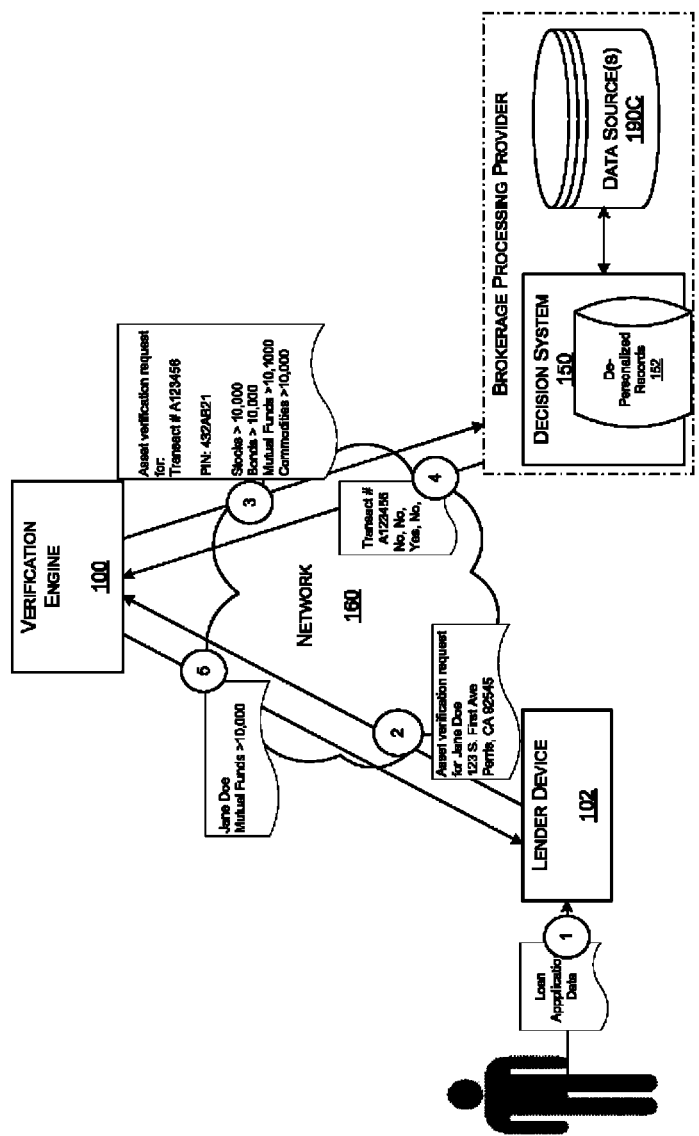
FIG. 4 is a diagram illustrating various components of a data verification system, and their interactions, in accordance with another embodiment.

FIG. 4 is a diagram illustrating various components of a data verification system, and their interactions, in accordance with another embodiment. In the embodiment of FIG. 4, as part of a loan application, a consumer, say Jane Doe, may provide a creditor, such as a lender, a loan application including consent for credit inquiry and asset holdings verification. As illustrated in step 1, the consumer may provide this loan application data to the lender device 102. The loan application may also include Jane Doe's PII such as her name and address, and/or her Social Security Number (SSN). The lender may then wish to verify Jane Doe's asset holdings. As illustrated in step 2, the lender may send an asset holdings verification request to the verification engine 100, which may include Jane Doe's PII. In some embodiments, the asset holdings verification request may be in conjunction with a credit inquiry, scoring model request, or request for other information that may be provided by the verification engine 100.

Upon receipt of the request, the verification engine 100 may determine Jane Doe's PIN and also generate a transaction number for the request. At step 3, the request, including the PIN, the transaction number, and a list of possible asset holdings are sent to the decision system 150. In some embodiments, the list of possible asset holdings may also include an associated minimum estimated market value for each asset type. In other embodiments, the list may also include an associated estimated market value range for each asset type. In the example of FIG. 4, the decision system 150 is located at a brokerage processing provider, so that the brokerage data (in the data source 190C) may be accessed by the decision system 150 in order to associate PINs with consumer data in the data source 190C and store the depersonalized data in the depersonalized records 152. In this embodiment, because the decision system 150 includes only depersonalized records 152, and the decision system 150 is the device that corresponds with the verification engine 100, personal information of the consumers of the brokerage processing provider does not leave the brokerage processing provider. In some embodiments, the list of types of asset holdings may be about 1 to about 30 types and/or ranges of holdings, including stocks, bonds, mutual funds, commodities, and the like.

In some embodiments, the brokerage processing provider may further comprise a firewall, before and/or after the decision system 150. The decision system 150 may process inquiries in real time or in batch mode. The decision system 150 may also comprise rules management technology, as well as other modules such as strategy management modules. The decision system 150 may also include match logic and various interfaces to connect to various brokerage processing provider databases. In some embodiments, the data contained by the brokerage processing provider may remain with the brokerage processing provider.

As illustrated in step 4, the decision system 150 may respond to the asset verification request with the transaction ID and indications of which, if any, of the list of asset holdings provided is verified based on data in the data source 190C. In one embodiment, the request from the verification engine may have a single transaction ID, but request information regarding more than one consumer. In this embodiment, the response may include verification information regarding multiple consumers. In some embodiments, the response sent from the decision system 150 at the brokerage processing provider does not include the specific amount of assets held by the consumer, nor any other personally identifying information associated with the consumer.

Next, at step 5, the verification engine 100, using the responses from the decision system 150 at the brokerage processing provider, returns a response to the lender device 102. As illustrated in step 5, the response may include the consumer's name and the verified asset holding information of the consumer. As noted above, the verification engine 100 may incorporate the request for such verification with a credit inquiry response or with a scoring model, if requested by the lender device 102. The verification engine 100 may also track the requests from the lender device 102 (e.g., in a log of requests and associated responses), for support of consumer dispute and/or other services provided to users of the verification system, for example. The response may also include a report for multiple verification requests for a single consumer, which may have asset holdings reported by several brokerage processing providers. In another example, the service provider may wish to verify both a consumer's income and assets. The response may also include a report for multiple verification requests for two consumers in a joint application, which may be associated with one or more brokerage processing providers.

In other embodiments, the data verification system may also be used to perform verification of other consumer payroll data, such as for example the consumer's employer. Consumer payroll data may be verified in the context of loan applications, loan account management, employment screening, resident screening, eligibility verification, use of historical date, collections, modeling of anonymized consumer payroll data, generic demonstrations, credit verification, and the like. In some embodiments, a lender may wish to verify the employment of a consumer. In such embodiments, the response from the decision system 150 may include an active or recent termination/severance of the consumer. The response may further comprise an employer's name. The response from the payroll processors may be an indication of no match, or an indication of confirmation on an employer list. In some embodiments, if no match is found on the payroll processor databases, a direct inquiry may be sent to a specific employer. In yet other embodiments, the data verification system may be used by life insurance providers to verify healthcare claims submitted by an applicant. In such embodiments, the data sources 190 may include data sources of third parties having information regarding healthcare records, genome maps, and the like. The system may also be used by health insurance providers to verify clinical data submitted by applicants for the presence of possible preexisting conditions. As illustrated and described above, the data verification system provides responses to the service providers to verify the data they wish to verify, without providing the data residing in the actual data source 190 of the third parties, and without compromising the personally identifying information regarding the applicants as stored on those databases.

Figure 5:
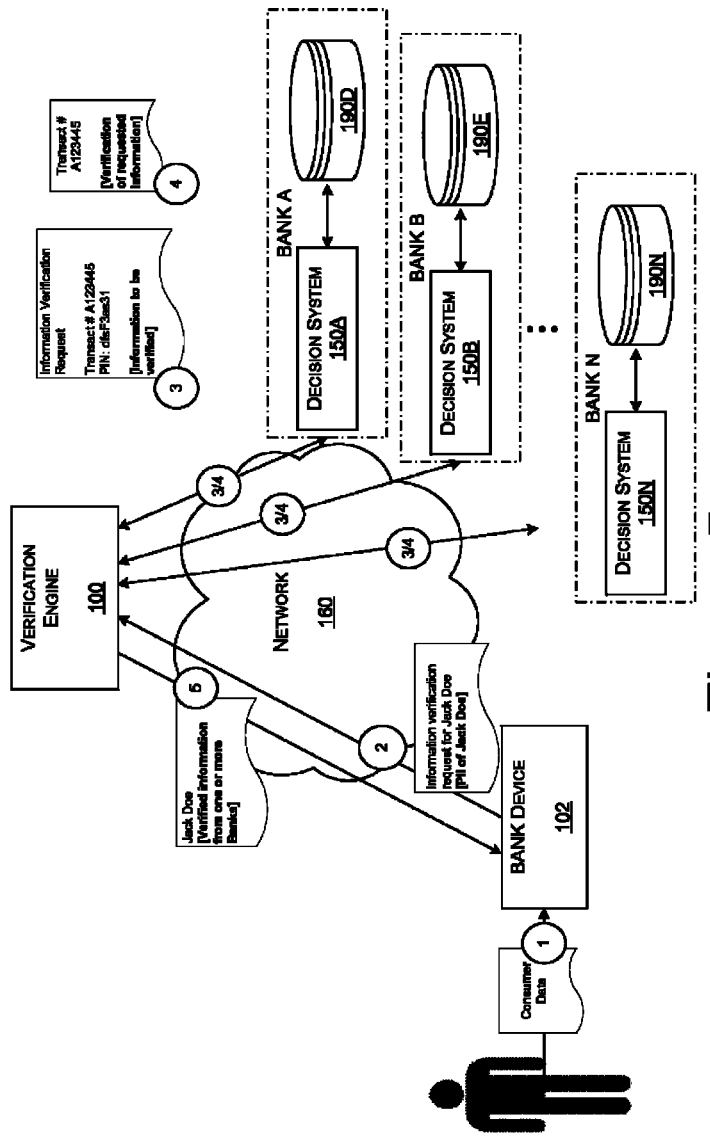
FIG. 5 is a diagram illustrating various components of a data verification system, and their interactions, in accordance with another embodiment.

FIG. 5 is a diagram illustrating various components of a data verification system, and their interactions, in accordance with another embodiment. In the embodiment of FIG. 5, a consumer, say Jack Doe, may provide a bank, consent for verification of his information. The information verified may comprise, for example, the consumer's deposits over a time period, or the consumer's balance at a specific point in time or over a period of time. The period of time may be a day, a week, a month, a year, or another time period. As illustrated in step 1 of FIG. 5, the consumer may provide this consent through the bank device 102. The consumer may also provide personally identifying information (PII), such as his name, address and/or Social Security Number (SSN). The bank may then wish to verify information regarding Jack Doe based on information from multiple other banks. As illustrated in step 2, the bank may send an information verification request to the verification engine 100. The request from the bank may include the consumer's PII.

Upon receipt of the request, the verification engine 100 may determine a personal identification number (PIN) associated with the consumer, based on the PII associated with the consumer. Upon receipt of the request, the verification engine 100 may also generate a transaction number for the request. At step 3, the request, including the consumer PIN, the transaction number, and a list of possible response ranges for the information to be verified are sent to one or more other banks, each with a decision system 150, such as those discussed above.

The decision systems 150A-150N at each of the other banks may also include, or be connected to one or more data sources 190D-190N. The decision systems 150A-150N each access data of the respective bank in order to assign PINs to the consumer data and to store depersonalized data for access in response to requests from the verification engine 100. In one embodiment, the request from the verification engine is sent to each of the banks A-N concurrently, so that responses from the multiple banks are deceived at around the same time. In other embodiments, requests may be transmitted to the banks in a serial manner.

As illustrated in step 4, the decision systems 150-150N respond to the information verification requests from the verification engine 100 with indications of which information is verified by the respective bank, such as which of multiple balance or income ranges are verified.

Next, at step 5, the verification engine 100, using the responses from the decision systems 150A-150N at the other banks, returns a response to the bank device 102. In one embodiment, the verification engine 100 performs some processing of the data provided by multiple banks in order to provide a combined response to the bank device 102. For example, if balance information is requested of multiple banks, the verification engine 100 may sum the various verified balance ranges from multiple banks in order to provide a total verified balance range to the bank device 102. As illustrated in step 5, the response may include the consumer's name and the verified information.

Figure 6:
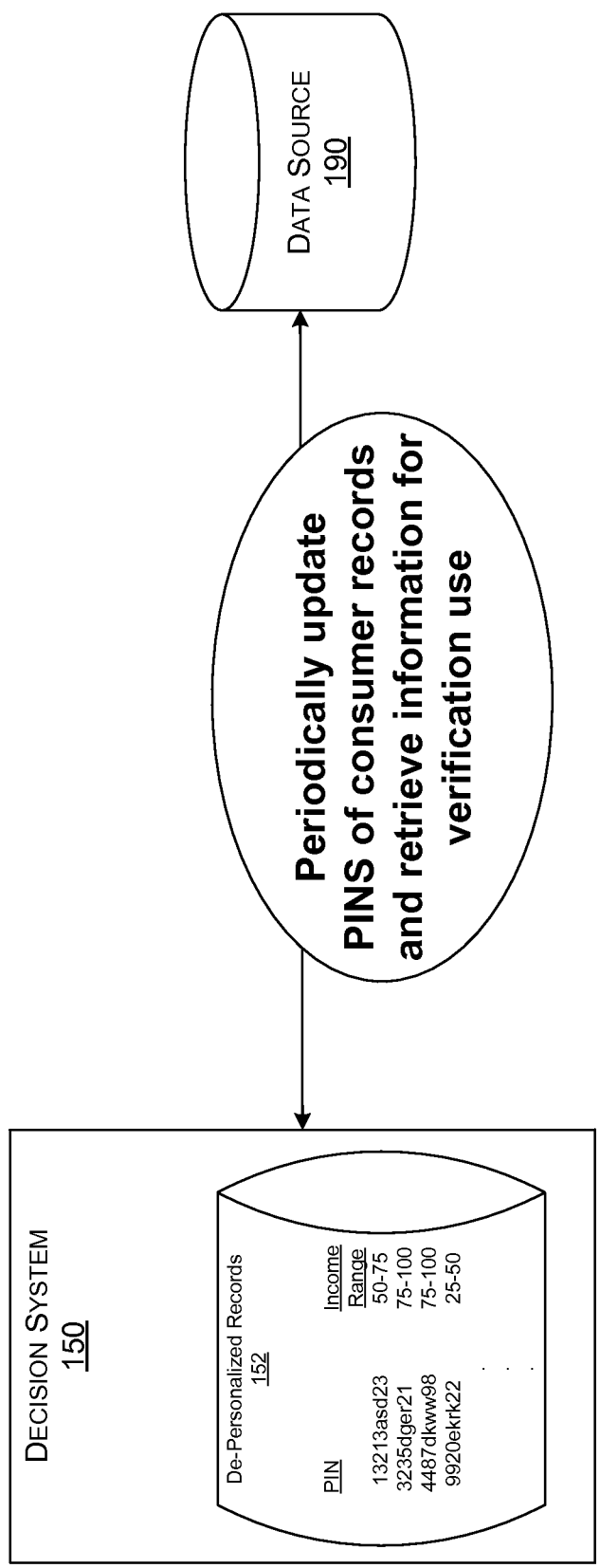
FIG. 6 is a diagram illustrating various components of a decision system, and their interactions, in accordance with one embodiment.

FIG. 6 is a diagram illustrating one embodiment of a decision system 150 as used in various embodiments discussed herein. As described above, in some embodiments, the verification engine 100 may on a periodic and/or batch basis receive a list of consumers from the decision systems 150 and return a list of associated PINs to the decision systems 150 at various data owning entities. In some embodiments, the decision system 150 located at various data owning entities may also contain logic to assign the PINs to the consumer records located on the data sources 190 in communication with the decision system 150. The assignment of the PINs (also referred to as "pinning") may be performed periodically on all records on data sources 190. The pinning may also be performed on a batch basis. The PINs may be stored on a depersonalized records 152 data structure of the decision system 150, or on the data sources 190. The PINs may be updated on a periodic basis, such as daily, weekly, monthly. The updates may include assigning, removing, and/or updating PINs associated with consumer data on the data sources 190. For example, PINs associated with updated consumer information (e.g., updated address) may be associated with consumer data in the data source 190 that was not previously associated with PINs. The updates may also include deleting old PINs for deceased consumers. In some embodiments, the decision system 150 may, after associating the PINs to the consumers, generate a list of depersonalized records 152 and save such a list in a local data structure (e.g., database). The depersonalized records may comprise a list of PINs, and each PIN may have associated with it a portion of a record from the data sources 190. For example, a PIN may be associated with the income range for the consumer associated with that PIN. Such a local list of depersonalized records with pre-matched information may enable faster responses to the verification engine. The decision system 150 may include match logic and various interfaces to connect to a variety of data sources (e.g., payroll processors, brokerage processing provider, healthcare provider, etc.) and to aggregate the information verified from multiple data sources 190.

Figure 7:
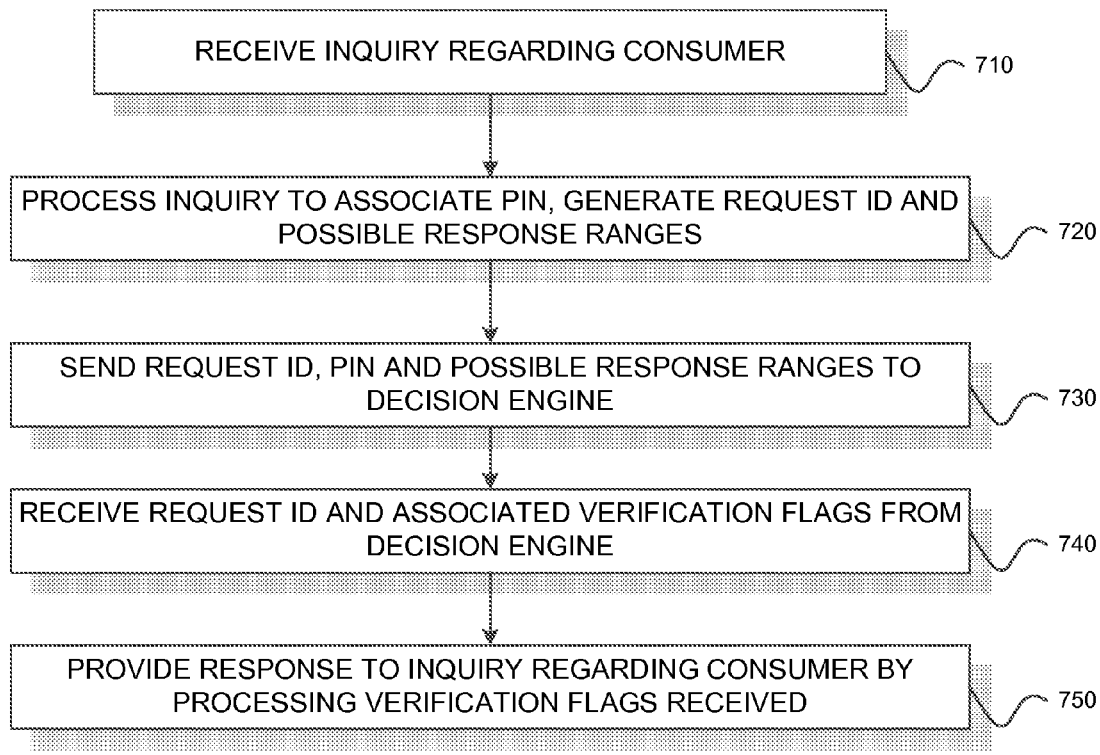
FIG. 7 is a flowchart showing operational flow of the data verification engine in accordance with one embodiment.

FIG. 7 is a flowchart showing operational flow of the data verification engine in accordance with one embodiment. Depending on the embodiment, the method of FIG. 7 may include fewer or additional blocks and/or the blocks may be performed in a different order than is illustrated. For ease of explanation, the method will be described herein as performed by the computing system 100 and, more specifically, by various modules executing on system 100; however, the method may be performed by any other suitable computing devices.

In block 710, the verification engine of the computing system 100 may receive an inquiry regarding a consumer. The inquiry may be received from service providers, such as lenders, insurance providers, and other users of the verification system 100. In various embodiments, the inquiry may include the consumer's name and address. The inquiry may include a credit inquiry, and a request for verification of one or more of the consumer's income, assets, employment, healthcare claims, clinical data, and the like.

At block 720, the verification engine of the computing system processes the inquiry received to determine the unique PIN associated with the consumer, generate a transaction identification number (ID) as well as a list of possible response ranges associated with the type of inquiry. For example, for an income verification inquiry, the verification engine generates a list of possible income ranges. For an asset holdings verification inquiry, the verification engine generates a list of possible asset holdings types, with or without an associated estimated market value range for each type.

Next at block 730, the verification engine sends a request including the consumer PIN, the transaction ID, as well as the list of possible response ranges to the decision system 150 of the data verification system. As described above, the decision system 150 may be connected to the verification engine locally, or remotely through a network, with or without a firewall. Then, the data verification system, and more specifically the decision system 150, may perform portions of a method for which an embodiment is illustrated in FIG. 8, which will be described below.

Then, at block 740, the verification engine receives a response from the decision system. The response includes the transaction ID associated with the request sent at block 730, and verification flags associated with each item in the list of possible ranges provided by the verification engine at block 730. For example, the verification flag may be a yes or no indication associated with each of the items of the list, in the order of the items as sent in block 730, without a repetition of the items. The verification flag may instead include a checkmark or an "X" for each of the items. Any indication may be used as the verification flag to indicate a positive or a negative response corresponding to each of the items in the list.

At block 750, the verification engine provides a response to the inquiry received from the service provider at block 710. In order to provide the response, the verification engine may apply a variety of rules to process the verification flags received from the decision system at block 740. In some embodiments, the rules may include matching the verification flags to the appropriate inquiry range. In some embodiments, the rules may include finding overlaps between several ranges in order to narrow down the response to a smaller interval than the original ranges provided.

Figure 8:
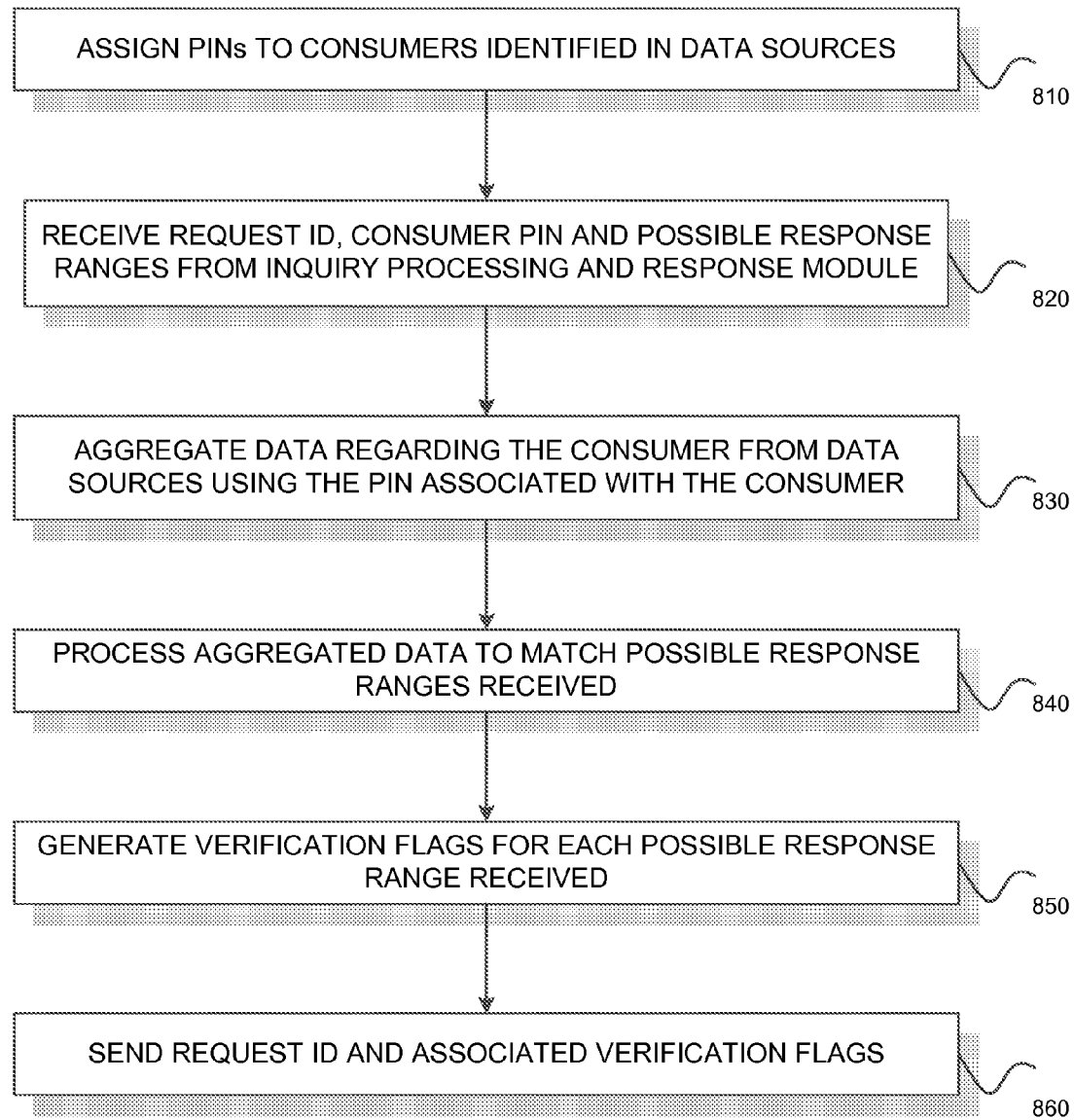
FIG. 8 is a flowchart showing operational flow of the decision system in accordance with one embodiment.

FIG. 8 is a flowchart showing operational flow of the decision system in accordance with one embodiment. Depending on the embodiment, the method of FIG. 8 may include fewer or additional blocks and/or the blocks may be performed in a different order than is illustrated. For ease of explanation, the method will be described herein as performed by the decision system 150; however, the method may be performed by any other suitable computing devices.

At block 810, the decision system 150, on a periodic and/or batch basis, assign and updates PINs to consumers identified in the data sources 190 with which it communicates. For example, each consumer may be identified by a unique identifier different than the consumer's name, address, SSN and any other personal information that may otherwise be associated with the consumer. For example, the unique identifier may be a random number generated and assigned to each consumer. The decision system 150 may then use this PIN to identify the consumer across all data source(s) with which it communicates. For example, the decision system 150 may use the same identifier for Joe Smith's income information on all payroll processors' databases and for Joe Smith's asset information on all brokerage processing providers' databases. The use of this unique identifier allows the decision system 150 to communicate with the verification engine without transferring any personally identifiable information of the consumer.

At block 820, a request with a transaction ID, consumer PIN and possible response ranges is received from the verification engine (see block 730 in FIG. 7). In some embodiments, this may be received from the inquiry processing and response module of the verification engine.

Using the PIN associated with the consumer, at block 830, the decision system 150 queries one or more data sources for information associated with the consumer. For example, the decision system 150 may have a local depersonalized set of data for the consumers based on data received from one or more data source 190. The information associated with one or more of the consumers may include the consumer's income, asset holdings, healthcare claims, clinical data, and/or any other data that may be confirmed by third party information.

At block 840, the decision system 150 may process the data received from the data sources to aggregate and/or identify data associated with the received PIN. The data may then be compared to the possible response ranges received from the verification engine. The processing may include matching verification flags to each of the list of ranges received. The processing may also include finding overlaps between several ranges in order to narrow the response range if possible. The processing may also include aggregating data from more than one source for the consumer, or aggregating data from the same source for more than one consumer.

Then, at block 850, the decision system 150 generates response data indicating the verified information to the verification engine. The response data may be in any format, such as verification flags associated with each of the list of ranges. Each of the verification flags may include an indication of the data matching or not matching the range. The verification flag may be a yes/no answer, a checkmark/"X", a green/red, or any other form of affirmative and negative response to each of the ranges received. In some embodiments, the decision system 150 may not receive any information from the data sources matching the ranges, and may generate a verification flag indicating a no match, or more input needed.

At block 860, the decision system 150 sends a response back to the verification engine using the transaction ID, and the verification flags associated with each of the ranges.

Conditional language used herein, such as, among others, "can," "could," "might," "may," "e.g.," and from the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the logical blocks, modules, and processes illustrated may be made without departing from the spirit of the disclosure. As will be recognized, certain embodiments of the inventions described herein may be embodied within a form that does not provide all of the features and benefits set forth herein, as some features may be used or practiced separately from others.

What is claimed is:

1. A method comprising:
   receiving, by a computing system having one or more hardware processors, a request for verification of asset holdings regarding a consumer, the request excluding the consumer's name and address, and including:
      a unique personal identifier of the consumer; and
      a list indicating at least:
         a first asset type that is possibly owned by the consumer;
         a first possible market value range of the first asset type;
         a second asset type that is possibly owned by the consumer;
         a second possible market value range of the second asset type;
         a third asset type that is possibly owned by the consumer; and
         a third possible market value range of the third asset type,
         wherein the asset types include at least one of stocks, bonds, mutual funds or commodities;
   locating, by the computing system, records associated with the unique personal identifier in a data structure storing data regarding a plurality of consumers and respective associations with unique personal identifiers of corresponding consumers;

from each record located, extracting, by the computing system, asset data regarding the consumer associated with the unique personal identifier;

determining, based on the extracted asset data, one or more asset types of the consumer and respective estimated market values for each of the one or more asset types;

selectively aggregating the extracted asset data to determine a first market value of the first asset type, a second market value of the second asset type, and a third market value of the third asset type;

comparing, by the computing system, the aggregated first market value with the first possible market value range;

in response to determining that the aggregated first market value is within the first possible market value range, set a first verification flag to a first value indicating a match;

in response to determining that the aggregated first market value is not within the first possible market value range, set the first verification flag to a second value indicating no match, wherein the first verification flag includes only:
1) the first value indicating that the first market value is within the first possible market value range, or
2) the second value indicating that the first market value is not within the first possible market value range;

wherein the first verification flag does not include the aggregated first market value;

comparing, by the computing system, the aggregated second market value with the second possible market value range;

in response to determining that the aggregated second market value is within the second possible market value range, set a second verification flag to the first value indicating a match;

in response to determining that the aggregated second market value is not within the second possible market value range, set the second verification flag to the second value indicating no match, wherein the second verification flag includes only:
1) the first value indicating that the second market value is within the second possible market value range, or
2) the second value indicating that the second market value is not within the second possible market value range;

wherein the second verification flag does not include the aggregated second market value;

comparing, by the computing system, the aggregated third market value with the third possible market value range;

in response to determining that the aggregated third market value is within the third possible market value range, set a third verification flag to the first value indicating a match;

in response to determining that the aggregated third market value is not within the third possible market value range, set the third verification flag to the second value indicating no match, wherein the third verification flag includes only:
1) the first value indicating that the third market value is within the third possible market value range, or
2) the second value indicating that the third market value is not within the third possible market value range;

wherein the third verification flag does not include the aggregated third market value; and providing the first verification flag, the second verification flag, and the third verification flag respectively associated with the first, second and third possible market value ranges to an external computing device without providing the first, second, or third aggregated market values to the external computing device.

2. The method of claim 1, wherein the data regarding the consumer is obtained from a brokerage processing provider.

3. The method of claim 1 further comprising generating a transaction number associated with the request.

4. The method of claim 3 further comprising providing the transaction number associated with the request.

5. A computing system comprising:
a verification module configured to:
receive a request for verification of asset regarding a consumer, wherein the request includes a unique personal identifier of the consumer and excludes the consumer's name and address; and
a decision module configured to:
receive a list indicating at least a first asset type that is possibly owned by the consumer, a first possible market value range of the first asset type, a second asset type that is possibly owned by the consumer, a second possible market value range of the second asset type, a third asset type that is possibly owned by the consumer, and a third possible market value range of the third asset type, wherein the asset types include at least one of stocks, bonds, mutual funds or commodities;
locate records associated with the unique personal identifier in a data structure storing data regarding a plurality of consumers and respective associations with unique personal identifiers of corresponding consumers;
from each record located, extract asset data regarding the consumer associated with the unique personal identifier;
determine, based on the extracted asset data, one or more asset types of the consumer and respective estimated market values for each of the one or more asset types;
selectively aggregate the extracted asset data to determine a first market value of the first asset type, a second market value of the second asset type, and a third market value of the third asset type;
compare the aggregated first market value with the first possible market value range;
in response to determining that the aggregated first market value is within the first possible market value range, set a first verification flag to a first value indicating a match;
in response to determining that the aggregated first market value is not within the first possible market value range, set the first verification flag to a second value indicating no match,
wherein the first verification flag includes only:
1) the first value indicating that the first market value is within the first possible market value range, or
2) the second value indicating that the first market value is not within the first possible market value range;
wherein the first verification flag does not include the aggregated first market value;
compare the aggregated second market value with the second possible market value range;

in response to determining that the aggregated second market value is within the second possible market value range, set a second verification flag to the first value indicating a match;

in response to determining that the aggregated second market value is not within the second possible market value range, set the second verification flag to the second value indicating no match, wherein the second verification flag includes only:
1) the first value indicating that the second market value is within the second possible market value range, or
2) the second value indicating that the second market value is not within the second possible market value range;

wherein the second verification flag does not include the aggregated second market value;

compare the aggregated third market value with the third possible market value range;

in response to determining that the aggregated third market value is within the third possible market value range, set a third verification flag to the first value indicating a match;

in response to determining that the aggregated third market value is not within the third possible market value range, set the third verification flag to the second value indicating no match, wherein the third verification flag includes only:
1) the first value indicating that the third market value is within the third possible market value range, or
2) the second value indicating that the third market value is not within the third possible market value range;

wherein the third verification flag does not include the aggregated third market value; and provide the first verification flag, the second verification flag, and the third verification flag respectively associated with the first, second and third possible market value ranges to an external computing device without providing the first, second, or third aggregated market values to the external computing device.

6. A non-transitory computer-readable storage medium comprising computer-executable instructions that direct a computing system to:

receive a request for verification of asset holdings regarding a consumer, the request excluding the consumer's name and address, and including:
 a unique personal identifier of the consumer; and
 a list indicating at least:
  a first asset type that is possibly owned by the consumer;
  a first possible market value range of the first asset type;
  a second asset type that is possibly owned by the consumer;
  a second possible market value range of the second asset type;
  a third asset type that is possibly owned by the consumer; and
  a third possible market value range of the third asset type, wherein the asset types include at least one of stocks, bonds, mutual funds or commodities;

locate records associated with the unique personal identifier in a data structure storing data regarding a plurality of consumers and respective associations with unique personal identifiers of corresponding consumers;

from each record located, extract asset data regarding the consumer associated with the unique personal identifier;

determine, based on the extracted asset data, one or more asset types of the consumer and respective estimated market values for each of the one or more asset types;

selectively aggregate the extracted asset data to determine a first market value of the first asset type, a second market value of the second asset type, and a third market value of the third asset type;

compare the aggregated first market value with the first possible market value range;

in response to determining that the aggregated first market value is within the first possible market value range, set a first verification flag to a first value indicating a match;

in response to determining that the aggregated first market value is not within the first possible market value range, set the first verification flag to a second value indicating no match, wherein the first verification flag includes only:
1) the first value indicating that the first market value is within the first possible market value range, or
2) the second value indicating that the first market value is not within the first possible market value range;

wherein the first verification flag does not include the aggregated first market value;

compare the aggregated second market value with the second possible market value range;

in response to determining that the aggregated second market value is within the second possible market value range, set a second verification flag to the first value indicating a match;

in response to determining that the aggregated second market value is not within the second possible market value range, set the second verification flag to the second value indicating no match, wherein the second verification flag includes only:
1) the first value indicating that the second market value is within the second possible market value range, or
2) the second value indicating that the second market value is not within the second possible market value range;

wherein the second verification flag does not include the aggregated second market value;

compare the aggregated third market value with the third possible market value range;

in response to determining that the aggregated third market value is within the third possible market value range, set a third verification flag to the first value indicating a match;

in response to determining that the aggregated third market value is not within the third possible market value range, set the third verification flag to the second value indicating no match, wherein the third verification flag includes only:
1) the first value indicating that the third market value is within the third possible market value range, or
2) the second value indicating that the third market value is not within the third possible market value range;

wherein the third verification flag does not include the aggregated third market value; and provide the first verification flag, the second verification flag, and the third verification flag respectively associated with the first, second and third possible market value ranges to an external computing device without providing the first, second, or third aggregated market values to the external computing device.

* * * * *